United States Patent
Ito et al.

(10) Patent No.: US 7,265,910 B2
(45) Date of Patent: Sep. 4, 2007

(54) OPTICAL UNIT, IMAGE TAKING APPARATUS AND OPTICAL FINDER

(75) Inventors: Yoshihiro Ito, Asaka (JP); Nobuaki Nago, Asaka (JP); Takashi Kato, Minami-Ashigara (JP); Hitoshi Miyano, Saitama (JP)

(73) Assignees: Fujinon Corporation, Saitama (JP); Fujifilm Corporation, Tokyo (JP)

( * ) Notice: Subject to any disclaimer, the term of this patent is extended or adjusted under 35 U.S.C. 154(b) by 128 days.

(21) Appl. No.: 11/214,756

(22) Filed: Aug. 31, 2005

(65) Prior Publication Data
US 2006/0050412 A1    Mar. 9, 2006

(30) Foreign Application Priority Data

| Sep. 7, 2004 | (JP) | ............................. 2004-259153 |
| Sep. 7, 2004 | (JP) | ............................. 2004-259926 |
| Mar. 10, 2005 | (JP) | ............................. 2005-067009 |
| Aug. 19, 2005 | (JP) | ............................. 2005-238433 |

(51) Int. Cl.
*G02B 1/06* (2006.01)
*G02B 3/12* (2006.01)

(52) U.S. Cl. ...................... 359/666; 359/665
(58) Field of Classification Search ................ 359/665, 359/666, 667
See application file for complete search history.

(56) References Cited

U.S. PATENT DOCUMENTS

| 7,180,678 B2* | 2/2007 | Kato et al. .................. 359/665 |
| 7,212,329 B2* | 5/2007 | Ito et al. ...................... 359/296 |
| 7,215,480 B2* | 5/2007 | Ito et al. ...................... 359/666 |
| 2006/0044448 A1* | 3/2006 | Kato et al. .................. 348/335 |
| 2006/0050402 A1* | 3/2006 | Ito et al. ...................... 359/666 |
| 2006/0056008 A1* | 3/2006 | Ito et al. ...................... 359/296 |

FOREIGN PATENT DOCUMENTS

JP    2002-341311 A    11/2002

OTHER PUBLICATIONS

"Philips Fluid Lenses", Digital Photography Review, www.dpreview.com, 2 pages.

* cited by examiner

Primary Examiner—David N. Spector
(74) Attorney, Agent, or Firm—Sughrue Mion, PLLC

(57) ABSTRACT

An optical unit capable of freely changing the refractive power and operating with a reduced deterioration in performance, an image taking apparatus having an image taking lens using the optical unit, and an optical finder using the optical unit. The optical unit includes a lens body having an electromagnetic field generator which changes the focal length of the lens body by moving, by an electromagnetic force, a dispersoid which is dispersed in a light-transmissive dispersion medium enclosed in a container, which is light-transmissive, and which has a refractive index different from the refractive index of the dispersion medium. The optical unit also includes a focal length changing section which changes the focal length of the lens body in three steps by controlling an electromagnetic field generated by the electromagnetic field generator.

23 Claims, 38 Drawing Sheets

OPTICAL UNIT, IMAGE TAKING APPARATUS AND OPTICAL FINDER

BACKGROUND OF THE INVENTION

1. Field of the Invention

The present invention relates to an optical unit capable of changing the focal length, an image taking apparatus having an image taking lens using the optical unit, and an optical finder using the optical unit.

2. Description of the Related Art

As a variable-focus lens capable of changing the focal length, a liquid crystal lens capable of changing the focal length by using the electro-optic effect of a liquid crystal is known. For example, Japanese Patent Laid-Open No. 2002-341311 (patent document 1) discloses a liquid crystal lens having first and second light-transmissive substrates in the form of a flat plate, a third light-transmissive substrate having two concave surfaces and provided between the first and second light-transmissive substrates, and a liquid crystal enclosed in each of a space between the first and third light-transmissive substrates and a space between the second and third light-transmissive substrates. In this liquid crystal lens, the orientation of liquid crystal molecules is changed according to the level of an applied voltage to change the refractive index of the liquid crystal lens. The focal length of the lens is thereby changed.

A fluid lens which can be changed in shape by application of a voltage to change its focal length is also known as a variable-focus lens. For example, a fluid lens in which an immiscible fluid constituted of a non-electroconductive oil and an electroconductive aqueous solution is enclosed in a tube having its inner wall surface covered with a water-repellent coating is proposed in "Philips' Fluid Lenses", [online], Mar. 3, 2004, Royal Philips Electronics, [found on Mar. 31, 2004], Internet <URL: http://www.dpreview.com/news/0403/04030302philipsfluidle ns.asp> (non-patent document 1). In this fluid lens, when no voltage is applied, the aqueous solution constituting the immiscible fluid is a semispherical mass and the interface of the aqueous solution on the oil is convex. This interface changes between the convex state and a concave state according to the level of the applied voltage. Consequently, the radius of curvature of the lens can be changed and the focal length of the lens is freely variable.

In the technique disclosed in the patent document 1, the focal length of the lens is changed by using the difference $\Delta n$ ($n\psi$-$n\zeta$) between the refractive index ($n\psi$) in the major-axis direction and the refractive index ($n\zeta$) in the minor-axis direction of liquid crystal molecules. However, there is a problem that the difference $\Delta n$ is so small that the refractive index of the lens cannot be freely changed.

In the technique proposed in the non-patent document 1, the focal length of the fluid lens is changed by applying a voltage to the immiscible fluid. When a voltage is applied to the immiscible fluid, a current flows through the electroconductive aqueous solution constituting the immiscible fluid. Therefore, there is a risk of the aqueous solution being decomposed by electrolysis to generate hydrogen and oxygen, and there is a problem that during use over a long time period a gas constituted of generated hydrogen and oxygen is accumulated to form bubbles which scatter light and deteriorate the performance of the lens.

The above-described problems arise generally with plane-parallel plates and the like as well as with lenses.

SUMMARY OF THE INVENTION

The present invention has been made in view of the above circumstances and provides an optical unit capable of freely changing the refractive power and operating with a reduced deterioration in performance, an image taking apparatus employing an image taking lens using the optical unit, and an optical finder using the optical unit.

The present invention provides an optical unit including:

an optical element having a container which is light-transmissive at least in a light passage region, a light-transmissive dispersion medium enclosed in the container, a light-transmissive dispersoid dispersed in the dispersion medium and having a refractive index different from the refractive index of the dispersion medium, and an electromagnetic field generator which changes the focal length of the light passage region by moving the dispersoid dispersed in the dispersion medium by an electromagnetic force; and a focal length changing section which changes the focal length of the light passage region at least in three steps by controlling an electromagnetic field generated by the electromagnetic field generator.

In the optical unit of the present invention, a dispersoid which is dispersed in a light-transmissive dispersion medium enclosed in a container, which is light-transmissive, and which has a refractive index different from the refractive index of the dispersion medium, is moved by an electromagnetic force, thereby changing the focal length of the light passage region at least in three steps. There can be obtained a variable-focal-length optical unit whose focal length can be changed at least in three steps according to a refractive index determined by the dispersion medium and the amount of dispersoid moved in the light passage region by the electromagnetic force. The dispersoid dispersed in the dispersion medium is moved by an electric field or a magnetic field generated by the electromagnetic field generator. No current is caused in the dispersion medium. Therefore, the optical element of the present invention is capable of reducing the risk of electrolysis and limiting the deterioration of the lens performance over a long time period in comparison with the technique that is proposed in the nonpatent document 1, and that entails a current flowing through an electroconductive aqueous solution.

Preferably, the electromagnetic field generator in the optical unit of the present invention is an electrode which receives application of a voltage to cause electrophoresis of the dispersoid, and the focal length changing section controls the voltage applied to the electrode.

In the electrophoretic optical unit using this electrophoresis, electrophoresis of the dispersoid is caused by the electric field applied from the electrode, thereby controlling the focal length. The amount of the dispersoid moved by electrophoresis can be freely controlled according to the waveform and the pattern of a voltage applied to the electrode, the placement, shape and structure of the electrode, and other factors. Therefore, the refractive index distribution can be determined with flexibility in comparison with the technique of controlling the refraction of light by using the refractive index of liquid crystal molecules as proposed in the patent document 1.

Preferably, the dispersoid in the electrophoretic optical unit of the present invention is constituted of titanium oxide.

If the dispersoid is constituted of titanium oxide, an optical member having a high refractive index can be realized. Also, titanium oxide is easily available as a material for manufacture of the optical element.

Preferably, the dispersoid in the electrophoretic optical unit of the present invention is constituted of alumina.

If the dispersoid is constituted of alumina, the cost of the dispersoid can be reduced.

Preferably, the dispersion medium in the electrophoretic optical unit of the present invention is an organic dispersion medium.

Preferably, the dispersion medium in the electrophoretic optical unit of the present invention is a hydrocarbon-based organic dispersion medium.

If the dispersion medium is a hydrocarbon-based organic dispersion medium, the electrical stability is further improved in comparison with organic dispersion mediums having functional groups.

Preferably, the inner surface of the electrode in the electrophoretic optical unit of the present invention is coated with an insulating film which is placed adjacent to the dispersion medium.

Agglomeration of the dispersoid on the electrodes can be prevented in this way.

Also, the insulating film in the electrophoretic optical unit of the present invention is preferably a polyimide insulating film.

An Electrode having improved heat resistance and durability can be obtained by using a polyimide insulating film.

Preferably, the dispersoid in the electrophoretic optical unit of the present invention is magnetic; the electromagnetic field generator is a magnetic field generator which causes magnetophoresis of the dispersoid; and the focal length changing section controls a magnetic field generated by the magnetic field generator.

In the magnetophoretic optical unit using this magnetophoresis, the focal length is controlled by causing magnetophoresis of the magnetic dispersoid in the dispersion medium instead of causing electrophoresis. Control of an electric field is required for electrophoresis of a dispersoid. However, control of a magnetic field easier than control of an electric field suffices for magnetophoresis of the magnetic dispersoid, thus enabling the focal length to be reliably adjusted.

Preferably, the dispersoid in the magnetophoretic optical unit of the present invention is constituted of titanium-cobalt oxide.

Titanium-cobalt oxide can form magnetic particles having high optical transmissivity and easily producible.

Preferably, the dispersoid in the optical unit of the present invention is nanoparticles.

Electrophoresis of the dispersoid can be effected even in a case where the dispersoid is nanoparticles.

Preferably, the dispersoid in the optical unit of the present invention is nanoparticles having a particle size of 5 to 100 nm.

If the dispersoid is nanoparticles having a particle size of 5 to 100 nm, scattering of light can be avoided and the desired light transmissivity can be maintained. Also, nanoparticles having a particle size in this range can be easily handled.

Preferably, the dispersion medium in the optical unit of the present invention is water.

If the dispersion medium is water, the dispersibility of the dispersoid is high and the cost of the dispersion medium is reduced.

Preferably, the container in the optical unit of the present invention has the shape of a lens.

If the container has the shape of a lens, the optical unit can be used as a focusing lens, a zoom lens or the like.

In the optical unit of the present invention, at least the light passage region of the container may have the shape of a lens with a positive refractive power.

If the container is formed in this manner, the optical unit of the present invention can be used as a convex variable-focus lens.

In the optical unit of the present invention, at least the light passage region of the container may have the shape of a lens with a negative refractive power.

If the container is formed in this manner, the optical unit of the present invention can be used as a concave variable-focus lens.

In the optical unit of the present invention, at least the light passage region of the container may have the shape of an aspheric lens.

If the container is formed in this manner, the optical unit of the present invention can be used as an aspheric variable-focus lens.

In the optical unit of the present invention, the container may have the shape of a flat plate.

If the container has the shape of a flat plate, the optical distance to a subject can be changed.

The present invention also provides a first image taking apparatus including an image taking lens in which the optical unit of the present invention is used as a focusing lens, wherein an image signal is generated by performing an image taking operation including capturing subject light which enters the image taking apparatus through the image taking lens.

The first image taking apparatus of the present invention has an image taking lens in which the optical unit of the present invention is used as a focusing lens, and can therefore be realized as an image taking apparatus simpler in construction, reduced in size and having improved impact resistance in comparison with the conventional image taking apparatus requiring a mechanism for driving a focusing lens.

Preferably, the first image taking apparatus also includes a focus detection section which detects an in-focus position of the image taking lens by changing the focal length by means of the focusing lens and detecting a change in contrast of a subject image.

According to the preferable form of the first image taking apparatus of the present invention, the focal length of the optical unit can be controlled with accuracy over a long time period to take high-quality images.

The present invention also provides a second image taking apparatus including an image taking lens whose focal length is changed by the optical unit of the present invention, wherein an image signal is generated by performing an image taking operation including capturing subject light which enters the image taking apparatus through the image taking lens.

The second image taking apparatus of the present invention has an image taking lens whose focal length is changed by the optical unit of the present invention, and can therefore be realized as an image taking apparatus simpler in construction, reduced in size and having improved impact resistance in comparison with the conventional image taking apparatus requiring a mechanism for changing a focal length.

The present invention also provides a third image taking apparatus including an image taking lens in which the optical unit of the present invention is used as an aberration correction lens, wherein an image signal is generated by performing an image taking operation including capturing subject light which enters the image taking apparatus through the image taking lens.

The third image taking apparatus has an image taking lens in which the optical unit of the present invention is used as an aberration correction lens, and is, therefore, capable of performing aberration correction as desired to suitably correct an aberration peculiar to the image taking lens.

The present invention further provides an optical finder using the optical unit of the present invention as a diopter correction lens.

The optical finder of the present invention uses the optical unit of the present invention as a diopter correction lens and can therefore be realized as an optical finder simplified in construction, reduced in size and having improved impact resistance in comparison with the conventional optical finders requiring a mechanism for driving a portion of the optical system for diopter correction.

The optical unit of the present invention is capable of freely changing the refractive power and limiting the deterioration of the performance. The image taking apparatus having an image taking lens using the optical unit of the present invention as a focusing lens requires no mechanism for driving the focusing lens and can therefore be simplified in construction and reduced in size and have improved impact resistance. The image taking apparatus having an image taking lens whose focal length is changed by using the optical unit of the present invention requires no mechanism for changing the focal length and can therefore be simplified in construction and reduced in size and have improved impact resistance. The image taking apparatus having an image taking lens in which the optical unit of the present invention is used as an aberration correction lens can perform aberration correction as desired to suitably correct an aberration peculiar to the image taking lens. The optical finder of the present invention uses the optical unit of the present invention as a diopter correction lens and can therefore be simplified in construction and reduced in size and have improved impact resistance in comparison with the conventional optical finders requiring a mechanism for driving a portion of the optical system for diopter correction.

DETAILED DESCRIPTION OF THE INVENTION

The present invention will be described with respect to embodiments thereof.

Optical units in accordance with the present invention are roughly divided into electrophoretic optical units capable of changing the focal length by causing electrophoresis of a dispersoid dispersed in a dispersion medium, and magnetophoretic optical units capable of changing the focal length by causing magnetophoresis of a dispersoid. Description will first be made of an electrophoretic optical unit.

An optical unit of electrophoretic type having a lens shape will be described first.

Figure 1:
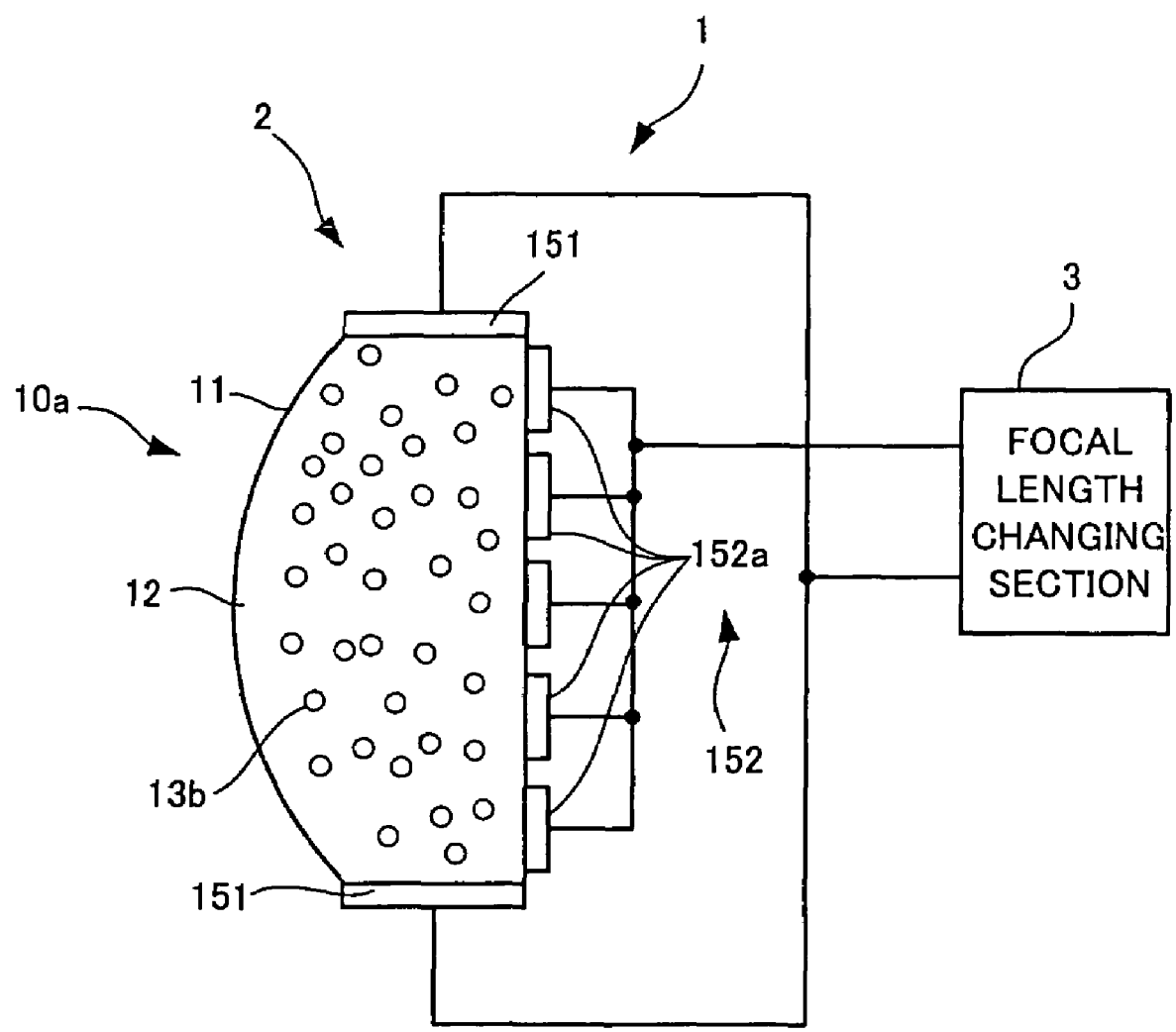
FIG. 1 is a diagram showing a sectional configuration of a variable-focus lens in a first embodiment of the present invention.

FIG. 1 is a diagram showing a sectional configuration of a variable-focus lens which is a first embodiment of the present invention.

The variable-focus lens 1 shown in FIG. 1 has a lens body 2 and a focal length changing section 3. The lens body 2 includes a container 11 which is light-transmissive at least in a light passage region 10a, and which has the shape of a lens. The container 11 corresponds to an example of the container in accordance with the present invention. At least the light passage region 10a of the container 11 has the shape of a lens having a convex outer surface.

In the lens body 2, a light-transmissive dispersion medium 12 is provided in a state of being enclosed in the container 11. The dispersion medium 12 is an example of the dispersion medium in accordance with the present invention.

In the lens body 2, a dispersoid 13 is also provided which is dispersed in the dispersion medium 12, which is light-transmissive, and which has a refractive index higher than that of the dispersion medium 12. In general, a dispersion is constituted of a dispersion medium and a dispersoid. The dispersoid is, for example, particles. More specifically, the dispersoid 13 is nanoparticles 13b negatively charged. The dispersoid 13 is an example of the dispersoid in accordance with the present invention.

The lens body 2 is also provided with a first electrode 151 and a second electrode 152 for controlling the refraction of light passing through the light passage region 10a by effecting electrophoresis of the dispersoid 13 dispersed in the dispersion medium 12. The first electrode 151 is placed in such a position as to surround the light passage region 10a in the container 11. The second electrode 152 is placed on a back surface of the container 11 in the light passage region 10a. The second electrode 152 is constituted by a certain number of electrode elements 152a. The first and second electrodes 151 and 152 are an example of the electromagnetic field generator in accordance with the present invention as well as an example of the electrode in accordance with the present invention.

The focal length changing section 3 is a section for changing the focal length of the light passage region 10a at least in three steps by controlling voltages applied to the first and second electrodes 151 and 152. The focal length changing section 3 corresponds to an example of the focal length changing section in accordance with the present invention.

When a negative voltage and a positive voltage are respectively applied to the first and second electrodes 151 and 152 from the focal length changing section 3, the first and second electrodes 151 and 152 function as a cathode and an anode, respectively. When a positive voltage and a negative voltage are respectively applied to the first and second electrodes 151 and 152, the first and second electrodes 151 and 152 function as an anode and a cathode, respectively.

In the variable-focus lens 1, the refraction of light passing through the light passage region 10a is controlled through electrophoresis of the dispersoid 13 which is dispersed in the light-transmissive dispersion medium 12 enclosed in the container 11 of the lens body 2, which is light-transmissive and which has a refractive index higher than that of the dispersion medium 12, by the way that the voltage applied between the first and second electrodes 151 and 152 for electrophoresis being controlled by the focal length changing section 3. The focal length of the light passage region 10a is thereby changed at least in three steps. The variable-focus lens 1 is therefore obtained as a lens whose focal lens is changed at least in three steps according to a refractive index determined by the dispersion medium 12 and the amount of movement of the dispersoid 13 to the light passage region 10a caused by electrophoresis. The principle of the operation of the lens body 2 will be described before description of the operation of the variable-focus lens 1. For ease of description, description will be made with respect to a lens body shown in FIG. 2.

Figure 2:
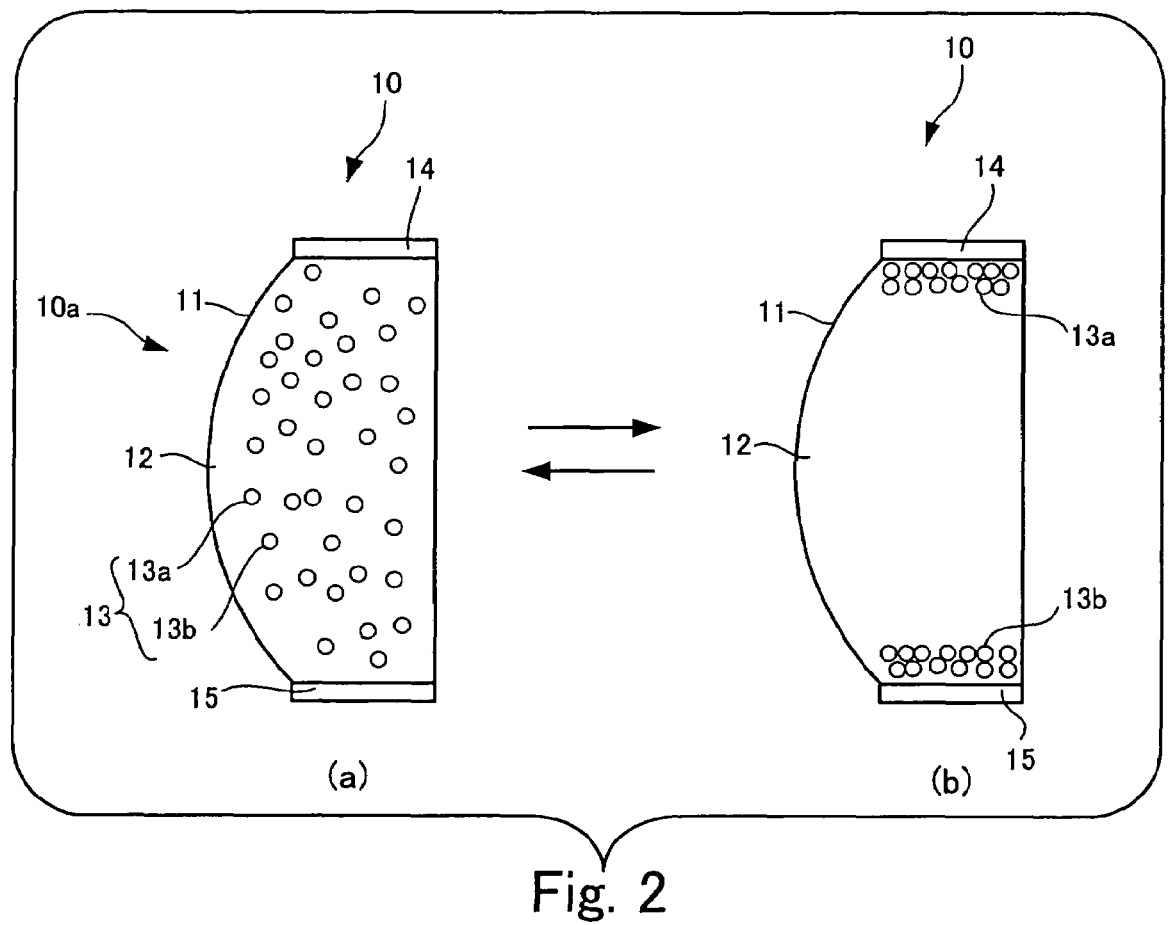
FIG. 2 is a diagram for explaining the principle of operation of a lens body.

FIG. 2 is a diagram for explaining the principle of the operation of a lens body 10.

The lens body 10 shown in parts (a) and (b) of FIG. 2 is provided with a container 11 which is light-transmissive at least in a light passage region 10a and which has the shape of a lens. At least the light passage region 10a of the container 11 has the shape of a lens having a convex outer surface.

In the lens body 10, a light-transmissive dispersion medium 12 is provided in a state of being enclosed in the container 11.

In the lens body 10, a dispersoid 13 is also provided which is dispersed in the dispersion medium 12, which is light-transmissive, and which has a refractive index higher than that of the dispersion medium 12.

The lens body 10 is also provided with a cathode 14 and an anode 15 which are an electrode for controlling the refraction of light passing through the light passage region 10a by effecting electrophoresis of the dispersoid 13 dispersed in the dispersion medium 12. More specifically, the dispersoid 13 is nanoparticles 13a positively charged and nanoparticles 13b negatively charged, the cathode 14 which is a negative electrode for attracting the dispersoid 13 and the anode 15 which is a positive electrode for attracting the dispersoid 13 are placed at such positions on the container 11 as to surround the light passage region 10a.

Any material may be used as the material of the nanoparticles. The nanoparticles are, for example, particles of silica, alumina, zirconia, titanium oxide, tungsten oxide, zinc oxide, tin oxide or barium titanate. Preferably, the nanoparticles are particles of titanium oxide, silica gel ($SiO_2$), alumina or a polymer. The nanoparticles may be prepared by any of a solid phase method, a liquid phase method and a vapor phase method. Preferably, a liquid phase method or a vapor phase method is used. A method suitable for preparation of the nanoparticles is described in detail in a document "Preparation of Nanoparticles and Control of and Evaluation of Dispersion and Agglomeration of Nanoparticles, Technical Information Institute Co., Ltd., 2003". The particle size is preferably 100 nm or less. If the particle size exceeds 100 nm, scattering of light occurs to impair the transparency (transmissivity).

It is preferable to modify the surface of the nanoparticles for the purpose of improving the stability of dispersion in the dispersion medium 12. Examples of a method of modifying the surface are a method using a titanium coupling agent (such as isopropyl triisostearoyl titanate), a silane coupling agent (such as pentadecafluorodecyl trimethylsilane) or an aluminum coupling agent (such as acetoalkoxyaluminum diisopropylate) and graft polymerization. Polyethylene graft polymerization or polystyrene graft polymerization may be used as graft polymerization on titanium oxide. Graft polymerization using a silanol group may be used as graft polymerization on silica gel.

As the dispersion medium 12 in which the nanoparticles are dispersed, water or a non-aqueous organic dispersion medium may be used. A mixture of water and an organic dispersion medium may also be used. Examples of a non-aqueous organic dispersion medium preferably used as the dispersion medium 12 are hydrocarbons (such as hexane, heptane, pentane, octane and ISOPAR (a product from Exxon Corporation)), hydrocarbon aromatic compounds (such as benzene, toluene, xylene, mesitylene and ethylbenzene), halogen hydrocarbons (such as difluoropropane, dichloroethane, chloroethane and bromoethane), halogen hydrocarbon aromatic compounds (such as chlorobenzene), ether compounds (such as dibutyl ether, anisole and diphenyl ether), alcohol compounds (such as glycerin), compounds having a carbonyl group (such as propylene carbonate), nitro compounds (such as nitromethane), nitrile compounds (such as acetonitrile and benzonitrile).

Preferably, the refractive index, specific gravity, viscosity, resistivity and dielectric constant of the dispersion medium 12 are adjusted in relation to use of the lens body 10. This adjustment may be performed by mixing a certain number of dispersion mediums.

Additives including stabilizing agents for stabilization under an acid, an alkali and a salt, a stabilizing agent for stabilization of dispersion, stabilizing agents for antioxidation and ultrasonic absorption, an antibacterial agent and a preservative agent may be added to the dispersion medium 12.

As a member forming the container 11, a glass base plate, a film or a base plate of a high polymer such as polyester, polyimide, polymethyl methacrylate, polystyrene, polypropylene, polyethylene, polyamide, nylon, polyvinyl chloride, polyvinylidene chloride, polycarbonate, polyether sulfone, a silicone resin, a polyacetal resin, a fluororesin, a cellulose derivative or polyolefin, or an inorganic base plate such as a metallic base plate or a ceramic base plate is preferably used. The container 11 has a transmissivity of preferably 50% or higher, more preferably 80% or higher.

As the cathode 14 and the anode 15, an electrode member on which a layer of gold, silver, copper, aluminum, magnesium, nickel, platinum, carbon, an electroconductive high polymer or a metal oxide typified by tin oxide-indium oxide (ITO), tin oxide or zinc oxide is formed is preferably used. For use on a portion through which light is to be transmitted, transparent electrodes are preferably used. A metal oxide typified by tin oxide-indium oxide (ITO), tin oxide or zinc oxide is preferred.

In the lens body 10 shown in FIG. 2, the refraction of light passing through the light passage region 10a is controlled through electrophoresis of the dispersoid 13 which is dispersed in the light-transmissive dispersion medium 12 enclosed in the container 11 having the shape of a lens, which is light-transmissive and which has a refractive index higher than that of the dispersion medium 12, the electrophoresis being effected according to the voltage applied between the cathode 14 and the anode 15. A variable-focus lens having a focal length according to a refractive index determined by the dispersion medium 12 and the amount of movement of the dispersoid 13 to the light passage region 10a caused by electrophoresis is obtained by using the lens body 10, as described below in detail.

When no voltage is applied between the cathode 14 and the anode 15, the dispersoid 13 is uniformly dispersed in the dispersion medium 12, as shown in part (a) of FIG. 1. The dispersoid 13 is constituted of nanoparticles 13a positively charged and nanoparticles 13b negatively charged. The lens body 10 in this state has a comparatively high refractive index resulting from the refractive index of the dispersion medium 12 and a refractive index determined by the amount (the number of particles) of dispersoid 13 uniformly dispersed in the dispersion medium 12.

When a predetermined voltage is applied between the cathode 14 and the anode 15, the positively charged nanoparticles 13a in the dispersoid 13 uniformly dispersed in the dispersion medium 12 are attracted to the cathode 14 and the negatively charged nanoparticles 13b are attracted to the anode 15, as shown in part (b) of FIG. 2. The lens body 10 therefore has a comparatively low refractive index determined by the refractive index of the dispersion medium 12 only. When the application of the voltage between the cathode 14 and the anode 15 is stopped, the lens body 10 is again settled in the state shown in part (a) of FIG. 2.

The amount of the dispersoid 13 moved from the state of being positioned in the light passage region 10a with electrophoresis can be freely controlled according to the waveform and the pattern of the voltage applied between the cathode 14 and the anode 15, the placement, shape and structure of the cathode 14 and the anode 15, and other factors. Therefore, the distribution rate can be determined with flexibility in comparison with the technique of controlling the refraction of light by using the refractive index of liquid crystal molecules as disclosed in the patent document 1. Also, the dispersoid 13 dispersed in the dispersion medium 12 is moved by an electric field produced by applying a voltage between the cathode 14 and the anode 15 and no current is caused therebetween. Therefore, the risk of electrolysis is reduced in comparison with the technique using a current flowing through an electroconductive aqueous solution as proposed in the non-patent document 1. Consequently, the deterioration of the performance of the lens can be limited over a long time period.

A method of changing the refractive index stepwise by electrophoresis will be described. When the nanoparticles positively charged and negatively charged (hereinafter referred to as charged particles) are moved by electrophoresis, the amount of the moved charged particles can be changed according to the waveform and the pattern of the applied voltage. An optical element capable of changing the refractive index stepwise can be obtained as a result of use of the method of changing the amount of the charged particles positioned in the light passage region 10a in the lens body 10. A method of applying a rectangular wave is preferably used to change the amount of charged particles. In a document "IDWO3 Proceedings (Proceedings of the 10th International Display Workshops), p 239, 2003", an example of 4-step-gradation display by electrophoresis is reported. An example of 8-step-gradation display is also reported in "IDWO3 Proceedings, p 243, 2003". It is possible to change the amount of charged particles stepwise by using one of the application methods for the display described in this document.

An embodiment of the lens body will be described.

Nanoparticles of titanium oxide were used as dispersoid 13 in the embodiment of the lens body 10. The titanium oxide nanoparticles were prepared by a method described below. Hydrous titanium oxide was made formless by an alkali, thereafter aged in hydrochloric acid, and formed into particles having a particle size of 10 nm by a heat treatment. The surfaces of the particles were processed by using a titanium coupling agent (isopropyl triisostearoyl titanate) solution. An optical element was made as the lens body 10 by dispersing the thus-obtained titanium oxide nanoparticles in ISOPAR (a product from Exxon Corporation).

When about 20% by volume of the titanium oxide nanoparticles (having a refractive index of 2.30) were mixed in ISOPAR (having a refractive index of 1.48), the refractive index changed from 1.48 to 1.644. In the case of mixing of about 30% by volume, the refractive index changed from 1.48 to 1.726. By using these mixtures, lenses (mediums containing nanoparticles) having the following shape as shown in FIG. 3 were made.

Figure 3:
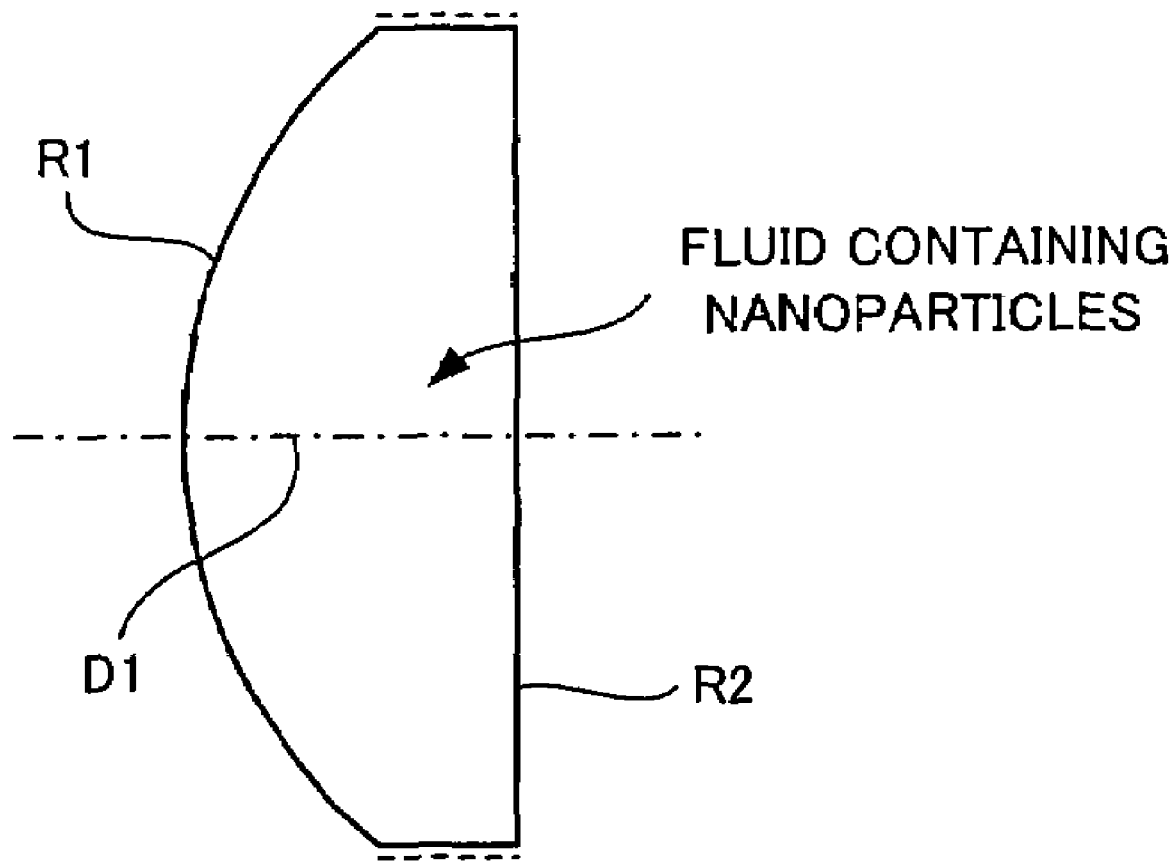
FIG. 3 is a diagram showing the radius of curvature and thickness of lenses having mediums containing nanoparticles.

FIG. 3 is a diagram showing the radius of curvature and thickness of lenses having mediums containing nanoparticles.

| Lens curvature R1: | 5.00 mm |
| Lens thickness D1: | 3.00 mm |
| Lens curvature R2: | infinity |

(1_1) In the case where only ISOPAR (refractive index: 1.48) was contained,

| Focal length: | 10.42 mm |
| Back focus: | 8.39 mm |
| Front focus: | −10.42 mm |

(1_2) In the case where 20% of titanium oxide nanoparticles were mixed (refractive index: 1.644)

| Focal length: | 7.76 mm |
| Back focus: | 5.94 mm |
| Front focus: | −7.76 mm |

(1_3) In the case where 30% of titanium oxide nanoparticles were mixed (refractive index: 1.726)

| Focal length: | 6.89 mm |
| Back focus: | 5.15 mm |
| Front focus: | −6.89 mm |

Thus, the lens was capable of changing the focal length from 10.42 to 7.76 or to 6.89.

Figure 4:
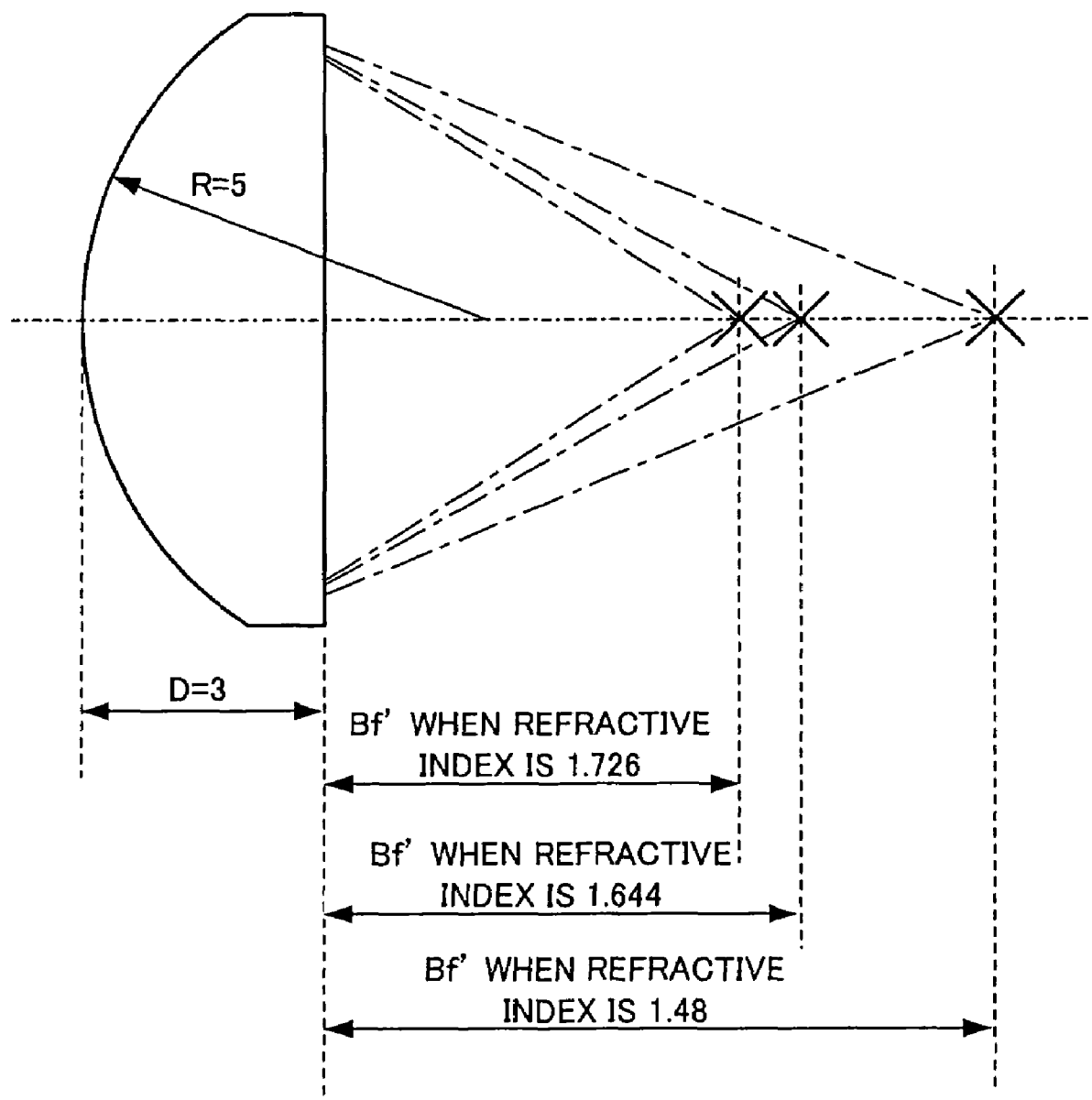
FIG. 4 is a diagram showing the back focus of the lens body when the refractive index is selectively set to 1.48, 1.644 and 1.726.

FIG. 4 is a diagram showing the back focus of the variable-focus lens when the refractive index was selectively set to 1.48, 1.644 and 1.726.

When the refractive index was selectively set to 1.48, 1.644 and 1.726, the focal length of the lens body was 10.42, 7.76 and 6.89, as described above. Back focus values corresponding to these focal length values are as shown in FIG. 4. The back focus Bf is maximum (8.39) when the refractive index is 1.48, as shown in FIG. 4. The back focus Bf is reduced (to 5.94 and to 5.15) as the refractive index is changed to 1.644 and to 1.726.

A lens (a medium containing nanoparticles) using a combination of an ordinary glass (BK7; refractive index 1.51633) and the above-described lens body was made, as described below.

Figure 5:
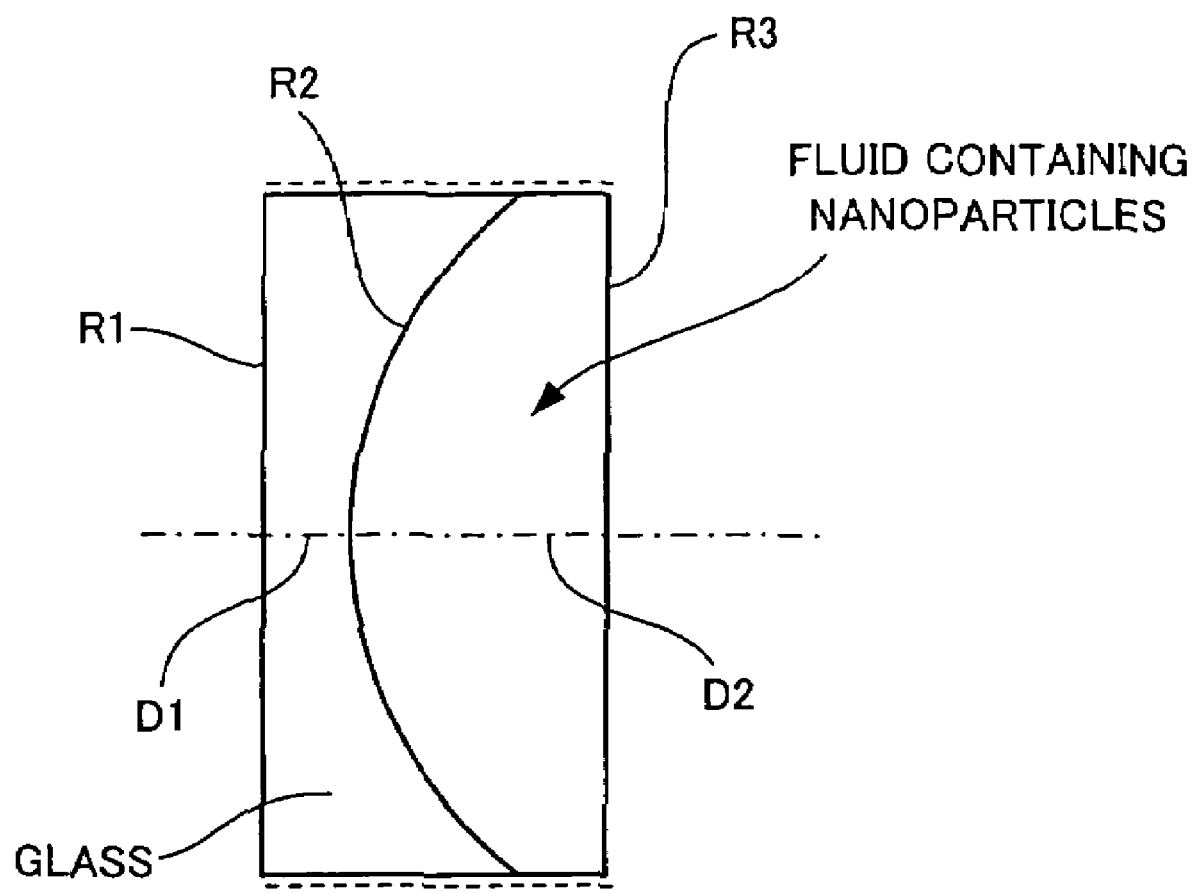
FIG. 5 is a diagram showing the radius of curvature and thickness of lenses combined with the ordinary glass.

FIG. 5 is a diagram showing the radius of curvature and thickness of lenses combined with the ordinary glass.

| Glass radius curvature R1: | infinity |
| Glass thickness D1: | 1.00 mm |
| Lens curvature R2: | 5.00 mm |
| Lens thickness D2: | 3.00 mm |
| Lens radius curvature R3: | infinity |

(2_1) In the case where only ISOPAR (refractive index: 1.48) was contained,

| Focal length: | −137.6 mm |
| Back focus: | −133.7 mm |
| Front focus: | 138.3 mm |

(2_2) In the case where 20% of titanium oxide nanoparticles were mixed (refractive index: 1.644)

| Focal length: | 39.2 mm |
| Back focus: | 37.3 mm |
| Front focus: | −38.5 mm |

(2_3) In the case where 30% of titanium oxide nanoparticles were mixed (refractive index: 1.726)

| | |
|---|---|
| Focal length: | 23.8 mm |
| Back focus: | 22.1 mm |
| Front focus: | −23.2 mm |

Thus, the variable-focus lens was capable of changing the focal length from −137.6 to 39.2 or to 23.8.

Further, a lens having nanoparticles enclosed in an ordinary glass (BK7; refractive index 1.51633) was made, as described below.

Figure 6:
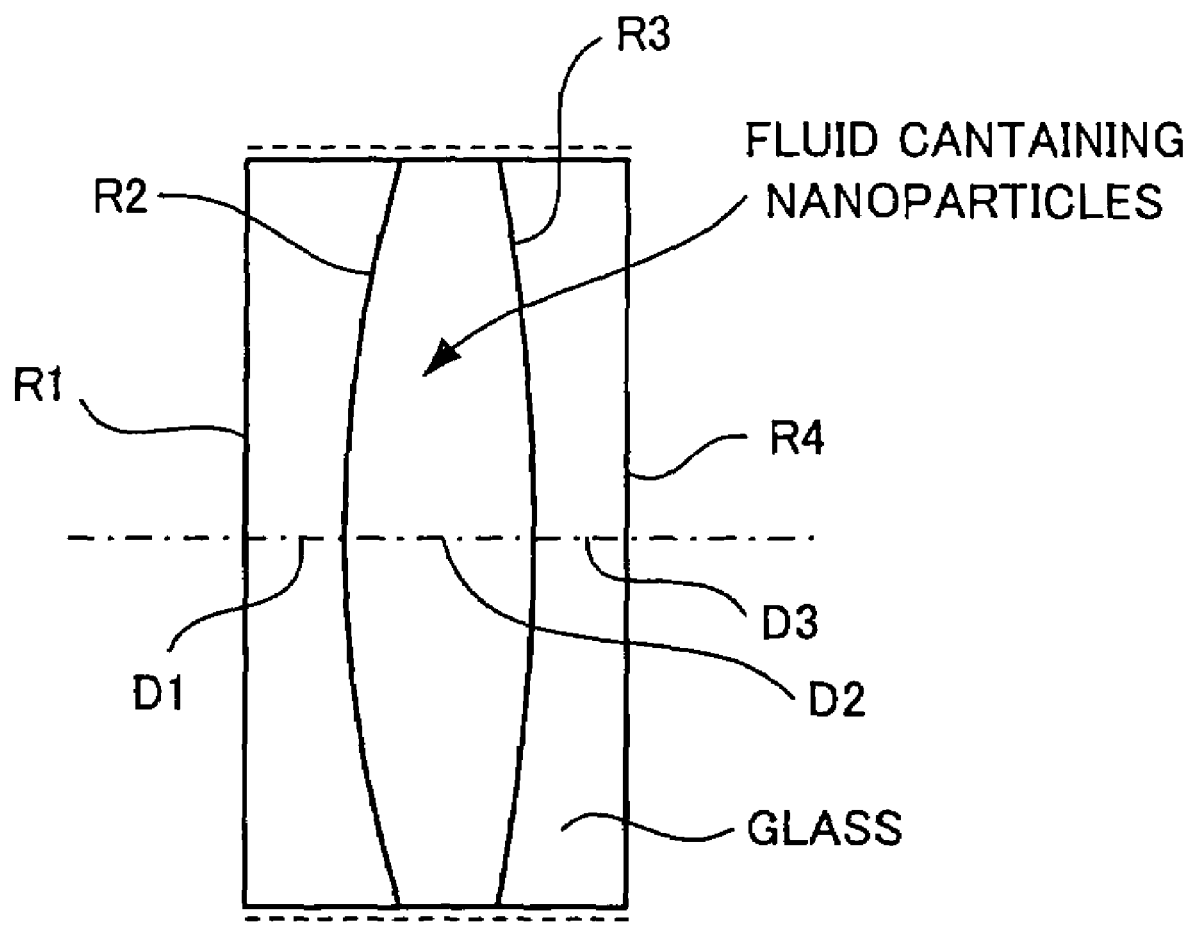
FIG. 6 is a diagram showing the radius of curvature and thickness of a lens in which nanoparticles are enclosed in ordinary glass.

FIG. 6 is a diagram showing the radius of curvature and thickness of the lens having nanoparticles enclosed in an ordinary glass.

| | |
|---|---|
| First glass radius curvature R1: | infinity |
| First glass thickness D1: | 1.00 mm |
| Second glass radius curvature R2: | 13.634 mm |
| Second glass thickness D2: | 2.00 mm (a medium containing nanoparticles) |
| Third glass radius curvature R3: | −20.2 mm |
| Third glass thickness D3: | 1.00 mm |
| Fourth glass radius curvature R4: | infinity |

(3_1) In the case where only ISOPAR (refractive index: 1.48) was contained,

| | |
|---|---|
| Focal length: | −223.7 mm |
| Back focus: | −225.2 mm |
| Front focus: | 224.9 mm |

(3_2) In the case where 20% of titanium oxide nanoparticles were mixed (refractive index: 1.644)

| | |
|---|---|
| Focal length: | 64.1 mm |
| Back focus: | 62.7 mm |
| Front focus: | −62.9 mm |

(3_3) In the case where 30% of titanium oxide nanoparticles were mixed (refractive index: 1.726)

| | |
|---|---|
| Focal length: | 39.1 mm |
| Back focus: | 37.7 mm |
| Front focus: | −38.0 mm |

Thus, the variable-focus lens was capable of changing the focal length from −223.7 to 64.1 or to 39.1.

The operation of the variable-focus lens 1 shown in FIG. 1 will now be described with reference to FIG. 7.

Figure 7:
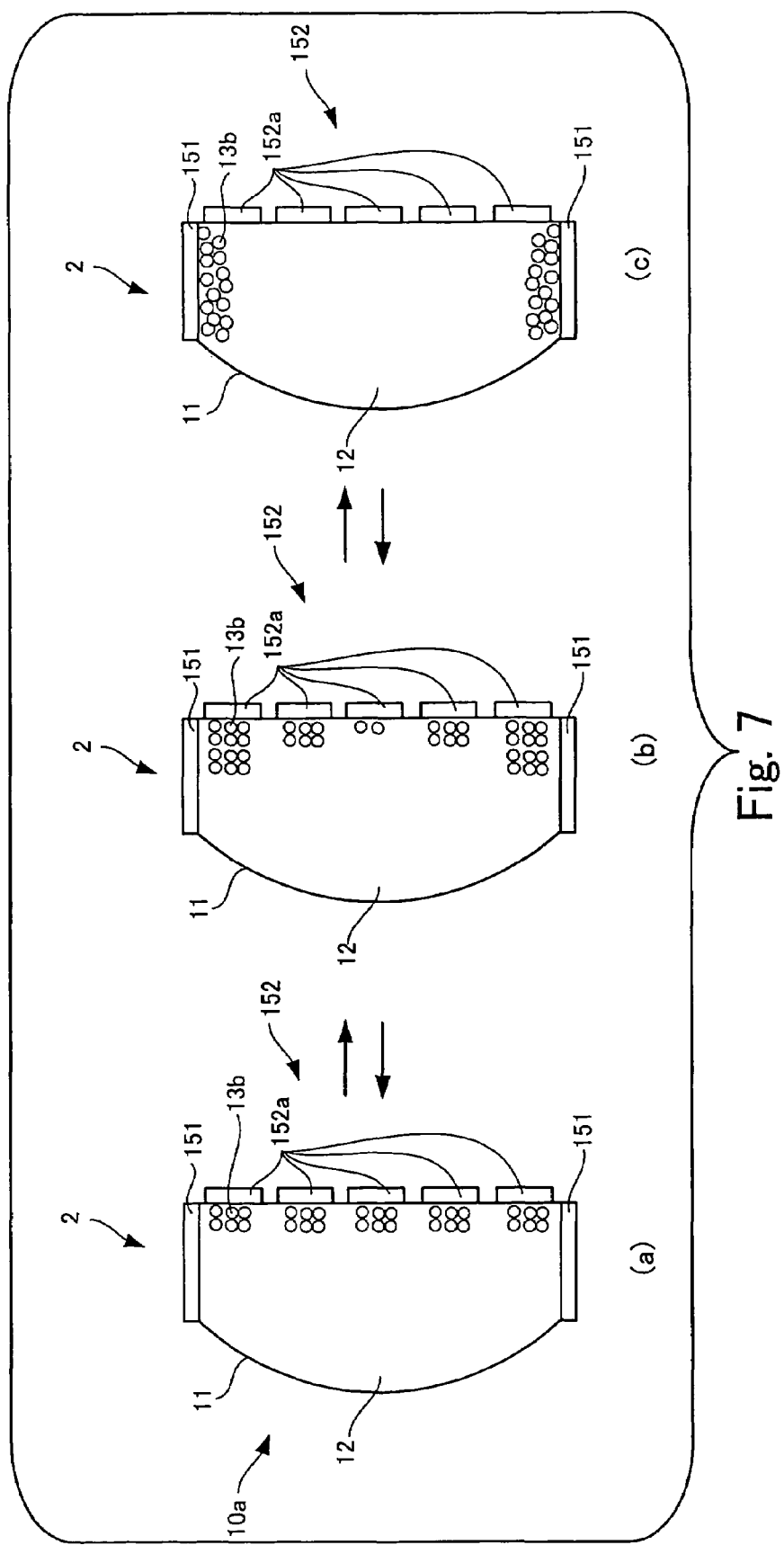
FIG. 7 is a diagram for explaining the operation of the variable-focus lens shown in FIG. 1.

FIG. 7 is a diagram for explaining the operation of the variable-focus lens.

The illustration of the focal length changing section 3 is omitted to simplify the figure.

If a negative voltage and a positive voltage are respectively applied from the focal length changing section 3 to the first and second electrodes 151 and 152 provided on the lens body 2 shown in part (a) of FIG. 7, then the first and second electrodes 151 and 152 function as a cathode and an anode, respectively. It is assumed here that the positive voltages applied to the electrode elements 152a constituting the second electrode 152 are equal to each other. Accordingly, in this case, equal amounts of nanoparticles 13b are respectively attracted to the electrode elements 152a.

If a positive voltage of a highest level is applied to the electrode elements 152a at the opposite ends in the electrode elements constituting the second electrode 152; a positive voltage of a lowest level is applied to the central electrode 152a; and a positive voltage of a medium level is applied to the electrode elements 152a positioned between the electrode elements 152a at the opposite ends and the central electrode element 152a, then the largest amount of nanoparticles 13b, the smallest amount of nanoparticles 13b and a medium amount of nanoparticles 13b are respectively attracted to the electrode elements 152a at the opposite ends, the central electrode element 152a and the electrode elements 152a positioned between the electrode elements 152a at the opposite ends and the central electrode element 152a, as shown in part (b) of FIG. 7.

Further, if a positive voltage and a negative voltage are respectively applied to the first and second electrodes 151 and 152, then the first and second electrodes 151 and 152 function as an anode and a cathode, respectively, and nanoparticles 13b are attracted to the first electrode 151, as shown in part (c) of FIG. 7. The distribution of nanoparticles 13b is thus controlled to change the focal length of the light passage region 10a in three steps. As a result, there is obtained a variable-focus lens whose focal length is changed in three steps according to a positive refractive index determined by the dispersion medium 12 and the amount of movement of the nanoparticles 13b in the light passage region 10a caused by electrophoresis.

Figure 8:
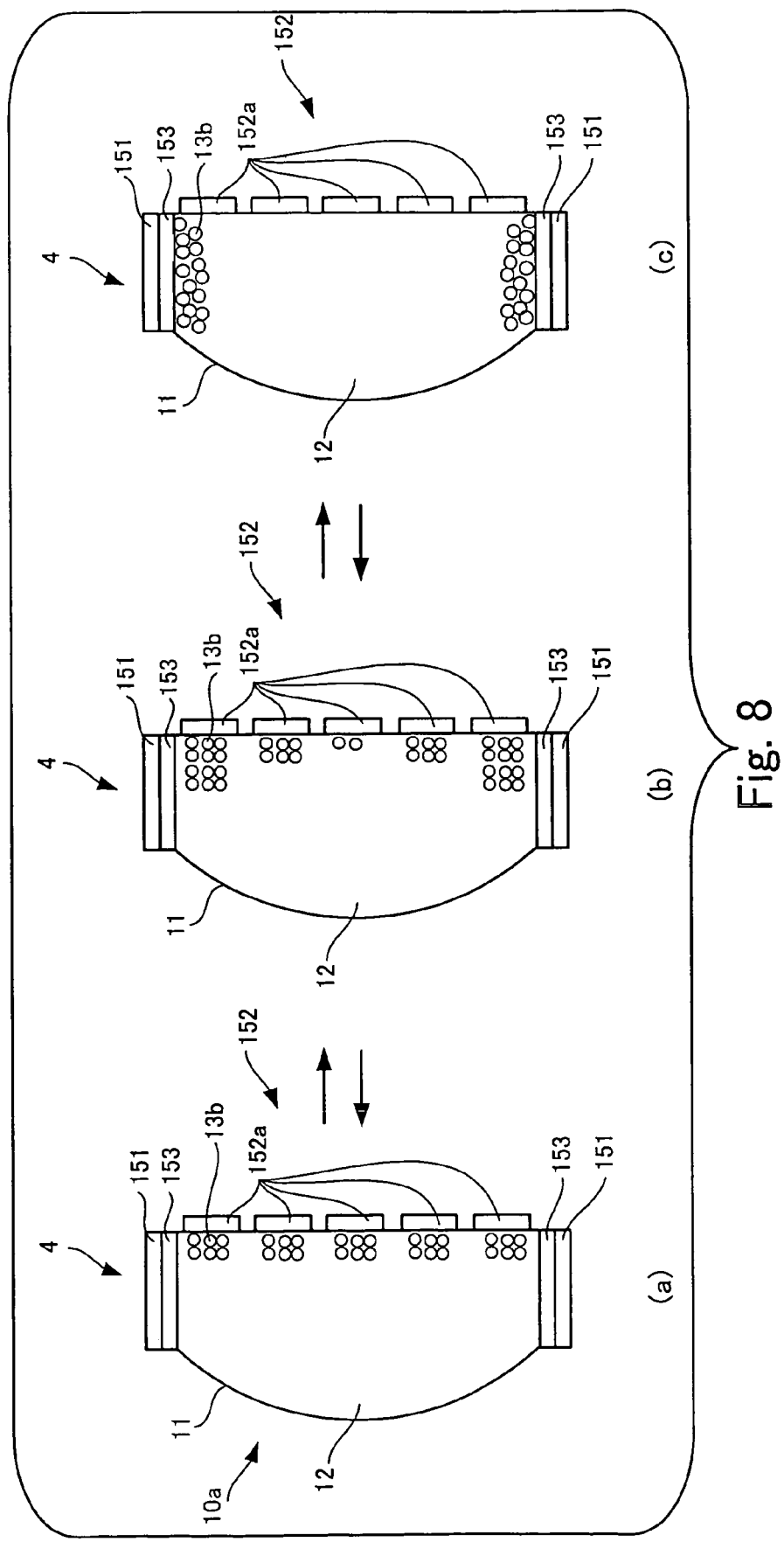
FIG. 8 is a diagram showing a sectional configuration of a lens body in which the inner surface of an electrode is coated with an insulating film.

FIG. 8 is a diagram showing a sectional configuration of a lens body in which the inner surface of an electrode is coated with an insulating film.

The lens body 4 shown in FIG. 8 differs from the lens body 2 shown in FIG. 7 in that the inner surface of the electrode 151 is coated with an insulating film 153 and the insulating film 153 is placed adjacent to the dispersion medium 12. In this lens body 4, the insulating film 153 provided as a coating on the inner surface of the electrode 151 prevents agglomeration of the nanoparticles 13b on the electrode 151. The insulating film 153 is a polyimide insulating film. Therefore, the electrode 151 has excellent heat resistance and durability. In the lens body 4 thus constructed, the focal length of light passing through the light passage region 10a may be changed in three steps by controlling voltages applied to the electrodes 151 and 152.

Figure 9:
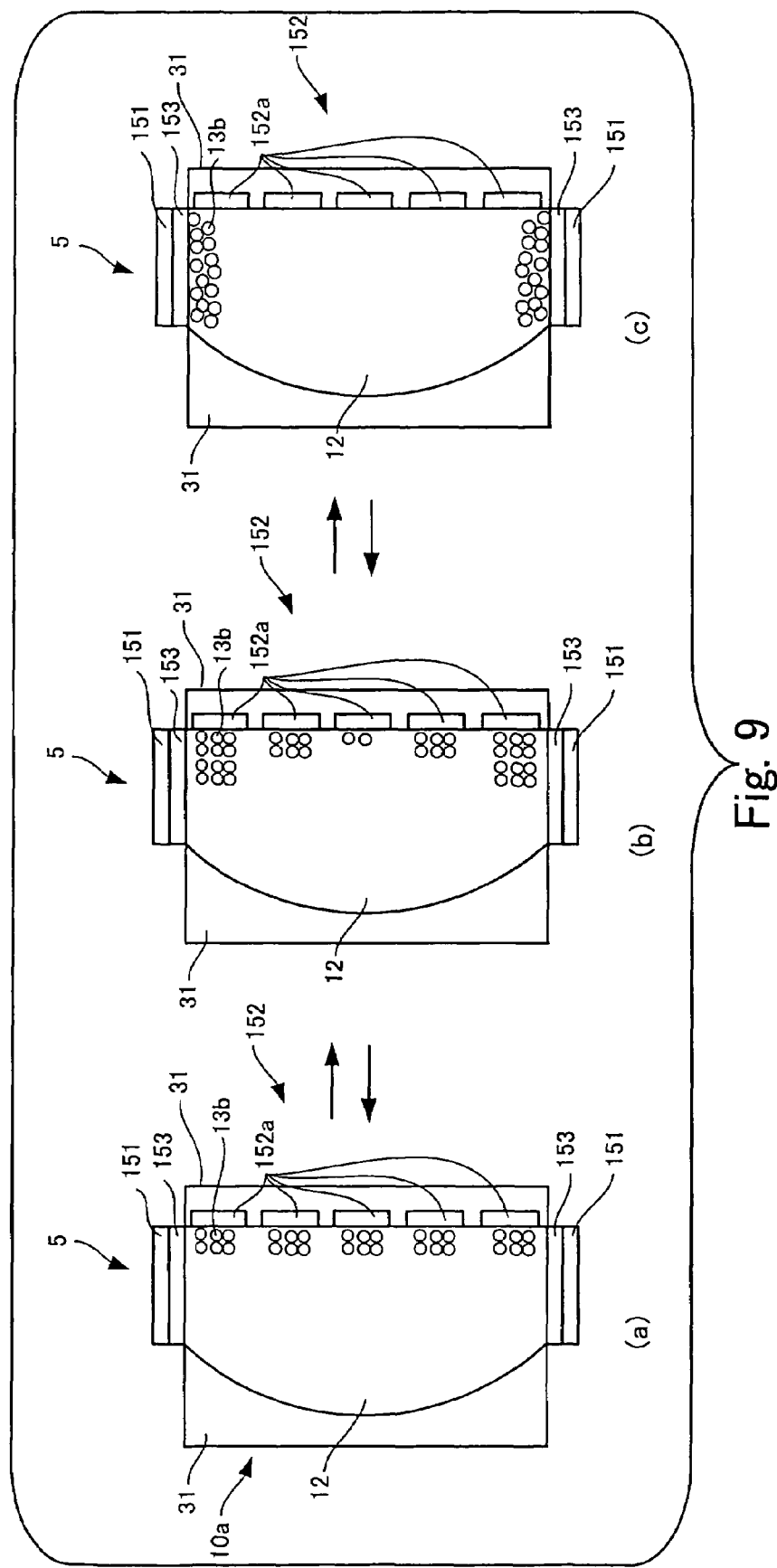
FIG. 9 is a diagram showing a sectional configuration of a lens body provided with a container formed of a plastic.

FIG. 9 is a diagram showing a sectional configuration of a lens body provided with a container 31 formed of a plastic.

The lens body 5 shown in FIG. 9 is provided with a container 31 which is light-transmissive at least in a light passage region 10a, and which has the shape of a lens. At least a portion of the container 31 in the light passage region 10a is formed of a plastic. Therefore, the container 31 can be realized as a lightweight container having high impact resistance. In the lens body 5 having the thus-formed container 31, the focal length of light passing through the light passage region 10a may be changed in three steps by controlling voltages applied to electrodes 151 and 152. The container 31 may be formed of glass instead of being formed of a plastic.

Figure 10:
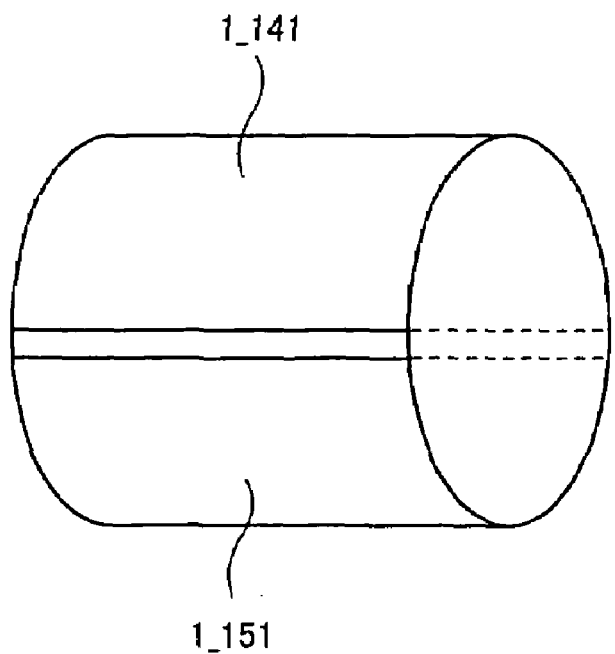
FIG. 10 is a diagram showing an example of the placement of electrodes.

FIG. 10 is a diagram showing an example of the placement of electrodes.

Electrodes 1_141 and 1_151 shown in FIG. 10 are placed on an upper surface and a lower surface, respectively, of a container constituting a lens body so as to surround a light passage region. Electrodes 1_141 and 1_151 may be placed in this manner and a negative voltage and a positive voltage for example may be respectively applied to the electrodes 1_141 and 1_151 to attract positive nanoparticles and negative nanoparticles to the upper surface and the lower surface of the container.

Figure 11:
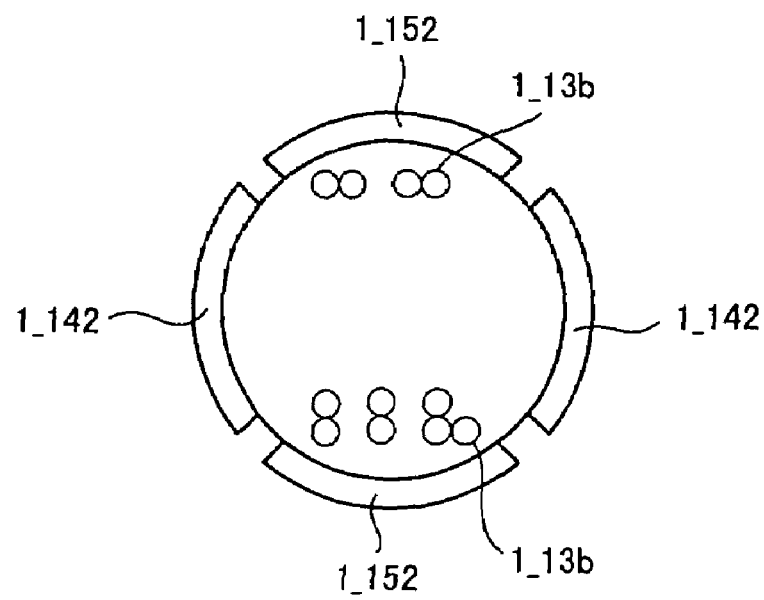
FIG. 11 is a diagram showing another example of the placement of electrodes.

FIG. 11 is a diagram showing another example of the placement of electrodes.

Referring to FIG. 11, first and second electrodes 1_142 are placed at left and right positions on a container constituting a lens body on the periphery of a light passage region, and third and fourth electrodes 1_152 are placed at upper and lower positions on the container constituting the lens body on the periphery of the light passage region. The electrodes may be placed in this manner; negative nanoparticles 1_13b may be dispersed in a dispersion medium; the first and second electrodes 1_142 may be used as a cathode; the third and fourth electrodes 1_152 may be used as an anode; and the positive voltage applied to the second electrode 1_152 may be set higher than that applied to the first electrode 1_152 to enable different amounts of nanoparticles 1_13b to be attracted to the third and fourth electrodes 1_152.

Figure 12:
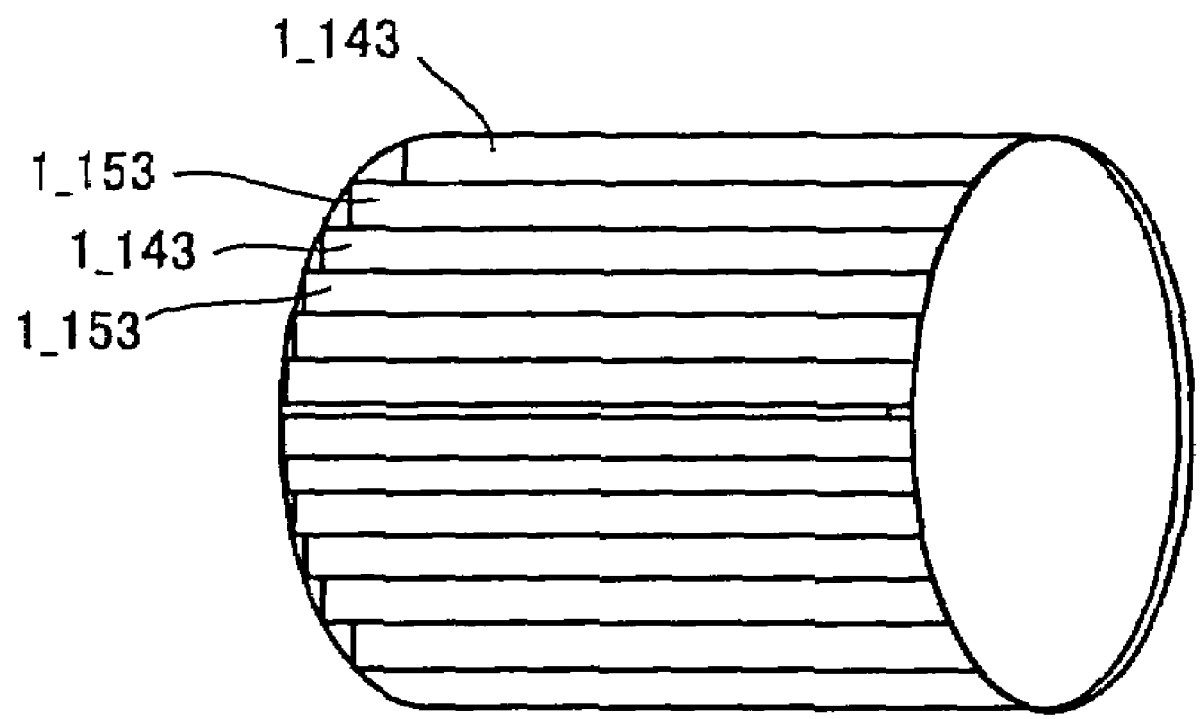
FIG. 12 is a diagram showing a further example of the placement of electrodes.

FIG. 12 is a diagram showing a further example of the placement of electrodes.

Referring to FIG. 12, cathodes 1_143 and anodes 1_153 are alternately placed on the side surface surrounding a light passage region in the surface of a container constituting a lens body. Cathodes 1_143 and anodes 1_153 may be placed in this manner to freely control the distributions of positive nanoparticles and negative nanoparticles 1_13b.

Figure 13:
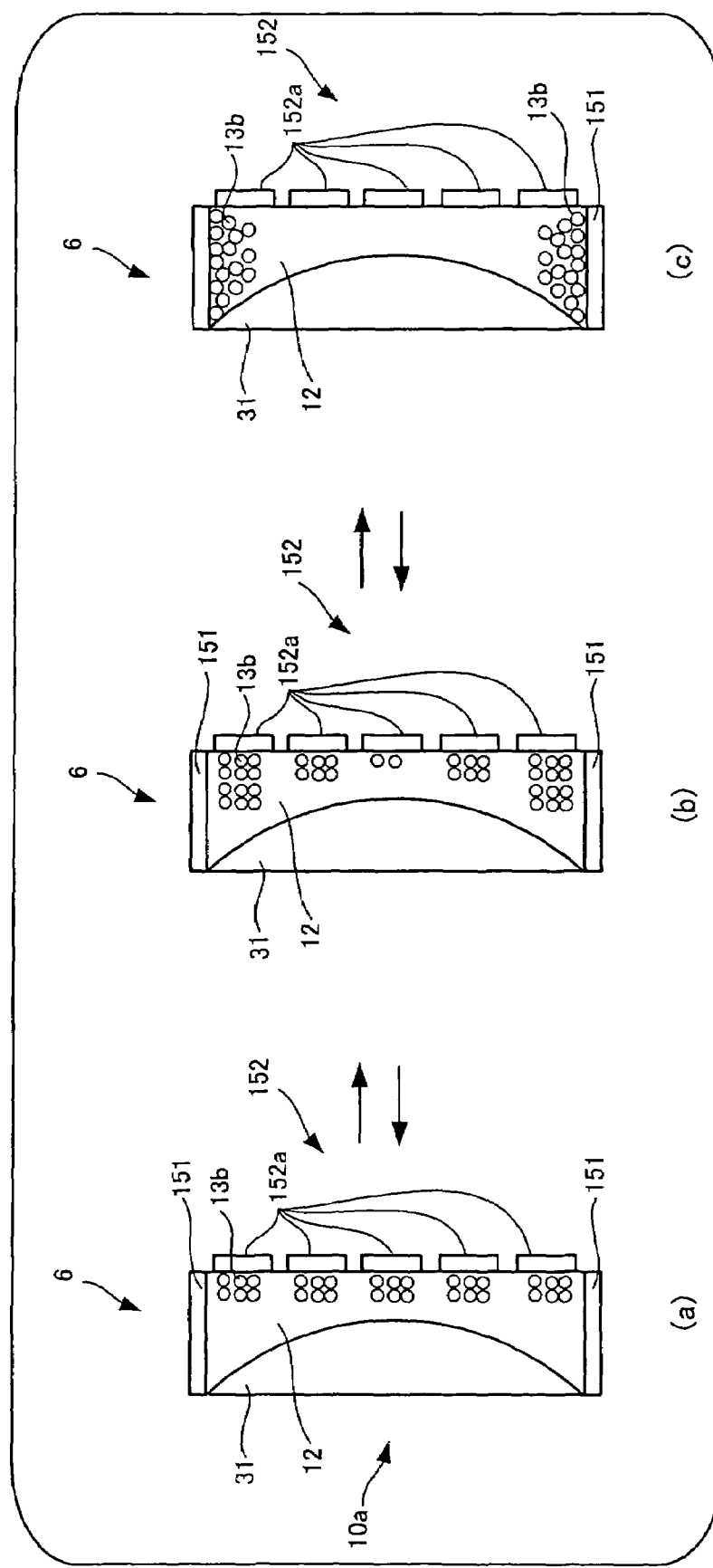
FIG. 13 is a diagram for explaining the operation of a variable-focus lens provided with a lens body having a negative refractive power.

FIG. 13 is a diagram for explaining the operation of a variable-focus lens having a lens body having a negative refractive power.

FIG. 13 shows a lens body 6 provided with a container 31 in which at least a light passage region 10a has the shape of a lens having a negative refractive power. If a negative voltage and a positive voltage are respectively applied to the first and second electrodes 151 and 152 provided on the lens body 6 shown in part (a) of FIG. 13, then the first and second electrodes 151 and 152 function as a cathode and an anode, respectively. It is assumed here that the positive voltages applied to the electrode elements 152a constituting the second electrode 152 are equal to each other. Accordingly, in this case, equal amounts of nanoparticles 13b are respectively attracted to the electrode elements 152a.

If a positive voltage of a highest level is applied to the electrode elements 152a at the opposite ends in the electrode elements constituting the second electrode 152; a positive voltage of a lowest level is applied to the central electrode 152a; and a positive voltage of a medium level is applied to the electrode elements 152a positioned between the electrode elements 152a at the opposite ends and the central electrode element 152a, then the largest amount of nanoparticles 13b, the small amount of nanoparticles 13b and a medium amount of nanoparticles 13b are respectively attracted to the electrode elements 152a at the opposite ends, the central electrode element 152a and the electrode elements 152a positioned between the electrode elements 152a at the opposite ends and the central electrode element 152a, as shown in part (b) of FIG. 13.

Further, if a positive voltage and a negative voltage are respectively applied to the first and second electrodes 151 and 152, then the first and second electrodes 151 and 152 function as an anode and a cathode, respectively, and nanoparticles 13b are attracted to the first electrode 151, as shown in part (c) of FIG. 13. The distribution of nanoparticles 13b is thus controlled to change the focal length of the light passage region 10a in three steps. As a result, there is obtained a variable-focus lens whose focal length is changed in three steps according to a negative refractive index determined by the dispersion medium 12 and the amount of movement of the nanoparticles 13b in the light passage region 10a caused by electrophoresis.

Figure 14:
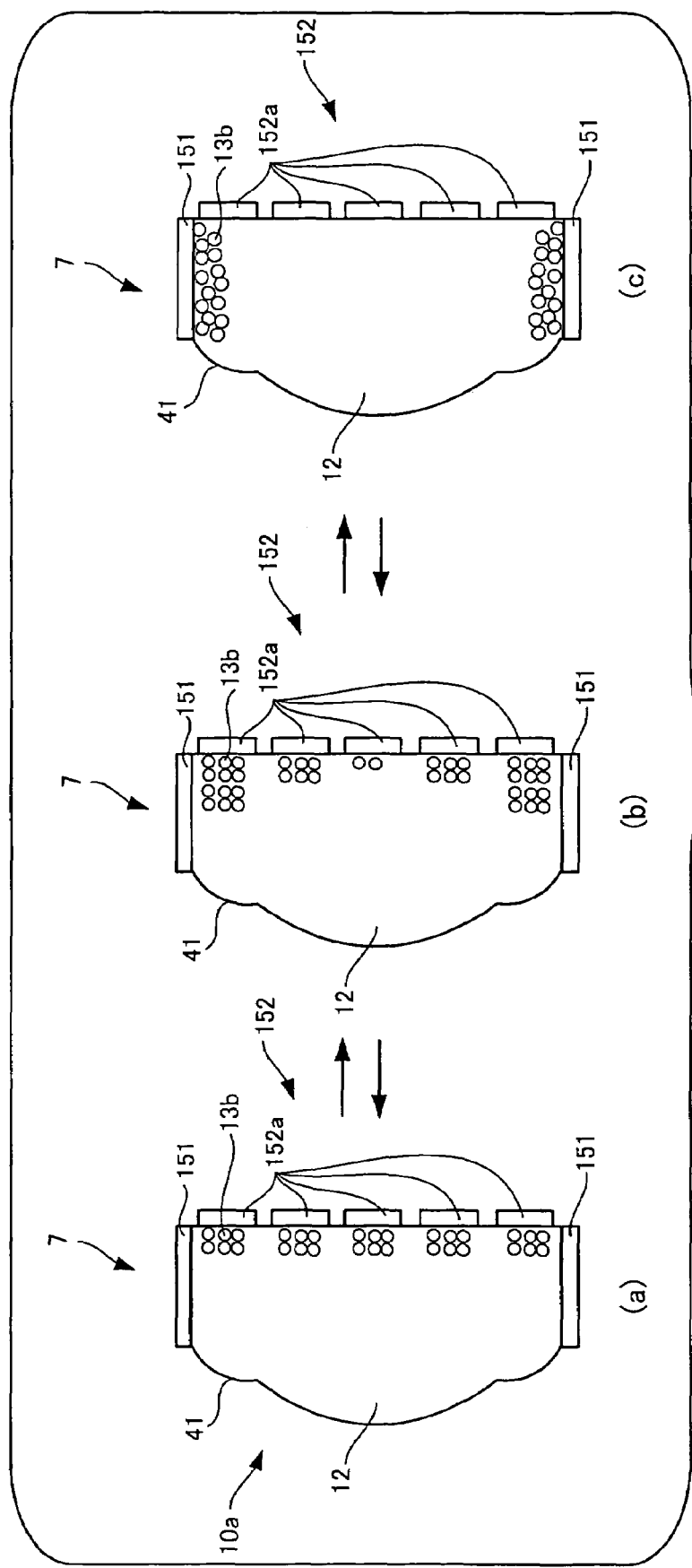
FIG. 14 is a diagram for explaining the operation of a variable-focus lens provided with a lens body having a container having the shape of an aspheric lens.

FIG. 14 is a diagram for explaining the operation of a variable-focus lens having a lens body provided with a container having the shape of an aspheric lens.

FIG. 14 shows a lens body 7 provided with a container 41 in which at least a light passage region 10a has the shape of an aspheric lens. The operation of the variable-focus lens having this lens body 7 is the same as that of the variable-focus lens having the lens body 6 shown in FIG. 13. Therefore the description of the operation will not be repeated. In this variable-focus lens having the lens body 7 provided with the container 41 having the shape of an aspheric lens, the focal length may be changed in three steps.

Figure 15:
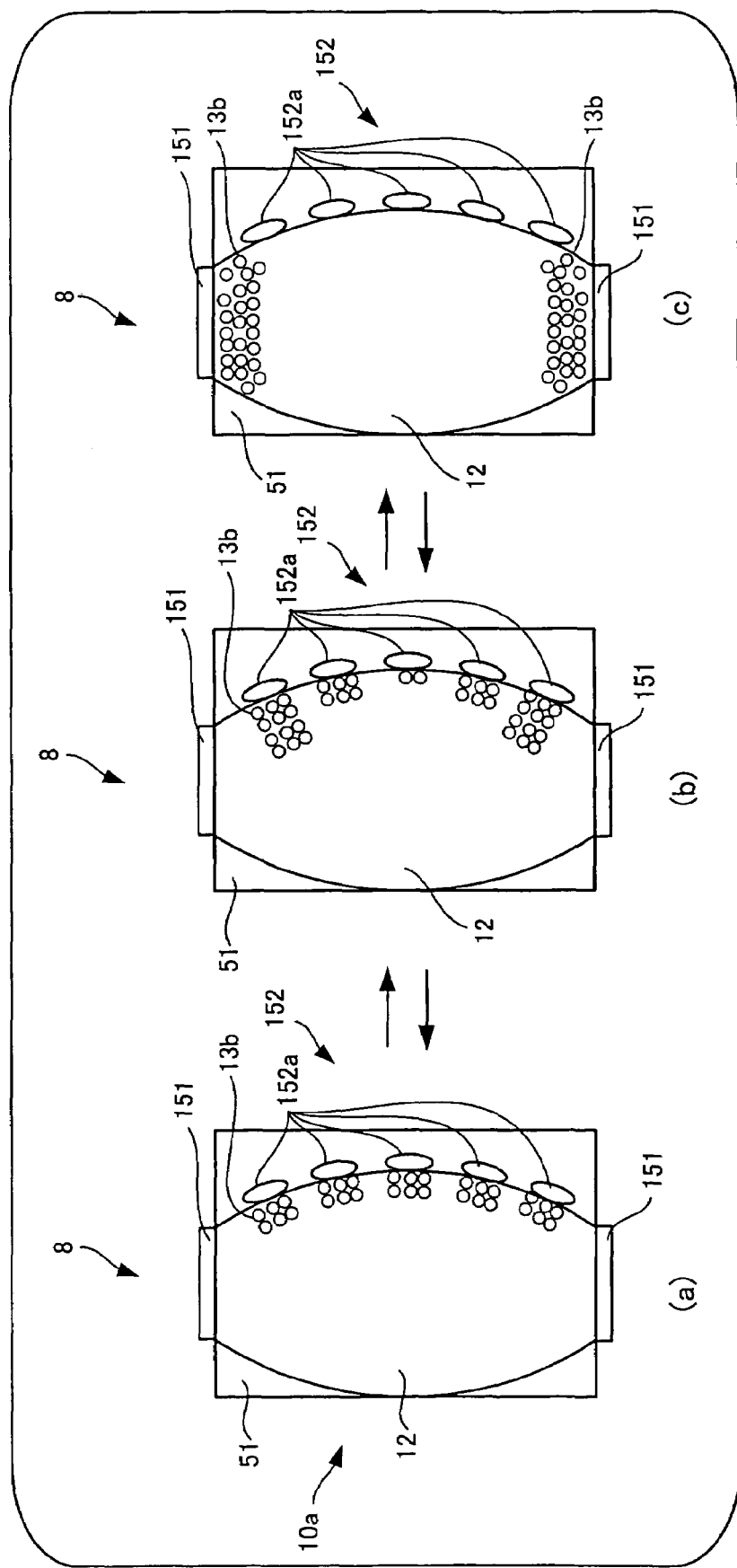
FIG. 15 is a diagram for explaining the operation of a variable-focus lens provided with a lens body having a container having the shape of a lens having two convex outer surfaces.

FIG. 15 is a diagram for explaining the operation of a variable-focus lens having a lens body provided with a container having the shape of a lens having two outwardly convex surfaces.

FIG. 15 shows a lens body 8 provided with a container 51 having the shape of a lens having two outwardly convex surfaces. The operation of the variable-focus lens having this lens body 8 is the same as that of the variable-focus lens having the lens body 6 shown in FIG. 13. Therefore the description of the operation will not be repeated. In this variable-focus lens having the lens body 8 provided with the container 51 having the shape of a lens having two outwardly convex surfaces, the focal length may be changed in three steps.

Figure 16:
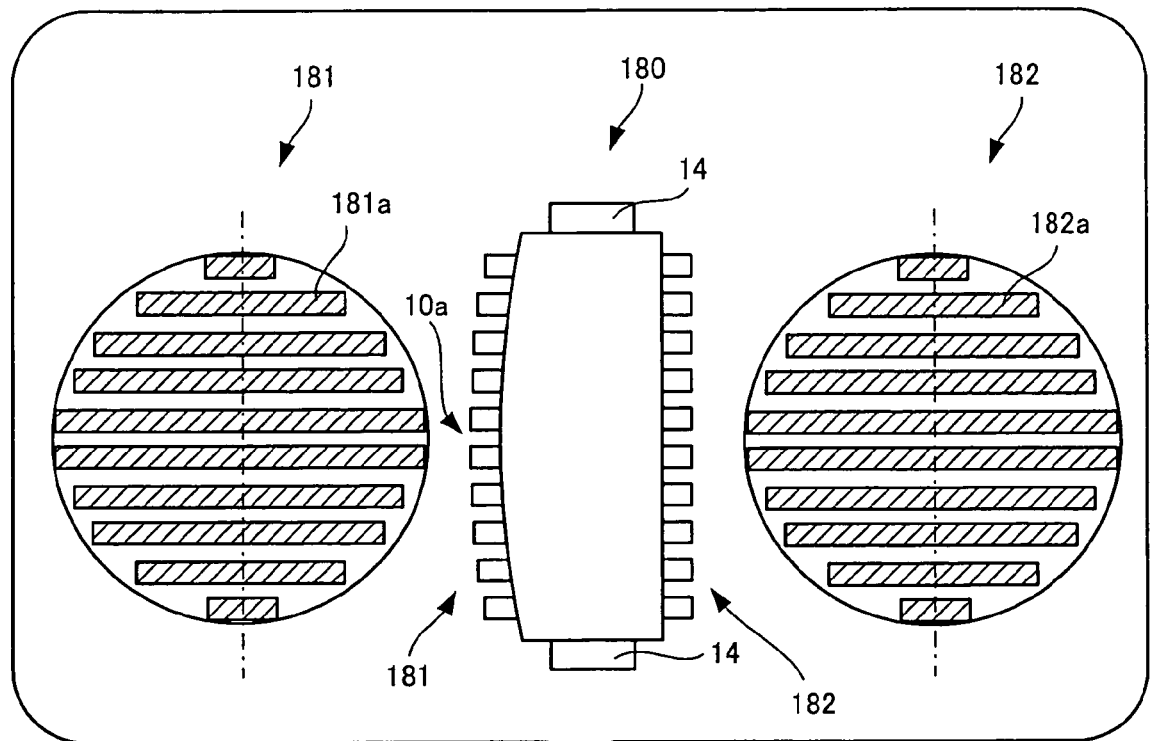
FIG. 16 is a diagram showing a sectional configuration of a first lens body having a devised electrode pattern.

FIG. 16 is a diagram showing a sectional configuration of a first lens body having a devised electrode pattern.

In the lens body 180 shown in FIG. 16, a cathode 14 is placed in such a position on a container as to surround a light passage region. In the lens body 180, an anode 181 having a pattern of electrode elements 181a in the form of horizontal stripes is placed on a front surface of the container in a light passage region 10a. Further, in the lens body 180, an anode 182 having a pattern of electrode elements 182a in the form of horizontal stripes is placed on a back surface of the container in the light passage region. Since the patterns of the electrode elements 181a and 182a of the anodes 181 and 182 in the lens body 180 are symmetrical, a prism effect can be realized by applying voltages such that the voltage value is gradually reduced (or increased) from the top to the bottom of the electrode patterns 181a and 182a. The thus-constructed lens body 180 may be provided in a camera together with an acceleration sensor for camera shake correction to perform vertical camera shake correction of a lens provided in the camera according to a signal from the acceleration sensor. Also, the thus-constructed lens body 180 may be provided in a viewfinder of a camera to make parallax correction.

Figure 17:
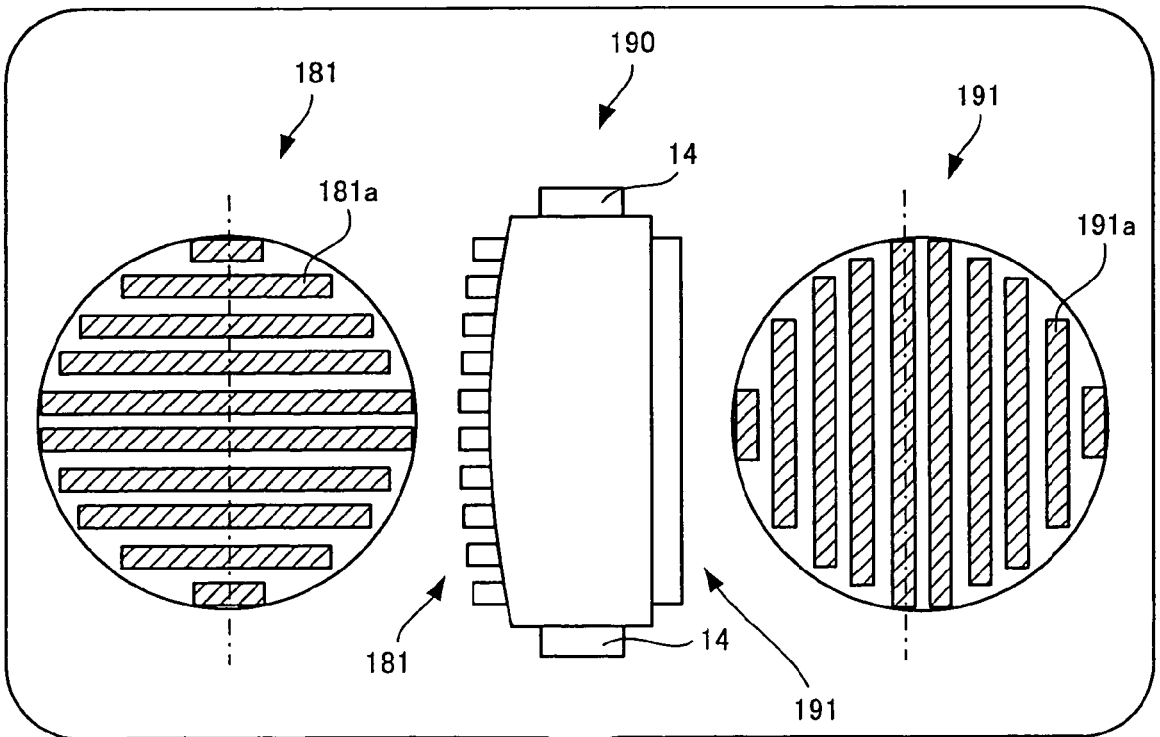
FIG. 17 is a diagram showing a sectional configuration of a second lens body having a devised electrode pattern.

FIG. 17 is a diagram showing a sectional configuration of a second lens body 190 having a devised electrode pattern.

The lens body 190 shown in FIG. 17 differs from the lens body 180 shown in FIG. 16 in that an anode 191 having a pattern of electrode elements 191a in the form of vertical stripes is provided in place of the anode 182 having the pattern of electrode elements 182a in the form of horizontal stripes. Camera shake correction and parallax correction along the vertical and horizontal directions of a lens may be performed by controlling the refractive index in the vertical direction by means of the electrode pattern 181a and controlling the refractive index in the horizontal direction by means of the electrode pattern 191a.

Figure 18:
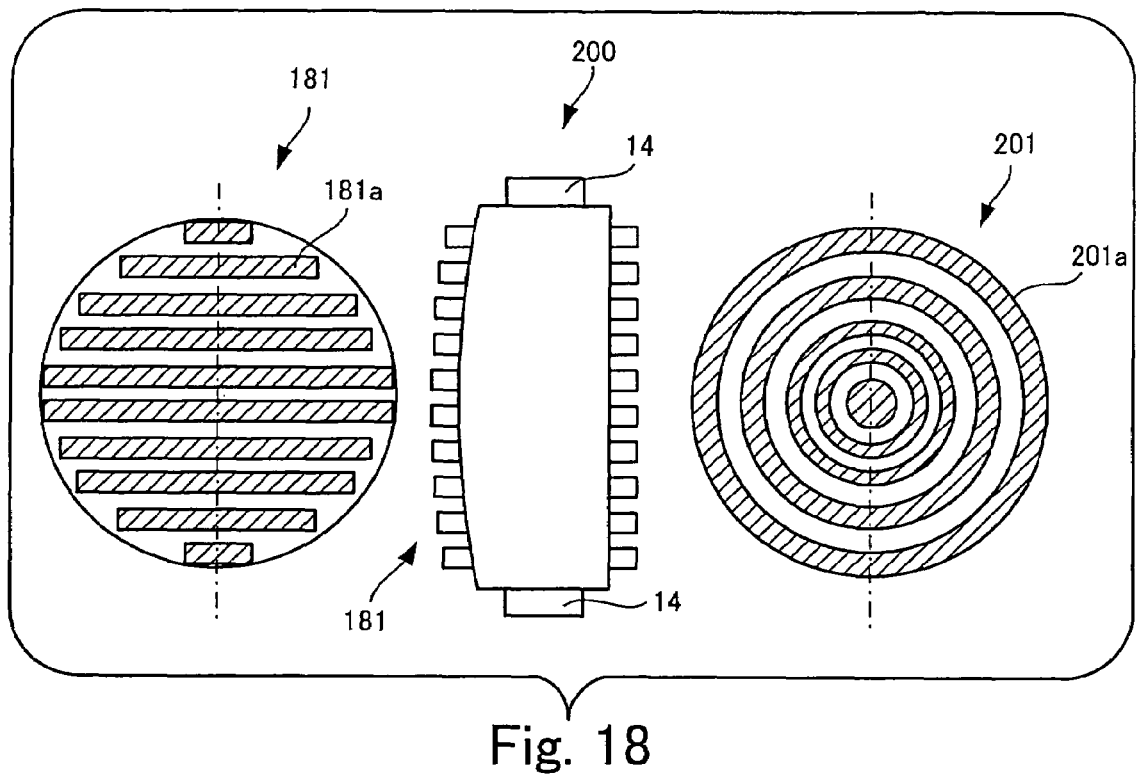
FIG. 18 is a diagram showing a sectional configuration of a third lens body having a devised electrode pattern.

FIG. 18 is a diagram showing a sectional configuration of a third lens body having a devised electrode pattern.

The lens body 200 shown in FIG. 18 differs from the lens body 190 shown in FIG. 17 in that an anode 201 having a pattern of electrode elements 201a in the form of concentric circles is provided in place of the anode 191 having a pattern of electrode elements 191a in the form of vertical stripes. An image-taking lens using one lens body 200 for camera shake correction and for focusing may be implemented by realizing a convex lens by means of the electrode pattern 201a and by realizing a prism effect by means of the electrode pattern 181a. Also, this lens body 200 may be used in a viewfinder optical system of a camera having a zoom lens to realize a zoom finder capable of changing according to the field of view changed by the zoom lens. Further, the same anode as the anode 201 having the pattern of concentric-circle electrode elements 201a may be provided in place of the anode 181 having the pattern of electrode elements 181a in the form of horizontal stripes. This anode and the anode 201 enable nanoparticles to move rapidly in the case of increasing the positive refractive power for example.

Figure 19:
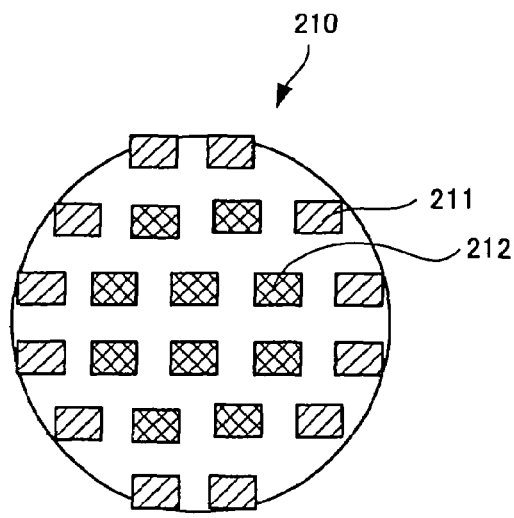
FIG. 19 is a diagram showing an example of an anode having an electrode pattern in matrix form.

FIG. 19 is a diagram showing an anode having a pattern of electrode elements in matrix form.

An electrode 210 shown in FIG. 19 has a pattern of electrode elements 211 placed in a peripheral region and a pattern of electrode elements 212 in matrix form placed in a central region. The pattern of electrode elements 211 placed in a peripheral region function as a cathode, while the pattern of electrode elements 212 placed in a central region function as an anode. A lens body having this electrode 210 may be placed adjacent to an ordinary lens, and an aberration of the lens may be corrected as described below. An aberration correction table formed of data for correcting an aberration of the lens is prepared and the distribution of nanoparticles is controlled by applying the voltage to the electrode 210 in matrix form according to the data in the aberration correction table. The refractive index of the optical member is thereby controlled so that the aberration of the lens is corrected.

The electrophoretic optical unit having the shape of a lens has been described. Description will now be made of an electrophoretic optical unit having a flat shape. The same components of the optical unit described below as those of the optical unit having the shape of a lens are indicated by the same reference characters, and description will be made only of points of difference.

Figure 20:
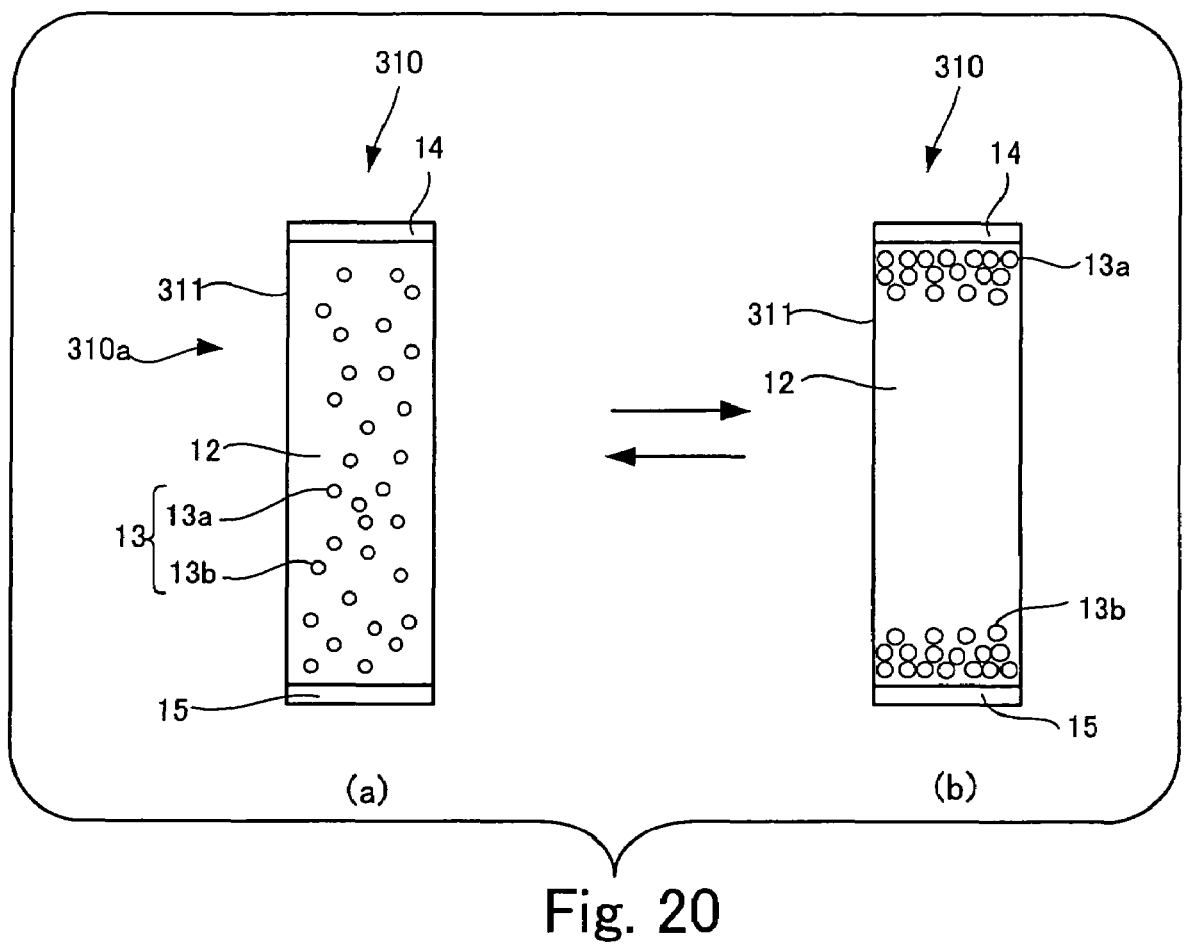
FIG. 20 is a diagram showing a sectional configuration of a lens body having a flat external shape.

FIG. 20 is a diagram showing a sectional configuration of a lens body having a flat external shape.

The lens body 310 shown in part (a) and part (b) of FIG. 20 is provided with a container 311 which is light-transmissive at least in a light passage region 310a, and which has the shape of a flat plate as its external shape. The container 311 has a light-transmissive dispersion medium 12 and a dispersoid 13 (nanoparticles 13a positively charged and nanoparticles 13b negatively charged) enclosed therein, as does the container of the lens body 10 shown in FIG. 2.

When no voltage is applied between the cathode 14 and the anode 15, the dispersoid 13 is uniformly dispersed in the dispersion medium 12, as shown in part (a) of FIG. 20. The dispersoid 13 is constituted by nanoparticles 13a positively charged and nanoparticles 13b negatively charged. The lens body 310 in this state has a comparatively high refractive index resulting from the refractive index of the dispersion medium 12 and a refractive index determined by the amount (the number of particles) of dispersoid 13 uniformly dispersed in the dispersion medium 12.

When a predetermined voltage is applied between the cathode 14 and the anode 15, the positively charged nanoparticles 13a in the dispersoid 13 uniformly dispersed in the dispersion medium 12 are attracted to the cathode 14 and the negatively charged nanoparticles 13b are attracted to the anode 15, as shown in part (b) of FIG. 20. The lens body 310 therefore has a comparatively low refractive index determined by the refractive index of the dispersion medium 12 only. When the application of the voltage between the cathode 14 and the anode 15 is stopped, the lens body 310 is again settled in the state shown in part (a) of FIG. 20.

Figure 21:
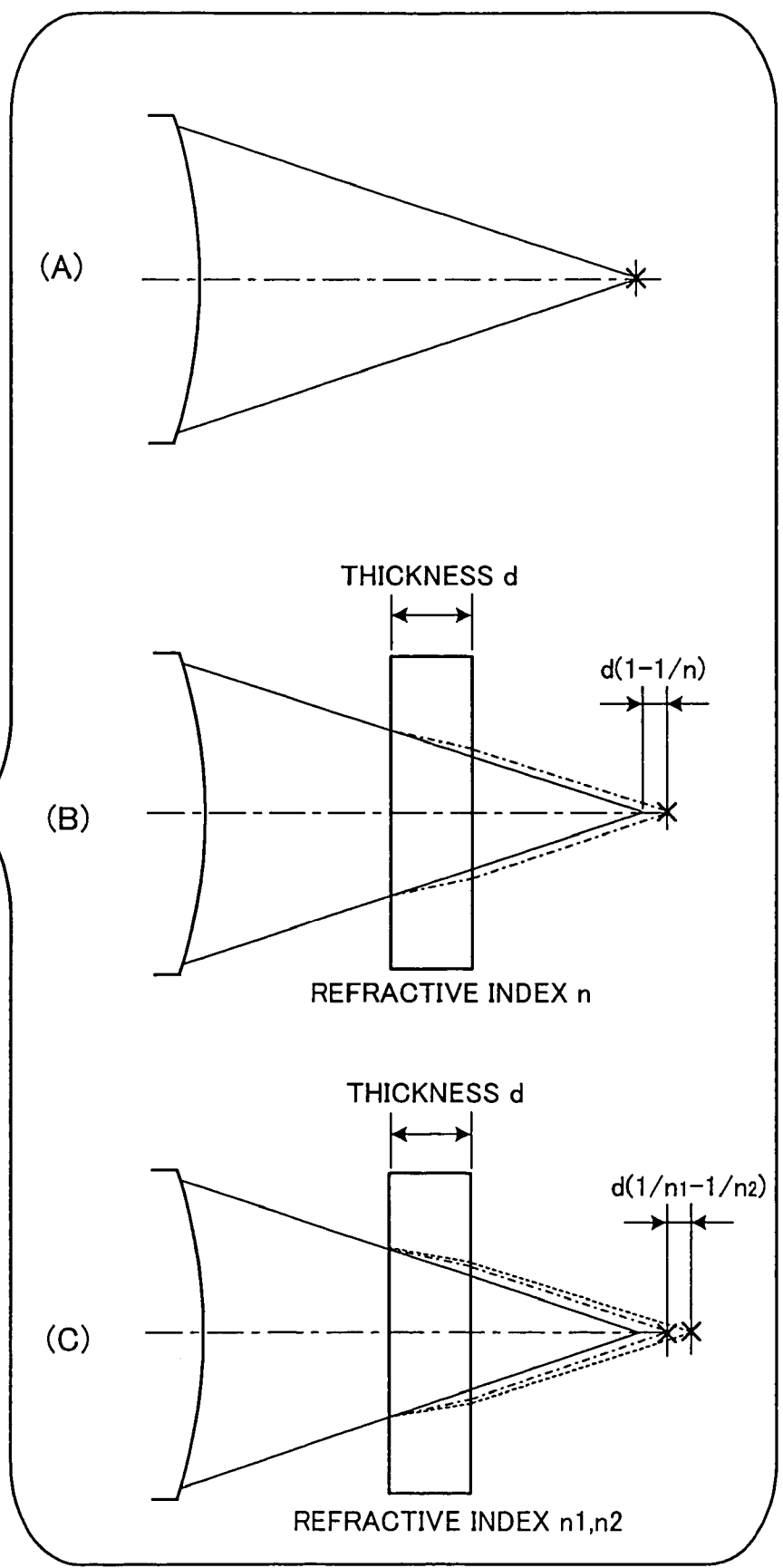
FIG. 21 is a diagram for explaining shifting of an imaging point in the lens body having a flat external shape.

FIG. 21 is a diagram for explaining shifting of an imaging point in a lens body having a flat external shape.

An imaging point at which an image is formed by subject light from a convex lens is imaged is shown in part (A) of FIG. 21. A lens body having a thickness d and a refractive index n is inserted in the image space, as shown in part (B) of FIG. 21. The equivalent air length of the lens body is expressed as a value (d/n) obtained by dividing the thickness d by the refractive index n. Consequently, the imaging point is shifted rearward (to the left as viewed in FIG. 21) by d $(1-1/n)$.

In a case where two lens bodies having the same thickness d and having different refractive indices (n1 and n2) are provided and selectively inserted in the image space, the difference $\Delta d$ between the imaging points determined by the lens bodies is d $(1/n1-1/n2)$, as shown in part (C) of FIG. 21. Since the distance of the imaging point from the rear focus in a lens system having a focal length f when the object distance is D is $f^2/D$, focusing to an infinite-distance object and an object at the distance shown by $f^2/D$ can be performed by inserting and removing the lens bodies having the difference refractive indices. Adjustment of the focal length for this focusing can be performed by controlling the refraction of light through electrophoresis of the dispersoid 13 using the lens body 310 shown in FIG. 20 instead of inserting and removing the two lens bodies.

The operation of a variable-refractive-index plate will be described with reference to FIG. 22.

Figure 22:
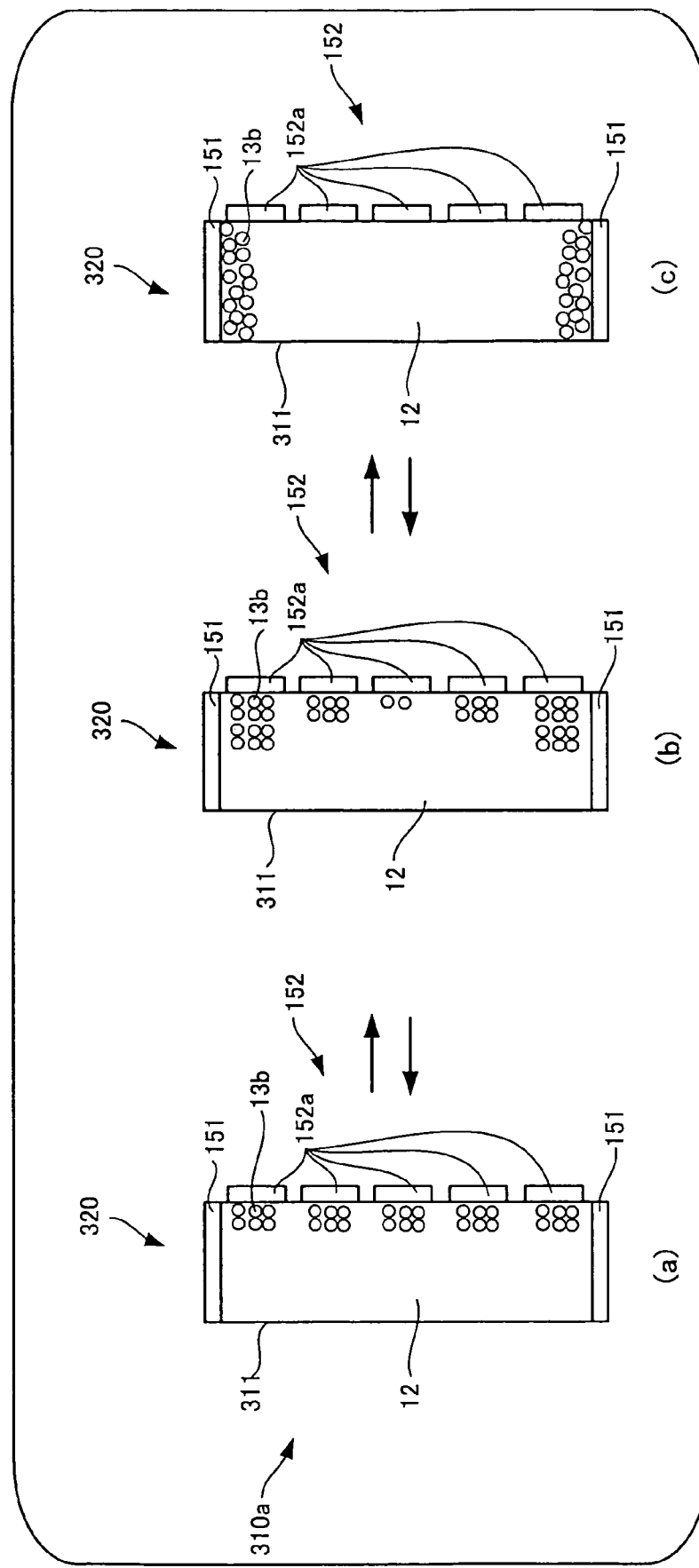
FIG. 22 is a diagram for explaining the operation of a variable-refractive-index plate.

FIG. 22 is a diagram for explaining the operation of a variable-refractive-index plate.

If a negative voltage and a positive voltage are respectively applied from the focal length changing section 3 shown in FIG. 1 to first and second electrodes 151 and 152 provided on a lens body 320 shown in part (a) of FIG. 22, then the first and second electrodes 151 and 152 function as a cathode and an anode, respectively. It is assumed here that the positive voltages applied to electrode elements 152a constituting the second electrode 152 are equal to each other. Accordingly, in this case, equal amounts of nanoparticles 13b are respectively attracted to the electrode elements 152a.

If a positive voltage of a highest level is applied to the electrode elements 152a at the opposite ends in the electrode elements constituting the second electrode 152; a positive voltage of a lowest level is applied to the central electrode 152a; and a positive voltage of a medium level is applied to the electrode elements 152a positioned between the electrode elements 152a at the opposite ends and the central electrode element 152a, then the largest amount of nanoparticles 13b, the small amount of nanoparticles 13b and a medium amount of nanoparticles 13b are respectively attracted to the electrode elements 152a at the opposite ends, the central electrode element 152a and the electrode elements 152a positioned between the electrode elements 152a at the opposite ends and the central electrode element 152a, as shown in part (b) of FIG. 22.

Further, if a positive voltage and a negative voltage are respectively applied to the first and second electrodes 151 and 152, then the first and second electrodes 151 and 152 function as an anode and a cathode, respectively, and nanoparticles 13b are attracted to the first electrode 151, as shown in part (c) of FIG. 22. The distribution of nanoparticles 13b is thus controlled to change the focal length of the light passage region 10a in three steps. As a result, there is obtained a variable-focus lens whose focal length is changed in three steps according to a positive refractive index determined by the dispersion medium 12 and the amount of movement of the nanoparticles 13b in the light passage region 310a caused by electrophoresis.

Figure 23:
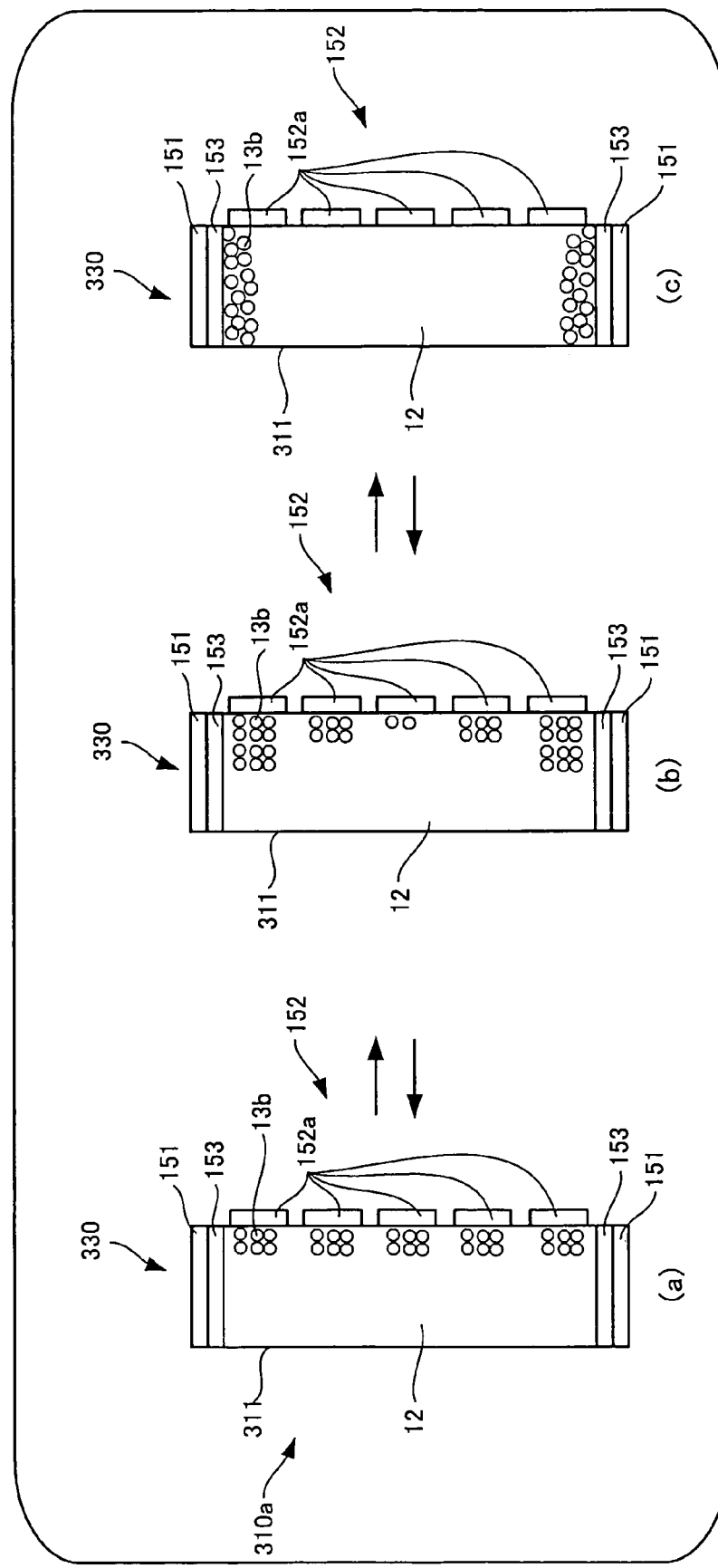
FIG. 23 is a diagram showing a sectional configuration of a lens body in which the inner surface of an electrode is coated with an insulating film.

FIG. 23 is a diagram showing a sectional configuration of a lens body in which the inner surface of an electrode is coated with an insulating film.

The lens body 330 shown in FIG. 23 differs from the lens body 320 shown in FIG. 22 in that the inner surface of the electrode 151 is coated with an insulating film 153 and the insulating film 153 is placed adjacent to the dispersion medium 12. In this lens body 330, the insulating film 153 provided as a coating on the inner surface of the electrode 151 prevents agglomeration of the nanoparticles 13b on the electrode 151. The insulating film 153 is a polyimide insulating film. Therefore, the electrode 151 has excellent heat resistance and durability. In the lens body 330 thus constructed, the focal length in the light passage region 10a may be changed in three steps by controlling voltages applied to the electrodes 151 and 152.

Figure 24:
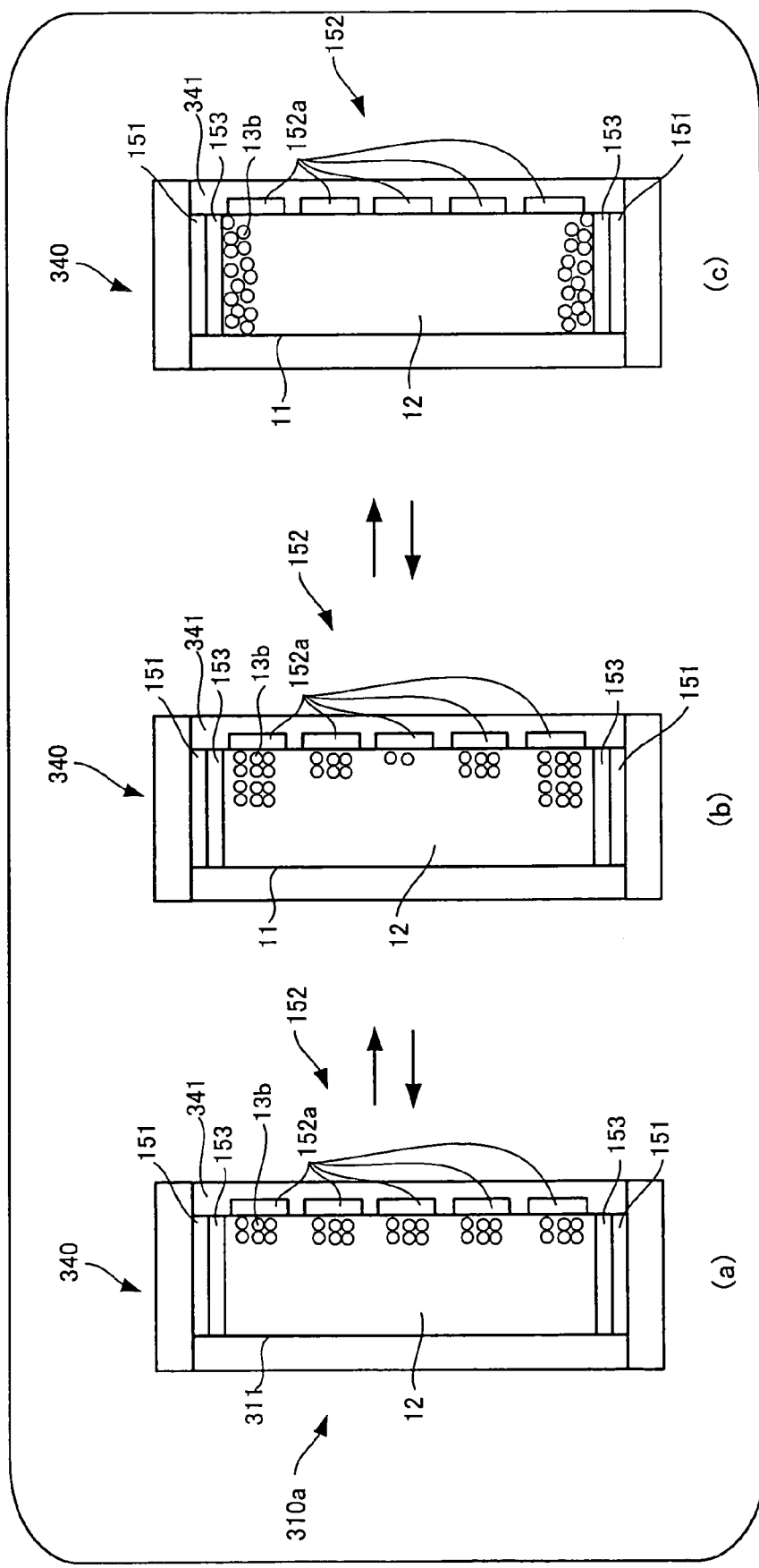
FIG. 24 is a diagram showing a sectional configuration of a lens body provided with a container formed of a plastic.

FIG. 24 is a diagram showing a sectional configuration of a lens body provided with a container formed of a plastic.

The lens body 340 shown in FIG. 24 is provided with a container 341 constituted by a cylindrical member placed along an electrode 151 and members which are fitted in front and rear surfaces of the cylindrical member, which are light-transmissive at least in a light passage region 310a, and each of which has the shape of a disk as its external shape. This container 341 is formed of a plastic. Therefore, the container 341 can be realized as a lightweight container having high impact resistance. In the lens body 340 having the thus-constructed container 341, the focal length of the light passage region 10a may be changed in three steps by controlling voltages applied to the electrodes 151 and 152. The container may be formed of glass instead of being formed of a plastic.

Figure 25:
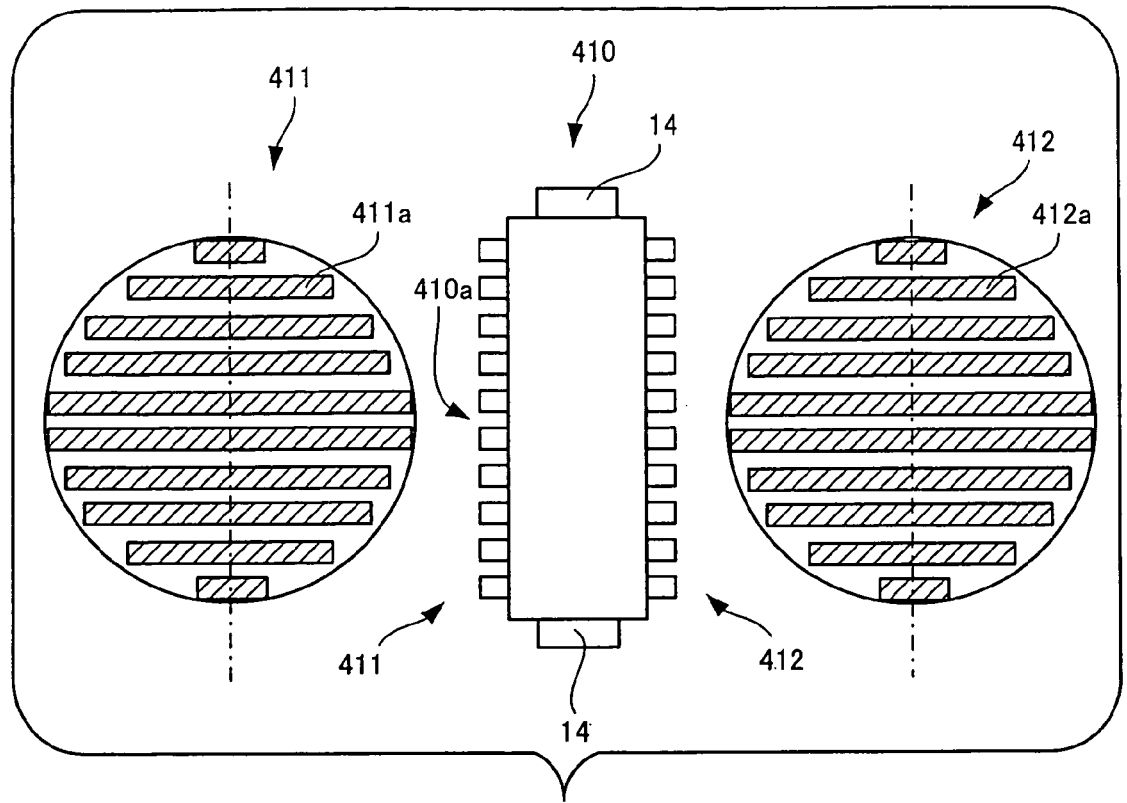
FIG. 25 is a diagram showing a sectional configuration of a first lens body having a devised electrode pattern.

FIG. 25 is a diagram showing a sectional configuration of a first lens body having a devised electrode pattern.

In the lens body 410 shown in FIG. 25, a cathode 14 is placed in such a position on a container as to surround a light passage region. In the lens body 410, an anode 411 having a pattern of electrode elements 411a in the form of horizontal stripes is placed on a front surface of the container in a light passage region 410a. Further, in the lens body 410, an anode 412 having a pattern of electrode elements 412a in the form of horizontal stripes is placed on a back surface of the container in the light passage region. Since the patterns of the electrode elements 411a and 412a of the anodes 411 and 412 in the lens body 410 are symmetrical, a prism effect can be realized by applying voltages such that the voltage value is gradually reduced (or increased) from the top to the bottom of the electrode patterns 411a and 412a. The thus-constructed lens body 410 may be provided in a camera together with an acceleration sensor for camera shake correction to perform vertical camera shake correction of a lens provided in the camera according to a signal from the acceleration sensor. Also, the thus-constructed lens body 410 may be provided in a viewfinder of a camera to make parallax correction.

Figure 26:
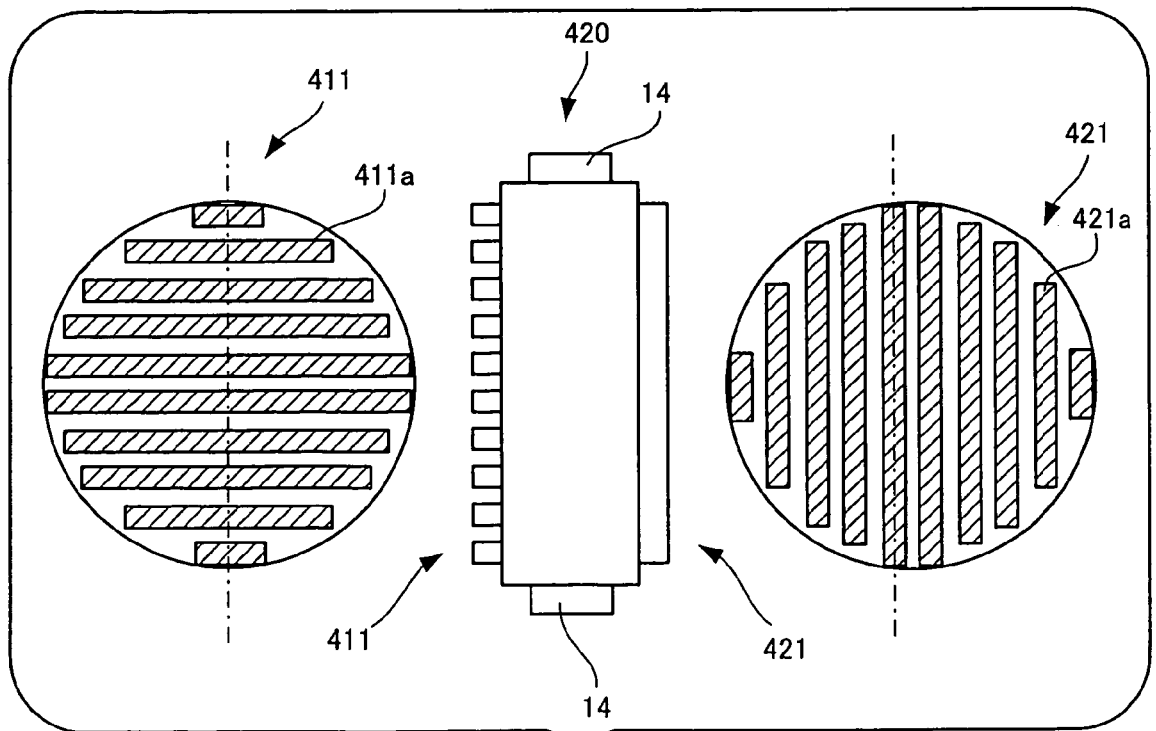
FIG. 26 is a diagram showing a sectional configuration of a second lens body having a devised electrode pattern.

FIG. 26 is a diagram showing a sectional configuration of a second lens body having a devised electrode pattern.

The lens body 420 shown in FIG. 26 differs from the lens body 410 shown in FIG. 25 in that an anode 421 having a pattern of electrode elements 421a in the form of vertical stripes is provided in place of the anode 412 having the pattern of electrode elements 412a in the form of horizontal stripes. Camera shake correction and parallax correction along the vertical and horizontal directions of a lens may be performed by controlling the refractive index in the vertical direction by means of the electrode pattern 411a and controlling the refractive index in the horizontal direction by means of the electrode pattern 421a.

Figure 27:
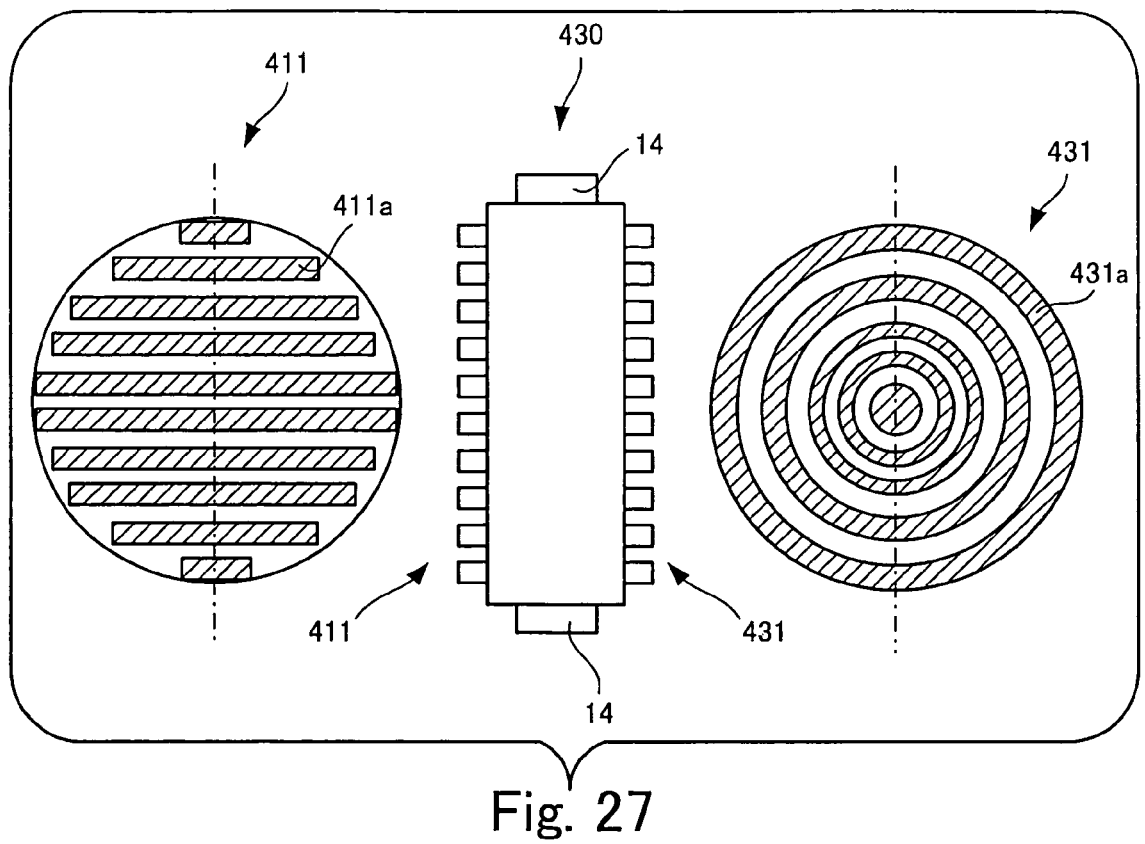
FIG. 27 is a diagram showing a sectional configuration of a third lens body having a devised electrode pattern.

FIG. 27 is a diagram showing a sectional configuration of a third lens body having a devised electrode pattern.

The lens body 430 shown in FIG. 27 differs from the lens body 420 shown in FIG. 26 in that an anode 431 having a pattern of electrode elements 431a in the form of concentric circles is provided in place of the anode 421 having a pattern of electrode elements 421a in the form of vertical stripes. An image-taking lens using one lens body 430 for camera shake correction and for focusing may be implemented by realizing a convex lens by means of the electrode pattern 431a and by realizing a prism effect by means of the electrode pattern 411a. Also, this lens body 430 may be used in a viewfinder optical system of a camera having a zoom lens to realize a zoom finder capable of changing according to the field of view changed by the zoom lens.

Figure 28:
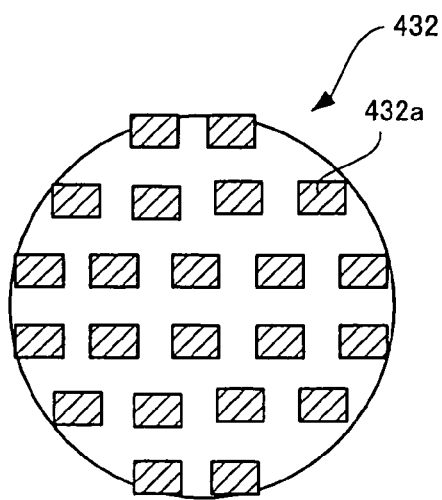
FIG. 28 is a diagram showing an example of an anode having an electrode pattern in matrix form.

FIG. 28 is a diagram showing an anode having a pattern of electrode elements in matrix form.

The anode 432 shown in FIG. 28 has a pattern of electrode elements 432a in matrix form. A lens body having this anode 432 may be placed adjacent to an ordinary lens, and an aberration of the lens may be corrected as described below. An aberration correction table formed of data for correcting an aberration of the lens is prepared and the distribution of nanoparticles is controlled by applying the voltage to the pattern of electrodes 432a in matrix form according to the data in the aberration correction table. The refractive index of the lens body is thereby controlled so that the aberration of the lens is corrected.

Figure 29:
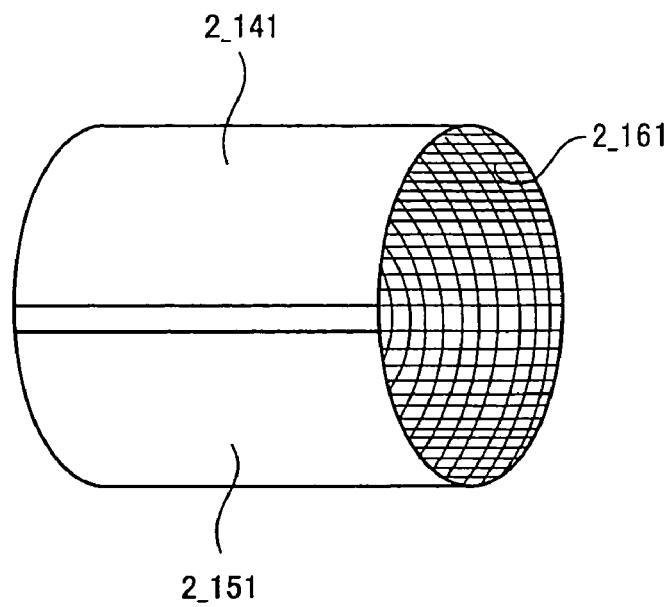
FIG. 29 is a diagram showing an example of the placement of electrodes.

FIG. 29 is a diagram showing an example of the placement of electrodes.

Referring to FIG. 29, anodes 2_141 and 2_151 are respectively placed on an upper surface and a lower surface in an outer peripheral surface of a container constituting a lens body surrounding a light passage region. Also, a cathode 2_161 in mesh form is placed along the entire inner surface of the container surrounding the light passage region. Voltages can be independently applied to the anodes 2_141 and 2_151, and voltages can also be applied to the cathode 2_161 at desired coordinates in the mesh or in desired regions. By applying voltages in this way, the distribution of nanoparticles dispersed in a dispersion medium can be freely controlled.

Figure 30:
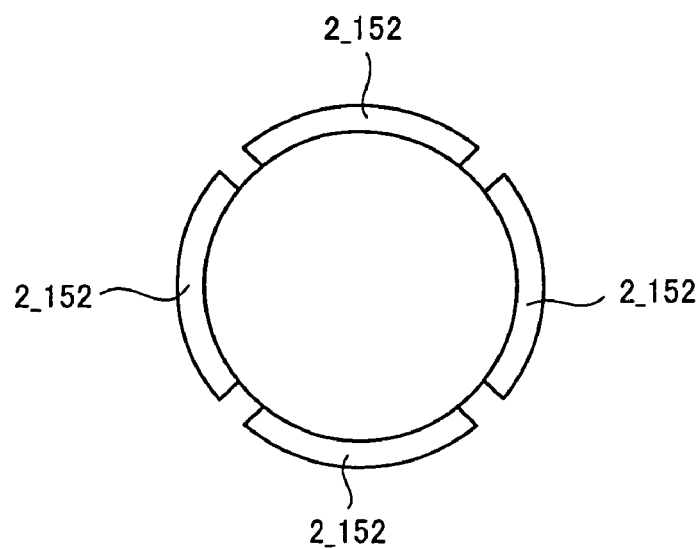
FIG. 30 is a diagram showing an example of the placement of anodes different from the anodes shown in FIG. 29.

FIG. 30 is a diagram showing an example of the placement of anodes different from the anodes shown in FIG. 29.

Referring to FIG. 30, an anode 2_152 is placed by being divided into four on an outer peripheral surface of a container constituting a lens body, the outer peripheral surface surrounding a light passage region. The anodes 2_152 are placed together with the cathode 2_161 in mesh form shown in FIG. 29. Voltages are independently applied to the anodes 2_152 and voltages are applied to the cathode 2_161 at desired coordinates in the mesh form or in desired regions. The distribution of nanoparticles dispersed in a dispersion medium can be controlled more freely in this way.

Figure 31:
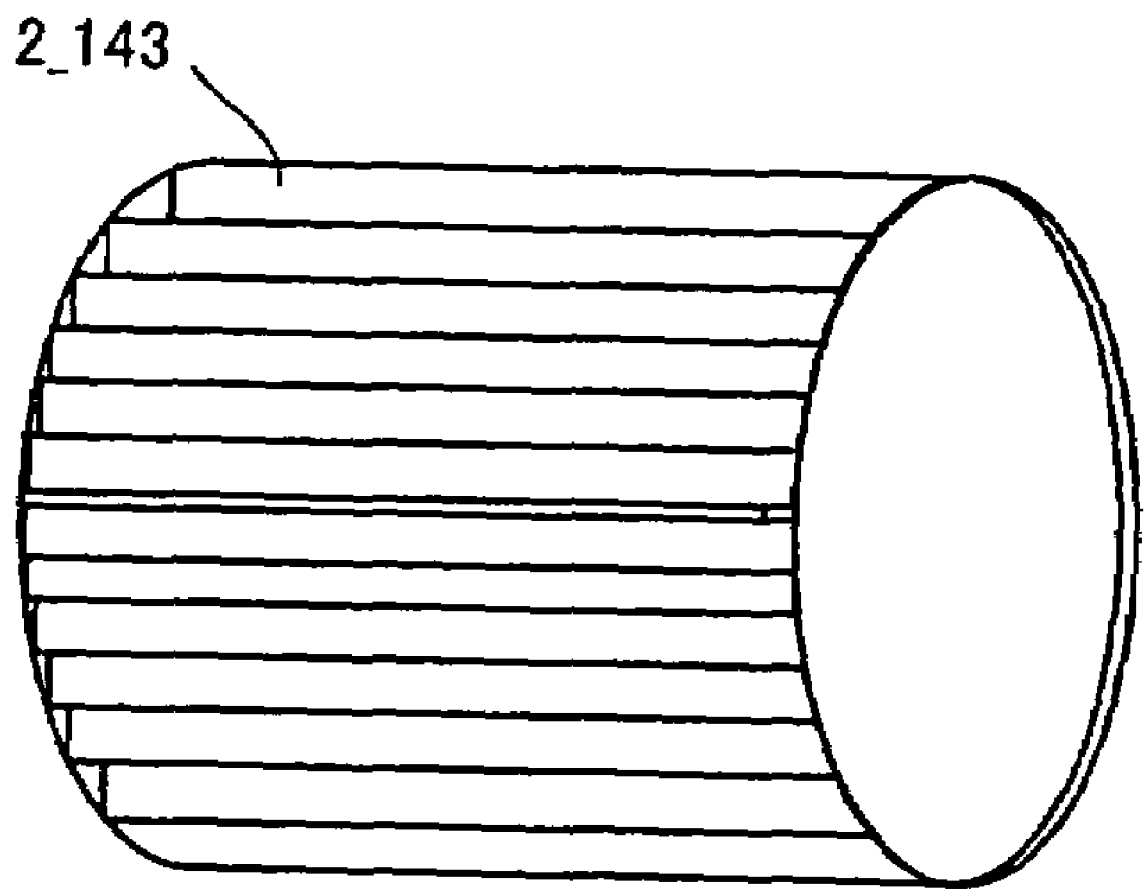
FIG. 31 is a diagram showing an example of the placement of anodes different from the anodes shown in FIGS. 29 and 30.

FIG. 31 is a diagram showing an example of the placement of anodes different from the anodes shown in FIGS. 29 and 30.

Referring to FIG. 31, anodes 2_143 in the form of strips are placed on an outer peripheral surface of a container constituting a lens body, the outer peripheral surface surrounding a light passage region. The anodes 2_143 are placed together with a cathode 2_161 in mesh form shown in FIG. 29. Voltages are independently applied to the anodes 2_143 and voltages are applied to the cathode 2_161 at desired coordinates in the mesh form or in desired regions. The distribution of nanoparticles dispersed in a dispersion medium may be controlled more freely in this way.

The electrophoretic optical units in which the refraction of light is controlled through electrophoresis of a dispersoid dispersed in a dispersion medium have been described. Magnetophoretic optical units in which refraction of light is controlled by effecting magnetophoresis of a magnetic dispersoid dispersed in a dispersion medium will now be described.

Figure 32:
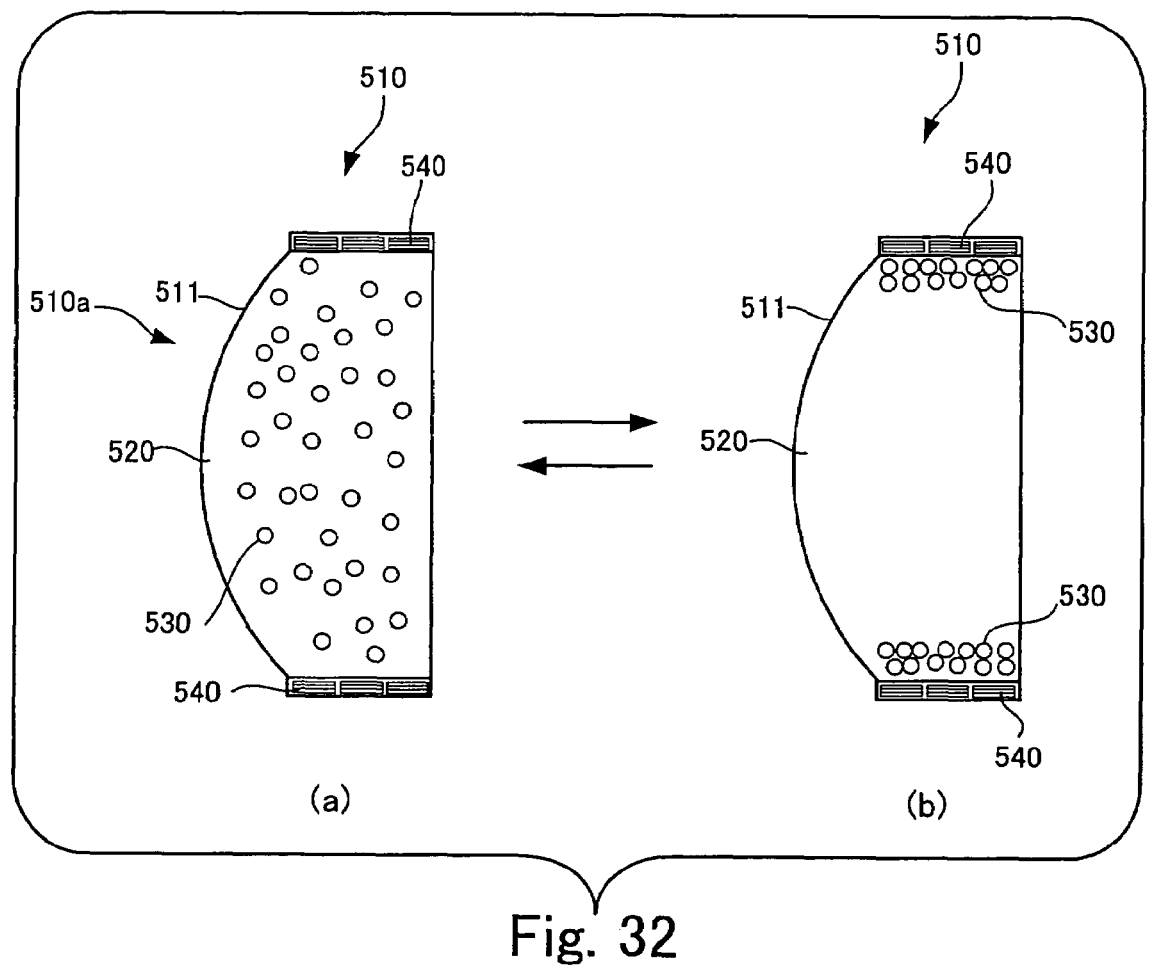
FIG. 32 is a diagram showing a sectional configuration of a lens body in a variable focus lens in which the refraction of light is changed by causing magnetophoresis of a dispersoid.

FIG. 32 is a diagram showing a sectional configuration of a lens body in a variable-focus lens in which the diffraction of light is changed by effecting magnetophoresis of a dispersoid.

The lens body 510 shown in FIG. 32 has the shape of a lens, as does the container 11 of the lens body 10 shown in FIG. 2, and has a transparent dispersion medium 520 and transparent magnetic nanoparticles 530 enclosed in a container 511 which is light-transmissive at least in a light passage region 510a. As the dispersoid 520, the same fluid as the dispersion medium 12 in the lens body 10 shown in FIG. 2 can be used. As the material of the transparent magnetic nanoparticles 530, titanium-cobalt dioxide or the like can be used.

In the lens body 510, coils 540 for generating magnetic fields for causing magnetophoresis of magnetic nanoparticles 530 are provided in place of the electrodes (cathode 14 and anode 15) of the lens body 10 shown in FIG. 2. The coils 540 are an example of the electromagnetic field generator in accordance with the present invention and correspond to the magnetic field generator in accordance with the present invention.

Figure 33:
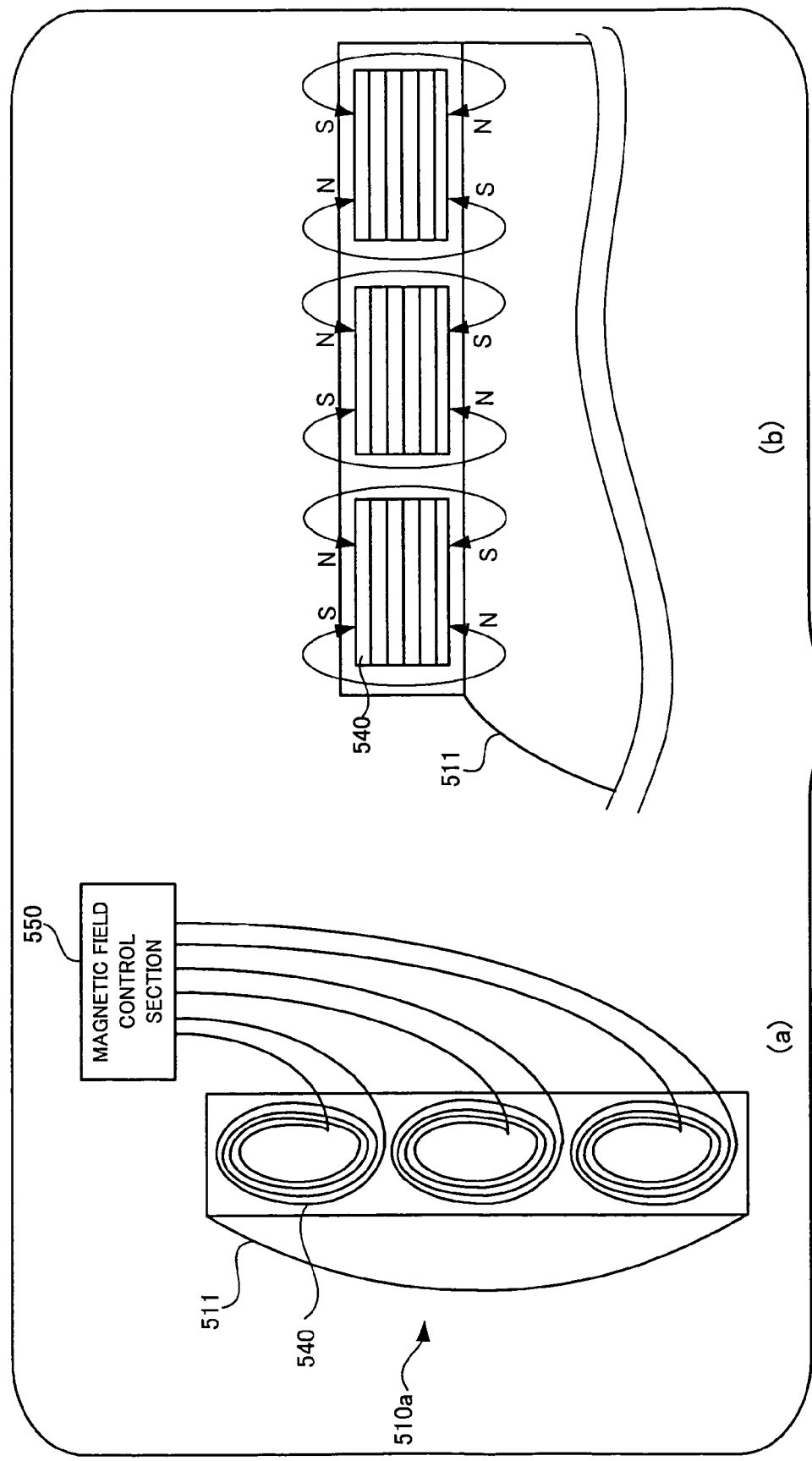
FIG. 33 is a diagram schematically showing the construction of the lens body 510 shown in FIG. 32.

FIG. 33 is a diagram schematically showing the construction of the lens body 510 shown in FIG. 32.

Part (a) of FIG. 33 shows a top view of the lens body 510.

Three wound coils 540 are placed side by side on upper and lower surfaces of the container 511. A magnetic field control section 550 for controlling magnetic fields generated from the coils 540 by causing currents to flow through the coils 540 are connected to the coils 540.

Part (b) of FIG. 33 shows an enlarged view of the lens body 510 in the vicinity of the coils 540.

For example, the magnetic field control section 550 shown in part (a) of FIG. 33 supplies currents in the same direction to the three coils 540. Magnetic fields are thereby generated through the three coils 540. That is, magnetic fields in which north and south poles are alternately arranged are applied to the container 511, as shown in part (b) of FIG. 33. The polarity of each of the magnetic fields applied from the coils 540 to the container 511 for magnetophoresis of magnetic nanoparticles 530 may be either of the north pole and the south pole. Also, the directions of the currents supplied to the three coils 540 may be different from each other. The magnitudes of the magnetic fields applied from the magnetic field generation section 540 to the container 511 and the regions through which the magnetic fields are applied can be accurately controlled by individually adjusting the directions and magnitudes of the currents supplied to the three coils 540.

A further description will be made by referring again to FIG. 32.

When no magnetic fields are generated by the coils 540, the magnetic nanoparticles 530 are uniformly dispersed in the dispersion medium 520, as shown in part (a) of FIG. 32.

When currents are supplied to the coils 540 by the magnetic field control section 550 shown in part (a) of FIG. 33, magnetic fields according to the directions and magnitudes of the supplied currents are generated by the coils 540. The magnetic nanoparticles 530 uniformly dispersed in the dispersion medium 520 are attracted by the magnetic forces of the coils 540 to reduce the refractive index of the lens body 510, as shown in part (b) of FIG. 32.

Thus, the refraction of light passing through the lens body 510 can be controlled by effecting magnetophoresis of the dispersoid dispersed in the dispersion medium instead of electrophoresis.

Figure 34:
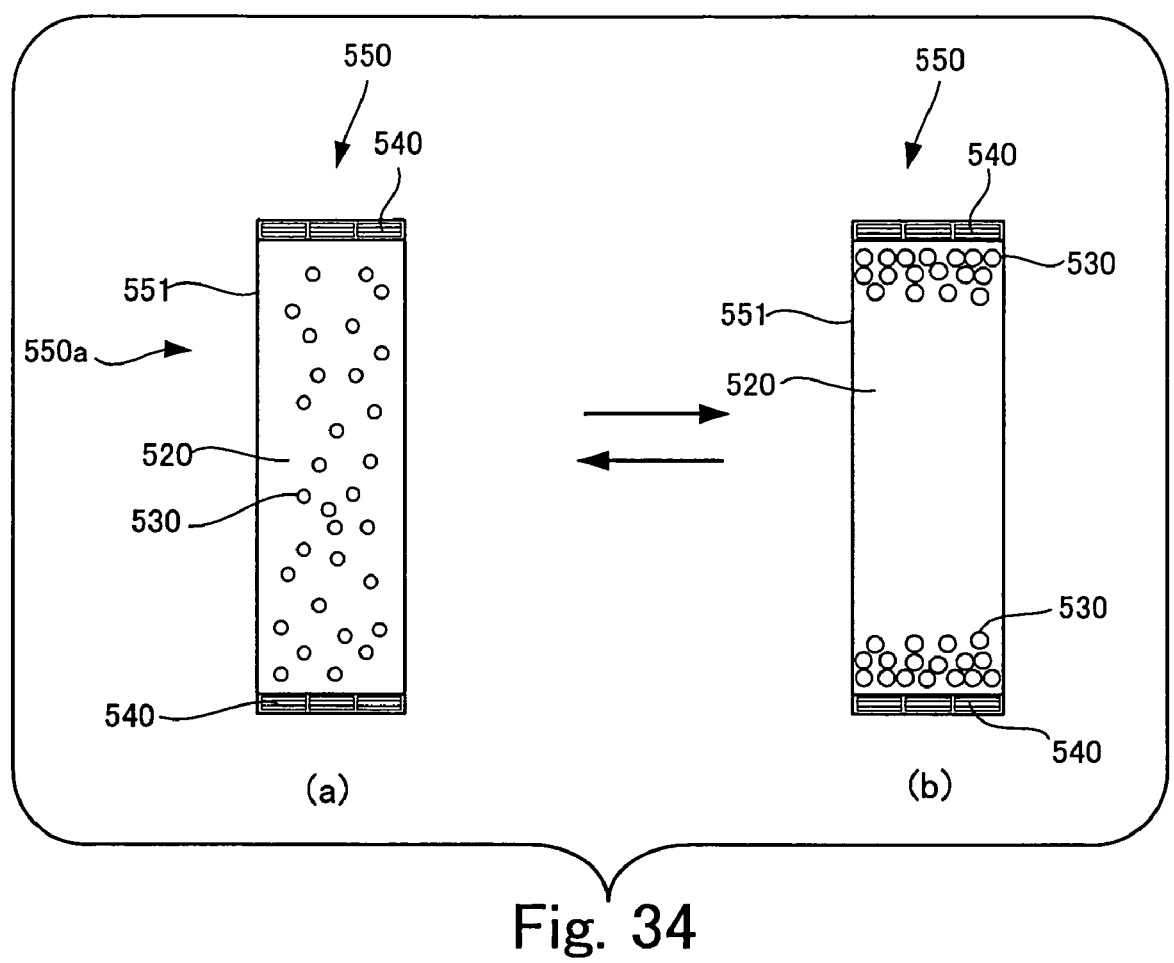
FIG. 34 is a diagram showing a sectional configuration of a lens body in a refractive-index-variable plate in which the refraction of light is changed by causing magnetophoresis of a dispersoid.

FIG. 34 is a diagram showing a sectional configuration of a lens body in the form of a flat plate capable of changing the refraction of light by effecting magnetophoresis of a dispersoid.

The lens body 550 shown in FIG. 34 has a container 551 in the form of a flat plate similar to the container 311 of the lens body 310 shown in FIG. 20. The container 551 has a transparent dispersion medium 520 and a transparent magnetic nanoparticles 530 enclosed therein, as does the container of the lens body 510 shown in FIG. 32.

Coils 540 for generating magnetic fields for magnetophoresis of nanoparticles 530 are placed in such a position on the container 551 as to surround a light passage region 550a, as are those in the lens body 510 shown in FIG. 32.

When no magnetic fields are generated by the coils 540, the nanoparticles 530 are uniformly dispersed in the dispersion medium 520, as shown in part (a) of FIG. 34. In this state, the lens body 550 has a comparatively high refractive index resulting from the refractive index of the dispersion medium 520 and the amount (number) of nanoparticles 530 uniformly dispersed in the dispersion medium 520.

When currents are supplied to the coils 540, magnetic fields are generated by the coils 540. The magnetic nanoparticles 530 are attracted by the magnetic fields generated by the coils 540, as shown in part (b) of FIG. 34. In this state, therefore, the lens body 550 has a comparatively low refractive index determined by the refractive index of the dispersion medium 520 only. When the supply of the currents to the coils 540 is stopped, the lens body 550 is again settled in the state shown in part (a) of FIG. 34.

Thus, a variable-refractive-index plate capable of changing the focal length can also be formed in a magnetophoretic optical element.

If plural small coils are placed in a stripe pattern, a magnetic field pattern similar to the electric field pattern in the case of use of the anode 181 shown in FIG. 18 can be formed. If plural coils differing in size are placed on concentric circles, a magnetic field pattern similar to the electric field pattern in the case of use of the anode 201 shown in FIG. 18 can be formed. If small coils are arranged in matrix form, a magnetic field pattern similar to the electric field pattern in the case of use of the electrode 210 shown in FIG. 19 can be formed.

While the coils capable of generating magnetic fields by being supplied with currents have been described as an example of the magnetic field generator in accordance with the present invention, the magnetic field generator in accordance with the present invention may be a permanent magnet which generates a magnetic field by itself. In such a case, magnetophoresis of the dispersoid is realized by moving the permanent magnet.

Basic embodiments for implementation of the concept of the present invention have been described. For practical use of an optical element provided as the lens body used in the present invention, however, it is preferable to use a device for preventing foreign materials or water droplets from being attached to a portion on the optical path to cause a deterioration of the lens performance.

For example, it is preferable to apply a water-repellent film on an external surface intersecting the optical path of the container containing a fluid (which surface hereinafter referred to as "light-transmissive surface"). If the light-transmissive surface is given water repellency, attachment of foreign materials and water droplets or the like is prevented and high transmissivity of the optical element can be maintained. As a material constituting this water-repellent coating, a silicone resin, a block copolymer of organopolysiloxane, a fluorine-based polymer, polytetrafluoroethane and the like are preferred.

It is also preferable to apply a hydrophilic film on the light-transmissive surface of the container constituting the lens body. Attachment of foreign materials to the light-transmissive surface can also be prevented by giving a hydrophilicity and oil repellency to the light-transmissive surface. As the hydrophilic film, a film formed of an acrylate polymer, a film coated with a surfactant such as a nonionic organosilicone-based surfactant and the like are preferred. As a method of making the hydrophilic film, plasma polymerization of a silane monomer, ion beam processing or the like may be used.

It is also preferable to apply a photocatalyst such as titanium oxide on the light-transmissive surface of the container constituting the lens body. The photocatalyst reacting with light decomposes a contamination or the like to keep the light-transmissive surface clean.

Further, it is preferable to apply an antistatic film on the light-transmissive surface of the container constituting the lens body. If static electricity is accumulated on the light-transmissive surface of the container, or if the light-transmissive surface is charged through the electrodes, there is a possibility of foreign materials and dust sticking to the light-transmissive surface. Attachment of such unnecessary materials can be prevented by applying an antistatic film on the light-transmissive surface. The transmissivity of the lens body is thereby maintained. Preferably, the antistatic film is formed of a polymer alloy-based material. Particularly preferably, the polymer alloy-based material is a polyether-based material, polyether ester amide-based material, a material having a cationic group, or Reolex (commercial name, DAI-ICHI KOGYO SEIYAKU CO., LTD.). Preferably, the antistatic film is made by a mist method.

An antifouling material may be used for the container constituting the lens body. A fluororesin is preferred as the antifouling material. More specifically, a fluorine-containing alkyl alkoxysilane compound, a fluoroalkyl group-containing polymer or oligomer and the like are preferred. One having a functional group crosslinkable to the above-mentioned curable resin is particularly preferred. Preferably, the amount of addition of the antifouling material is set to the minimum necessary amount for the desired antifouling effect.

A digital camera incorporating one of the various optical units will be described.

Figure 35:
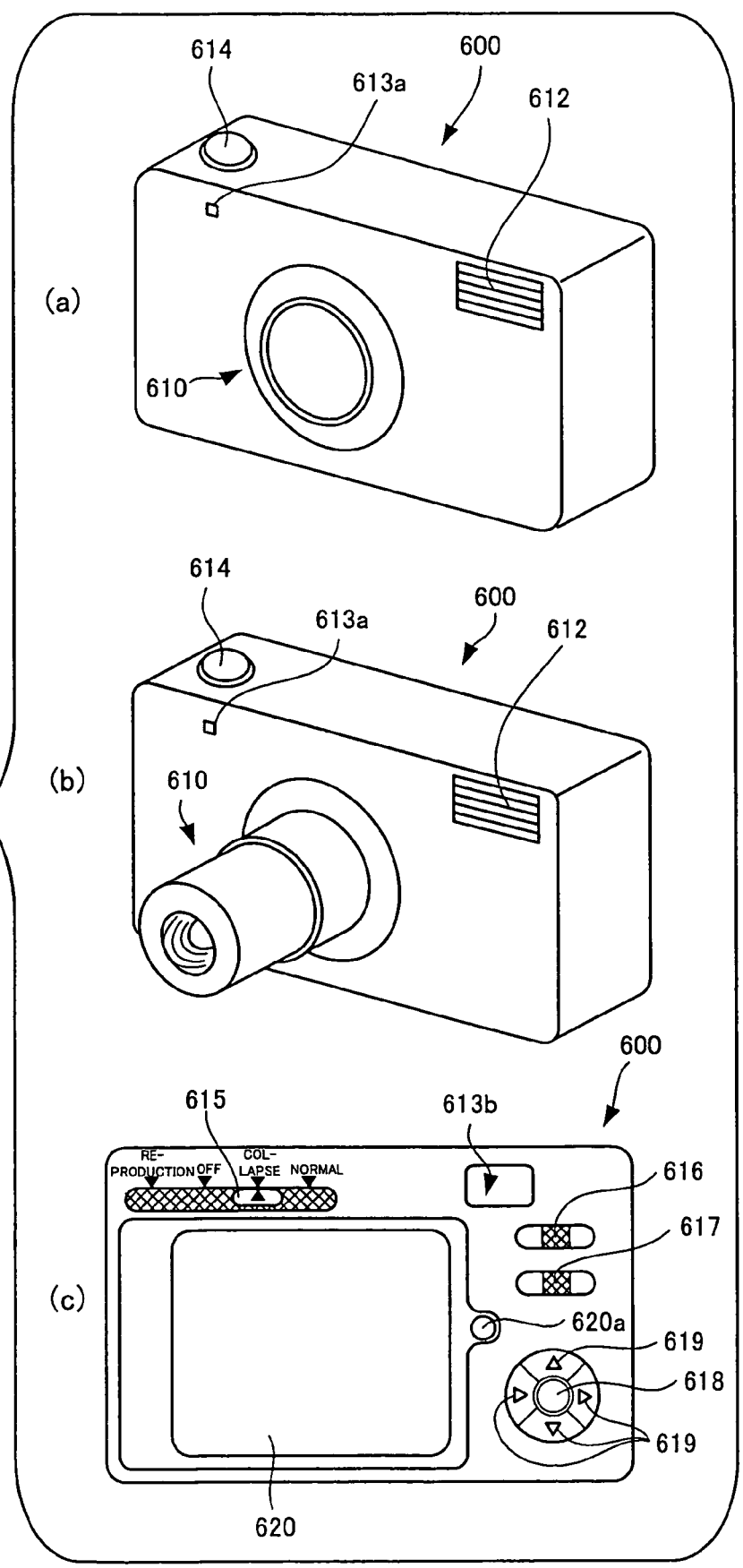
FIG. 35 is a diagram showing an external appearance of a digital camera which is an embodiment of a first picture taking device of the present invention.

FIG. 35 is a diagram showing an external appearance of a digital cameral which is an embodiment of the first image taking apparatus of the present invention.

Part (a) of FIG. 35 shows a collapsed state of a lens barrel 610 incorporating a zoom lens in the digital camera 600 which is an embodiment of the first image taking apparatus of the present invention. Part (b) of FIG. 35 shows an extended state of the lens barrel 610 of the digital camera 600. Part (c) of FIG. 35 shows a rear face of the digital camera 600.

The lens barrel 610 of the digital camera 600 shown in FIG. 35 incorporates an image taking lens constituted by three groups of lenses: a front group lens, a rear group lens and a focusing lens, disposed in this order from the front end in the optical direction. As the focusing lens, the variable-focus lens 1 having the lens body 2 shown in FIG. 1 is used. That is, in this image taking lens, focusing is performed without moving the focusing lens.

This digital camera 600 is realized as a thin camera in which the rear group lens is withdrawn from the image taking optical axis when the image taking lens is collapsed, as described below.

An auxiliary light emitting section 612 and a finder objective window 613a are provided in upper front portions of the digital camera 600 shown in FIG. 35. A shutter button 614 is provided in an upper surface of the digital camera 600. The shutter button 614 is depressed in two steps, that is, it is half depressed and fully depressed. When the shutter button 614 is half depressed, the focusing is performed. When the shutter button 614 is fully depressed, image taking is performed.

A power switch 615, a finder ocular window 613b, an image monitor 620, a setting display button 616, a recording command button 617, an image display on/off button 620a, a cross key 619 and a zoom operation change button 618 are provided in the rear surface of the digital camera 600. A zoom operation mode is set by maintaining the zoom operation change button 618 in a depressed state for a predetermined time period. In the zoom operation mode, the lens barrel 610 is moved toward a telephoto position by depressing a portion of the cross key 619 with an "Up" mark. This movement is continued while this depressed state is being maintained. The lens barrel 610 is moved toward a wide-angle position by depressing a portion of the cross key 619 with a "Down" mark. This movement is continued while this depressed state is being maintained. The zoom operation mode is cancelled by again depressing the zoom operation change button 618 and maintaining the depressed state for a predetermined time period.

The image display on/off button 620a is a button for direction as to whether or not image display on the image monitor 620 is performed. In the digital camera 600, an image obtained by image taking is displayed on the image monitor 620 even when the image display on/off button 620a is off. Image taking of a subject in the state where the image monitor 620 is off is performed while the subject is being checked through the finder ocular window 613b.

The setting display button 616 is operated when the values of a shutter speed, sensitivity, etc., presently set are displayed. The recording command button 617 is operated when a taken image is recorded in a memory.

The finder ocular window 613b and the finder objective window 613a in the front surface side constitute an optical finder.

The power switch 615 is a switch operated to activate the digital camera 600. In the digital camera 600, a "REPRODUCTION" position for designating a reproduction mode which is a mode for displaying on the image monitor 620 an image recorded in a memory or the like, a "COLLAPSE" position for designating collapsed-position image taking and a "NORMAL" position for designating ordinary picture taking including a movie mode are provided. The power switch 615 is slidable between these positions and an "OFF" position for power-off. Part (c) of FIG. 35 shows a state in which the power switch 615 is set in the "COLLAPSE" position.

Figure 36:
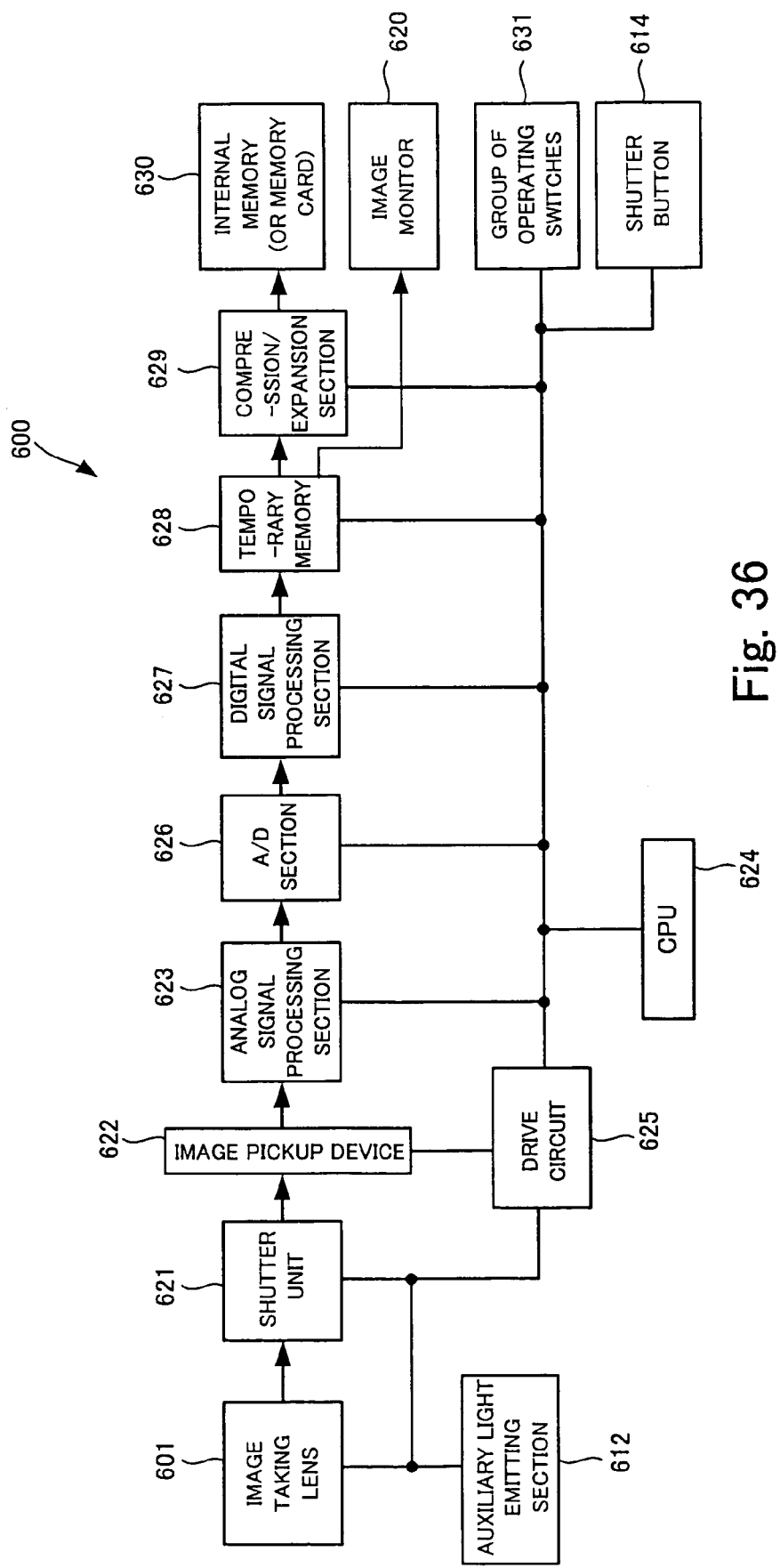
FIG. 36 is a block diagram showing a circuit configuration of the digital camera.
Figure 37:
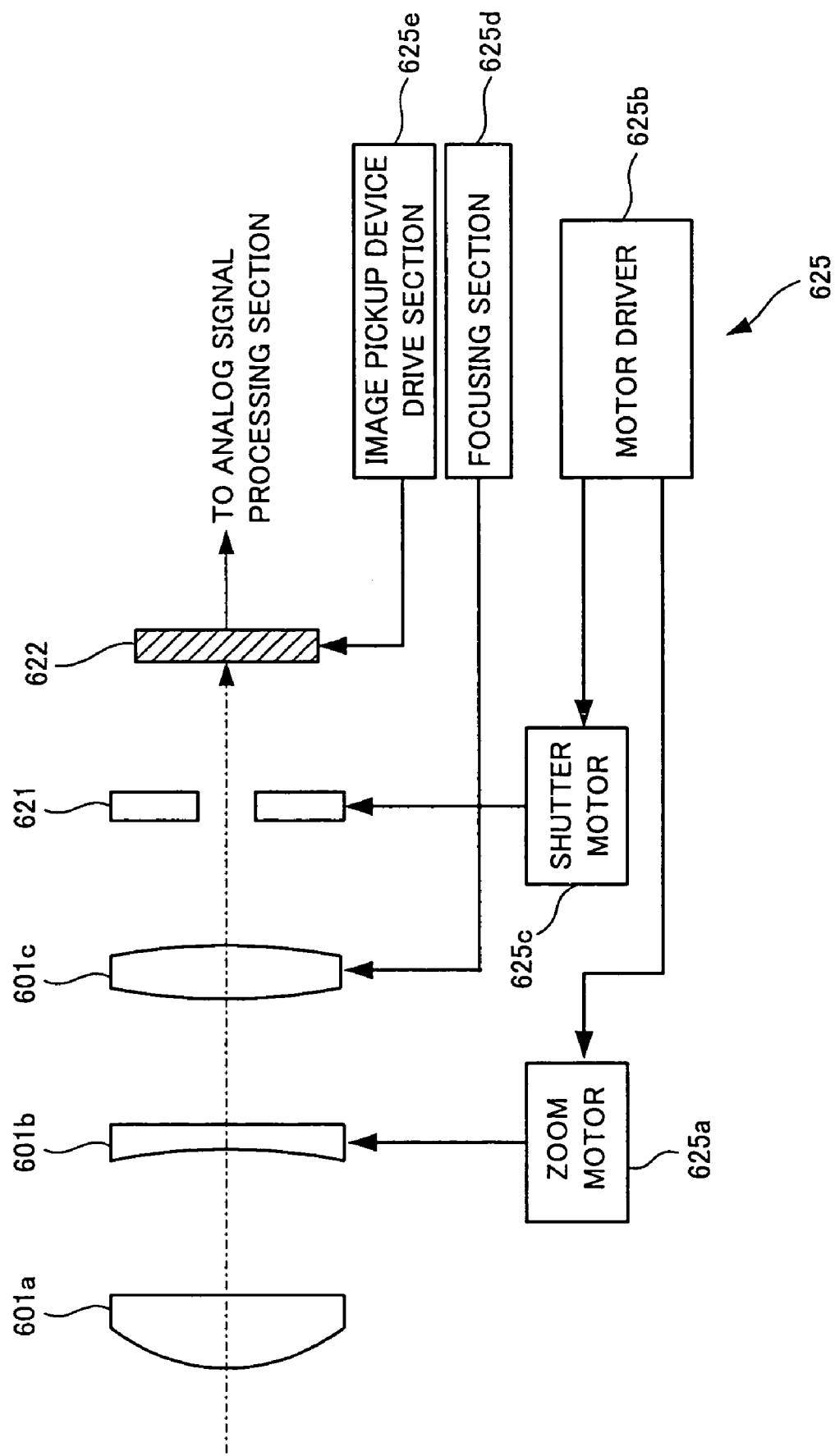
FIG. 37 is a diagram showing the placement and configuration of an image taking lens, a shutter unit, an image pickup device and a drive circuit.

FIG. 36 is a block diagram showing a circuit configuration of the digital camera shown in FIG. 35. FIG. 37 is a diagram showing the placement and configuration of the image taking lens, a shutter unit, an image pickup device and a drive circuit shown in FIG. 36.

The digital camera 600 shown in FIG. 36 has the image taking lens 601 incorporated in the lens barrel 610, the shutter unit 621 and the image pickup device (CCD) 622. The image taking lens 601 includes the front group lens 601a, the rear group lens 601b and the focusing lens 601c shown in FIG. 37. The drive circuit 625 includes a zoom motor 625a for driving the rear group lens 601b, a shutter motor 625c for driving the shutter unit 621, and a motor driver 625b for applying voltages to the zoom motor 625a and the shutter motor 625c. The drive circuit 625 also includes a focusing section 625d which performs focusing by changing the focal length of the focusing lens 601c in three steps through control of the voltage applied to the focusing lens 601c, and an image pickup device drive section 625e for driving the image pickup device 622.

In the digital camera 600, when "NORMAL" is selected by the power switch 615, the lens barrel 610 is extended until the field angle becomes equal to a predetermined wide angle. When "COLLAPSE" is selected by the power switch 615 to select collapsed-position image taking, the lens barrel 610 is not extended. In this case, image taking using a fixed focus determined by the front group lens and the focusing lens can be performed.

An image of a subject formed on the image pickup device 622 through the image taking lens 601 and the shutter unit 621 is converted into an analog image signal by the image pickup device 622. The shutter unit 621 limits the occurrence of smear caused by light when the analog signal is read out from the image pickup device 622.

The digital camera 600 has the auxiliary light emitting section 612 which emits auxiliary light as required. The finder having the finder objective window 613a and the finder ocular window 613b provided in the digital camera 600 is an optical finder, as mentioned above, and control linked to focal length adjustment and focusing is performed by the drive circuit 625 when "NORMAL" is selected by the power switch 615. When "COLLAPSE" is selected by the power switch 615 to select collapsed-position image taking, fixed-focus image taking is performed as described above and the finder is controlled according to focusing such that the focal point is set at a distance of 1 to 2 m from the camera.

The digital camera 600 also has an analog signal processing section 623, an A/D section 626, a digital signal processing section 627, a temporary memory 628, a compression/expansion section 629, an internal memory (or a memory card) 630, the image monitor 620 (see FIG. 35), and the drive circuit 625. The image pickup device 622 is driven according to a timing signal generated by a timing generation circuit (not shown) in the drive circuit 625, and outputs an analog image signal. The drive circuit 625 also includes drive sections for driving the image taking lens 601, the shutter unit 621 and the auxiliary light emitting section 612. When "NORMAL" is selected by the power switch 615 in the drive circuit 625, focusing of the focusing lens (third group) is performed according to contrast. On the other hand, when "COLLAPSE" is selected by the power switch 615 to select collapsed-position image taking, the refractive power of the focusing lens (third group) is controlled so that the focal point is set at a distance of 1 to 2 m from the camera. The analog image signal output from the image pickup device 622 undergoes analog signal processing in the analog signal processing section 623, is A/D converted in the A/D section 626, and undergoes digital signal processing in the digital signal processing section 627. Image data representing the signal processed by digital signal processing is temporarily stored in the temporary memory 628. The data stored in the temporary memory 628 is compressed by the compression/expansion section 629 and is thereafter recorded in the internal memory (or memory card) 630. In some image taking mode, the data may be directly recorded in the internal memory 630 without undergoing the compression step. The data stored in the temporary memory 628 is read out to the image monitor 620 to enable the subject image to be displayed on the image monitor 620.

The digital camera 600 further has a CPU 624 which performs overall control of the digital camera 600, a group of operating switches 631 including a zoom operation switch, the shutter button 614 and the like. Desired image taking conditions including a desired field angle setting are set by operating the group of operating switches 631 and the shutter button 614 is operated to perform picture taking.

Figure 38:
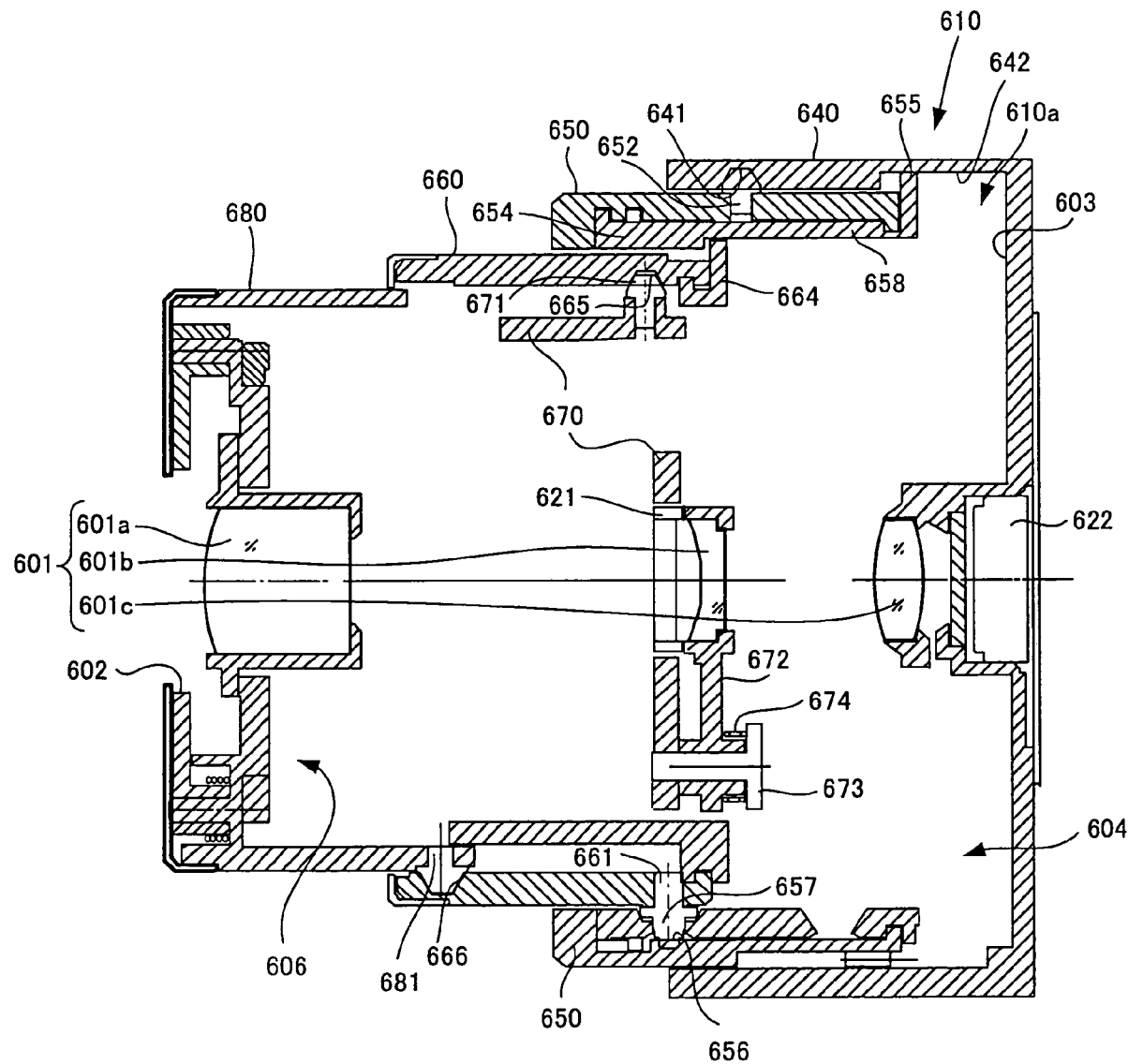
FIG. 38 is a diagram schematically showing main component parts of the digital camera in a section of the lens barrel taken along the optical axis when the lens barrel is in a state of being extended to a wide-angle position.
Figure 39:
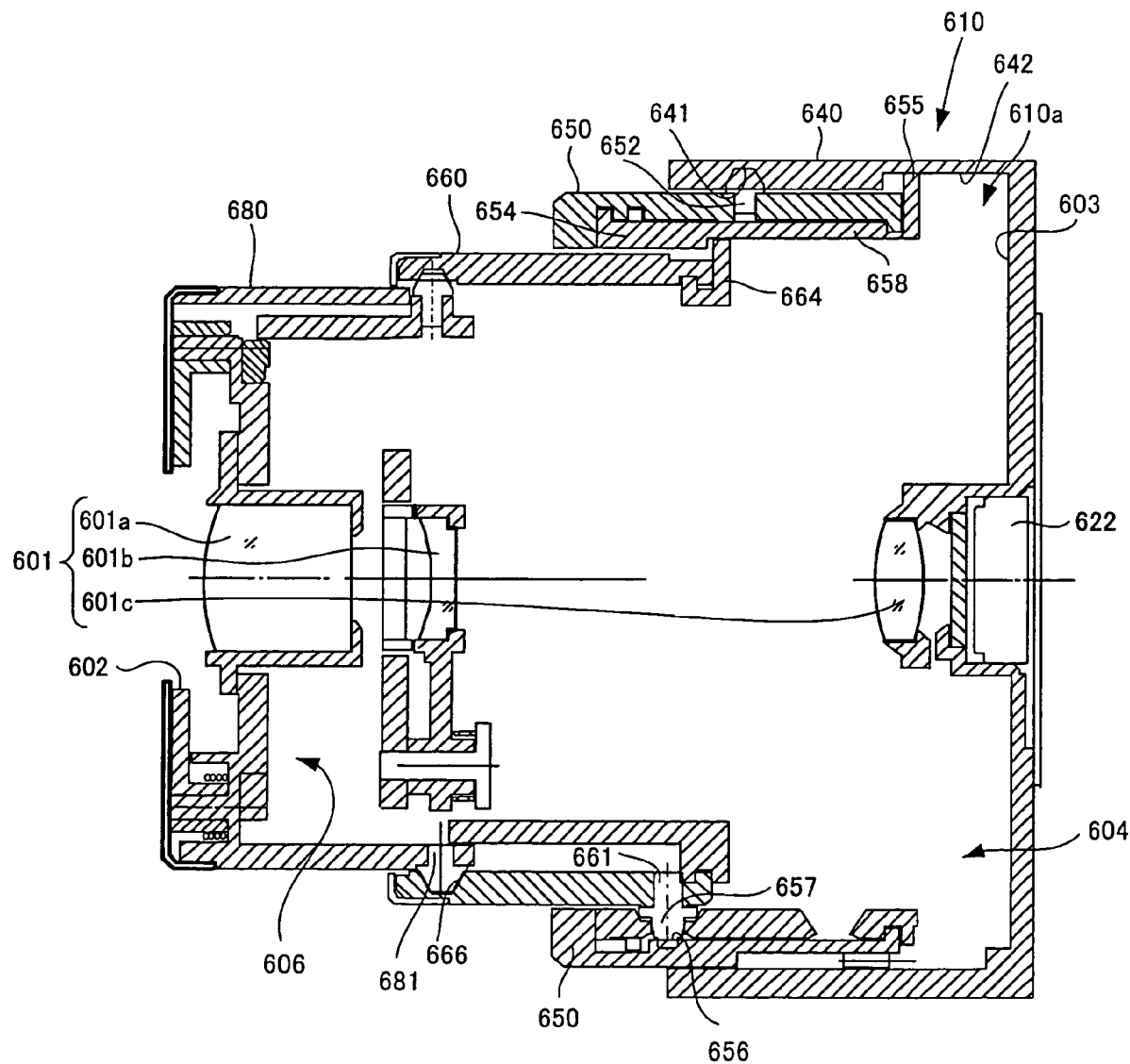
FIG. 39 is a diagram schematically showing the main component parts of the digital camera in a section of the lens barrel taken along the optical axis when the lens barrel is in a state of being extended to a telephoto position.
Figure 40:
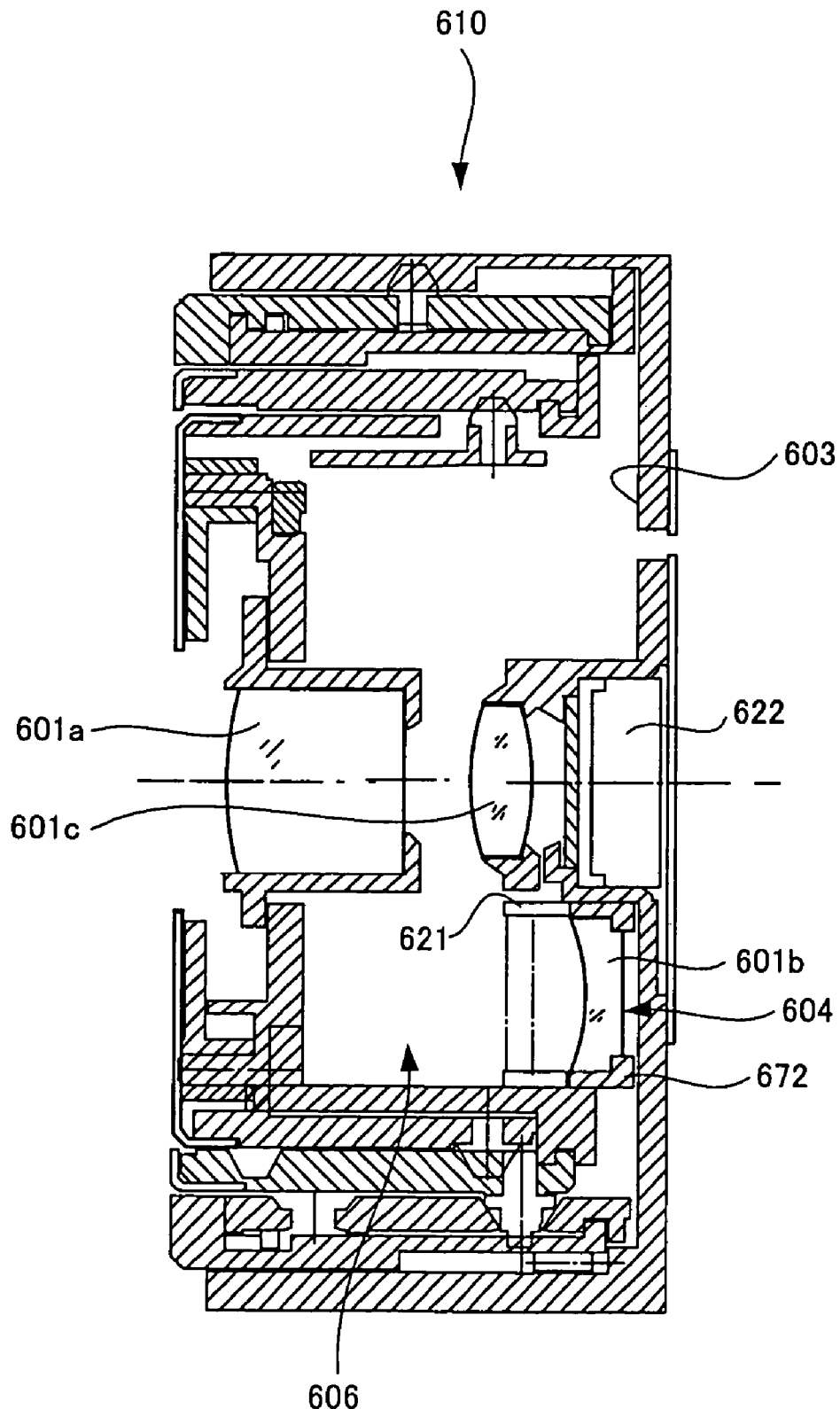
FIG. 40 is a diagram schematically showing the main component parts of the digital camera in a section of the lens barrel taken along the optical axis when the lens barrel is in the collapsed state.

FIG. 38 is a diagram schematically showing main component parts of the digital camera shown in FIG. 35 in a section of the lens barrel taken along the optical axis when the lens barrel is in a state of being extended to a wide-angle position. FIG. 39 is a diagram schematically showing the main component parts of the digital camera shown in FIG. 35 in a section of the lens barrel taken along the optical axis when the lens barrel is in a state of being extended to a telephoto position. FIG. 40 is a diagram schematically showing the main component parts of the digital camera shown in FIG. 35 in a section of the lens barrel taken along the optical axis when the lens barrel is the collapsed state.

In an internal space 610a of the lens barrel 610 shown in FIG. 38, the image taking lens 601 constituted by the front group lens (first lens group) 601a, the rear group lens (second lens group) 601b and the focusing lens (third lens group) 601c, disposed in this order from front end in the optical direction is accommodated. As the focusing lens 601c, the variable-focus lens having the lens body 2 shown in FIG. 1 is used. Since the focusing lens 601c is a focal-length-variable lens having the focal length of which can be changed in three steps according to a positive refractive index determined by a dispersion medium and the amount of movement of nanoparticles in a light passage region caused by electrophoresis, there is no need for a drive mechanism such as a motor for moving the focusing lens in contrast with the conventional technique of performing focusing by moving the focusing lens in the optical axis direction. Therefore, the image taking lens 601 can be realized as a lens simpler in construction, smaller in size and having improved impact resistance.

An opening 602 through which the image taking lens 601 faces outward is formed at the front end of the internal space 610a of the lens barrel 610, while a wall member 603 fixed on the camera body or forming a portion of the camera body is placed at the rear end. The shape of the internal space 610a is defined by the wall member 603 and a certain number of cylindrical members (not shown).

The front group lens 601a is held inside a front group frame 680 smallest in outside diameter in the cylindrical members and placed at the foremost position on the optical axis when the lens barrel 610 is extended. The outside diameter of the front group lens 601a is smaller than the inside diameter of the front group frame 680. Therefore, a space is formed beside the front group lens 601a between the front group lens 601a and the front group frame 680. In the following description, the space between the front group lens 601a and the front group frame 680 is referred to as "front group lens side space 606".

In the wall member 603, the image pickup device (CCD) 622 is mounted in a state of projecting in the internal space 610a. Since the image pickup device (CCD) 622 is mounted in such a position as to project in the internal space 610a, a recessed portion 604 defied by the image pickup device 622 and the wall member 603 is formed beside the image pickup device 622.

A fixed cylinder 640 is fixed on the wall member 603. A rotatable cylinder 650 is provided inside the fixed cylinder 640. The rotatable cylinder 650 is driven and rotated by a barrel drive motor through a column gear (not shown). A cam groove 641 is formed in the inner wall surface of the fixed cylinder 640. A cam pin 652 fixed on the rotatable cylinder 650 is fitted in the cam groove 641. Therefore, when the rotatable cylinder 650 receives the rotating drive force through the column gear, it moves frontward or rearward along the optical axis while being rotated.

A rotatable-cylinder-side rectilinear motion key ring 654 inside of the rotatable cylinder 650 is provided so as to be rotatable relative to the rotatable cylinder 650 but unable to move along the optical axis relative to the rotatable cylinder 650. A key plate 655 is fixed on the rotatable-cylinder-side rectilinear motion key ring 654. The key plate 655 is fitted in a key groove 642 formed in the inner wall surface of the fixed cylinder 640 so as to extend along the optical axis. The rotatable-cylinder-side rectilinear motion key ring 654 is thereby stopped from rotating relative to the fixed cylinder 640 stops while being allowed to move along the optical axis. Therefore, when the rotatable cylinder 650 rotates and moves along the optical axis, the rotatable-cylinder-side rectilinear motion key ring 654, stopped by the fixed cylinder 640 from rotating, does not rotate but moves along the optical axis together with the rotatable cylinder 650.

A rotatable intermediate cylinder 660 is provided inside the rotatable cylinder 650. A cam groove 656 shown in a bottom portion of FIG. 37 is formed in the inner wall surface of, the rotatable cylinder 650. The rotatable-cylinder-side rectilinear motion key ring 654 also has a cam groove 657 formed therethrough between its outer and inner peripheral surfaces. A cam pin 661 provided on the intermediate cylinder 660 is fitted in the cam groove 656 of the rotatable cylinder 650 through the cam groove 657 of the rotatable-cylinder-side rectilinear motion key ring 654. Therefore, when the rotatable cylinder 650 rotates and moves along the optical axis, the intermediate cylinder 660 further moves along the optical axis relative to the rotatable cylinder 650 while rotating by following the shapes of the cam grooves of the rotatable cylinder 650 and the rotatable-cylinder-side rectilinear motion key ring 654.

An intermediate-cylinder-side rectilinear motion key ring 664 is provided inside the intermediate cylinder 660. A rectilinear motion key groove 658 is formed in the fixed-cylinder-side rectilinear motion key ring 654 described above. The intermediate-cylinder-side rectilinear motion key ring 664 is fitted in the rectilinear motion key groove 658 of the fixed-cylinder-side rectilinear motion key ring 654. The intermediate-cylinder-side rectilinear motion key ring 664 is rotatable relative to the intermediate cylinder 660 but it is stopped from moving along the optical axis relative to the intermediate cylinder 660. Therefore, when the intermediate cylinder 660 rotates and moves along the optical axis relative to the rotatable cylinder 650, the intermediate-cylinder-side rectilinear motion key ring 664 moves rectilinearly along the optical axis by following the movement of the intermediate cylinder 660 without rotating.

A cam groove 665 for guiding a rear group guide frame 670 is formed in the inner wall surface of the intermediate cylinder 660. A cam pin 671 fixed on the rear group guide frame 670 is fitted in the cam groove 665 in a state of being stopped from rotating relative to the intermediate-cylinder-side rectilinear motion key ring 664. Therefore, when the intermediate cylinder 660 rotates, the rear group lens guide frame 670 moves rectilinearly along the optical axis according to the shape of the cam groove 665 in the inner wall surface of the intermediate cylinder 660.

A rear group lens holding frame 672 on which the shutter unit 621 is provided and which holds the rear group lens 601b is supported on the rear group lens guide frame 670 by a rotary shaft 673 so as to rotate relative to the rear group lens guide frame 670. When "OFF" is selected by the power switch 615, the rear group lens holding frame 672 retreats into the recessed portion 604 by the side of the image pickup device 622 together with the rear group lens 601b and the shutter unit 621, as shown in FIG. 40. When "NORMAL" is selected by the power switch 615, the rear group lens holding frame 672 advances onto the optical axis together with the rear group lens 601b, or the like according to a use situation, as shown in FIG. 38 or 39. The shutter unit 621 positioned in front of the rear group lens 601b has a diaphragm member for controlling the quantity of subject light passing through the image taking lens 601 and a shutter member for controlling the quantity of subject light passing through the image taking lens 601 by controlling the shutter speed. These member is of such a type as to control the quantity of light by using a PLZT element. The range of turning of the rear group lens holding frame 672 corresponds to revolving of the rear group lens 601b held in the rear group lens holding frame 672 between the advanced position on the optical axis of the image taking lens 601 (see FIG. 38 or 39) and the retreated position in the recessed portion 604 by the side of the image pickup device 622 (see FIG. 40). A coil spring 674 is provided around the rotary shaft 673. The rear group lens holding frame 672 is urged by the coil spring 674 in the direction in which the rear group lens 601b revolves to the position on the optical axis of the image taking lens 601. The rear group lens holding frame 672 is also urged in the optical axis direction by the coil spring 674.

In the intermediate cylinder 660, another cam groove 666 for guiding the front group frame 680 in which the front group lens 601a is held is formed. A cam pin 681 provided on the front group frame 680 is entered in the cam groove 666. The front group frame 680 is stopped from rotating relative to the intermediate-cylinder-side rectilinear motion key ring 664 while being allowed to move along the optical axis. Therefore, when the intermediate cylinder 660 rotates, the front group frame 680 moves rectilinearly along the optical axis relative to the intermediate cylinder 660 according to the shape of the cam groove 666.

When "OFF" is selected by the power switch 615 in the extended state shown in FIG. 38 or 39, this mechanism transmits the rotating drive force in the collapsing direction to the rotatable cylinder 650 through the column gear to collapse the lens barrel to the collapsed state shown in FIG. 40. Conversely, when "NORMAL" is selected by the power switch 615 in the collapsed state shown in FIG. 40, this mechanism transmits the rotating drive force in the extending direction to the rotatable cylinder 650 to extend the lens barrel from the collapsed state shown in FIG. 40 to the extended state shown in FIG. 38 or 39.

When "NORMAL" is selected by the power switch 615 and when image taking is performed, the group of zoom operating switches are operated and the rear group lens 601*b* is moved along the optical axis to adjust the focal length between the telephoto end and the wide-angle end. The image taking field angle is thereby set as desired. The focusing lens 601*c* is not moved in the optical axis direction but focusing is performed by controlling the refraction in the focusing lens functioning as a variable-focus lens so that the contrast according to the result of detection of the contrast based on the image signal obtained by the image pickup device 622 is maximized. Thereafter, when the shutter button 614 is depressed, the image signal representing the subject is generated by the image pickup device (CCD) 622, undergoes suitable image processing and is thereafter recorded.

Figure 41:
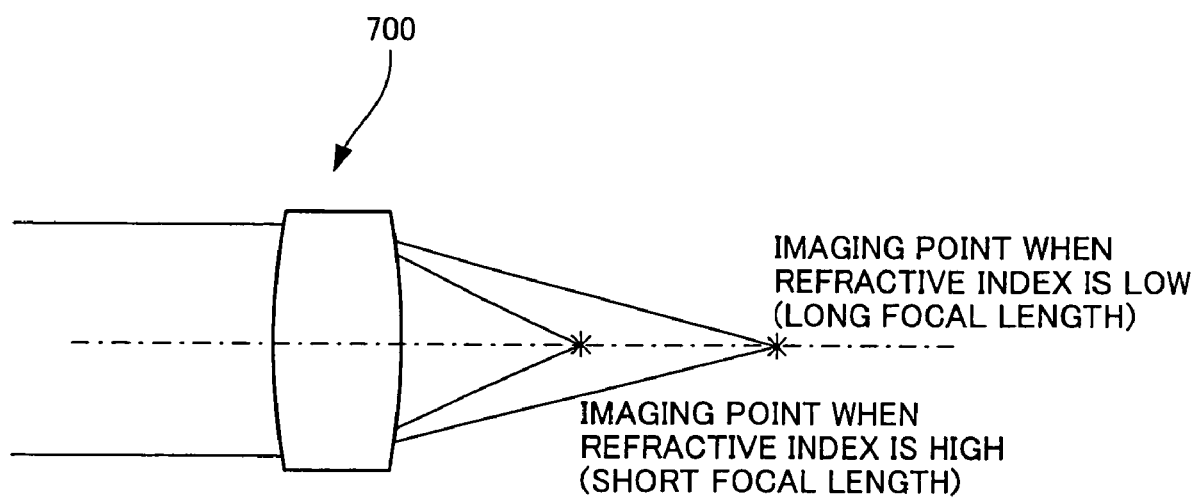
FIG. 41 is a diagram showing an imaging position in a lens body provided in a variable focus lens used as a rear group lens constituting an image taking lens in a digital camera which is an embodiment of a second image taking apparatus of the present invention.

FIG. 41 is a diagram showing an imaging position in a lens body provided in a variable focus lens used as a rear group lens constituting an image taking lens in a digital camera which is an embodiment of the second image taking apparatus of the present invention.

The digital camera which is an embodiment of the second image taking apparatus of the present invention is identical in external appearance to the digital camera 600. Therefore, the illustration of the digital camera described below is omitted.

As the rear group lens constituting the image taking lens provided in the digital camera which is an embodiment of the second image taking apparatus of the present invention, a variable-focus lens having a lens body 700 (e.g., the lens body 8 shown in FIG. 15) is used. The lens body 700 has an imaging point corresponding to a low refractive index (long focal distance) when it is controlled so that the amount of refraction of light is reduced, and has an imaging point corresponding to a high refractive index (short focal distance) when it is controlled so that the amount of refraction of light is increased. If a variable-focus lens having such a lens body 8 is provided as the rear group lens constituting the image taking lens, the focal length can be adjusted between the telephoto end and the wide-angle end according to a positive refractive index determined by the dispersion medium and the amount of movement of nanoparticles in the light passage region by electrophoresis. Therefore, there is no need for a drive mechanism such as a motor in contrast with the conventional technique of changing the focal length by moving the rear group lens in the optical axis direction between the telephoto end and the wide-angle end.

Figure 42:
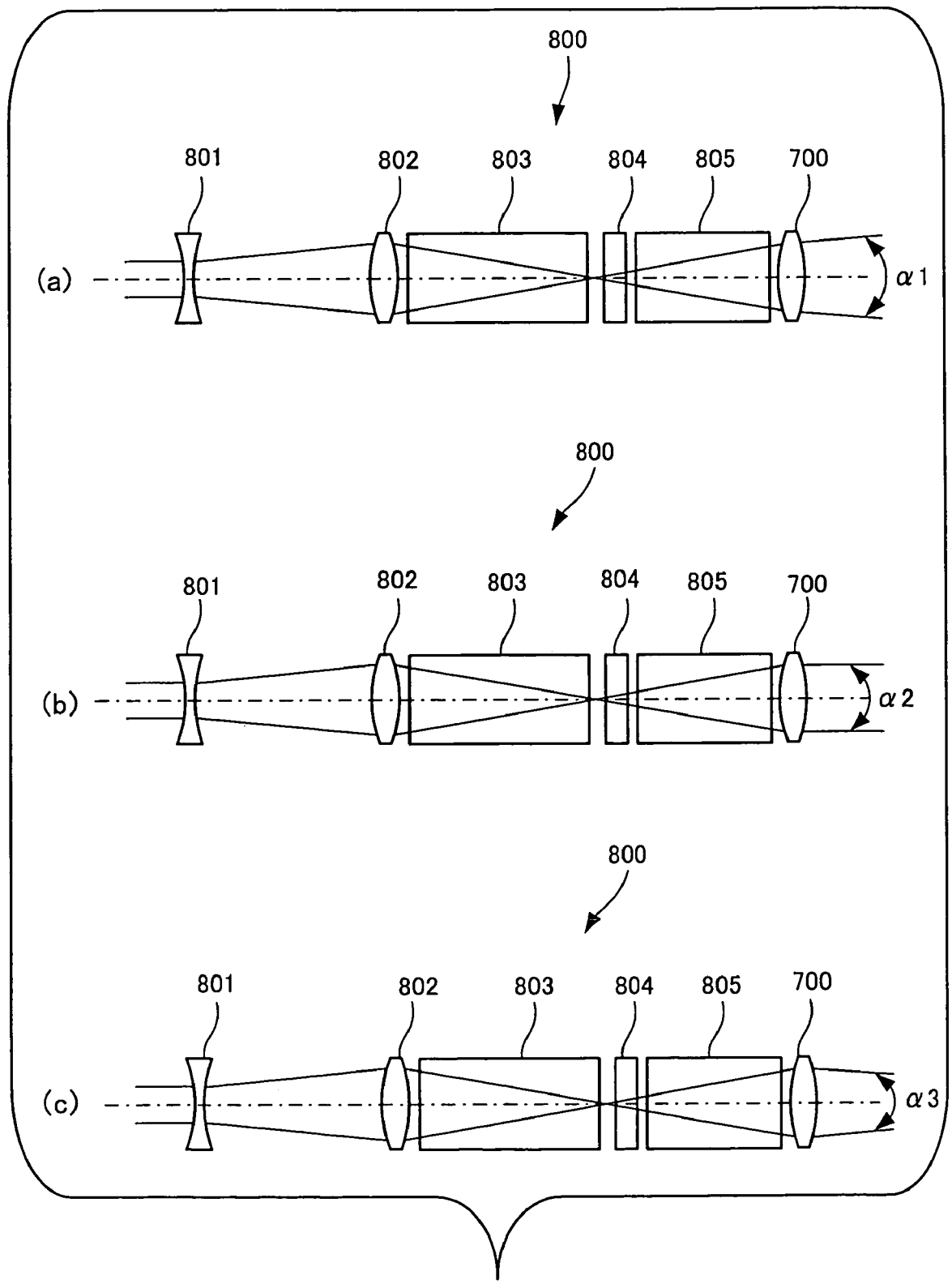
FIG. 42 is a diagram showing a sectional configuration of an optical finder in an embodiment of the present invention.

FIG. 42 is a diagram showing a sectional configuration of an optical finder in an embodiment of the present invention.

The optical finder 800 shown in FIG. 42 has an objective lens 801, a convex lens 802, an image erecting prism 803, a correction plate 804 for diopter correction capable of changing the refractive index, an image erecting prism 805, and an ocular lens (lens body) 700. An inverted image after passage through the objective lens 801 and the convex lens 802 is changed into a normal image by the image erecting prisms 803 and 805, undergoes diopter correction in the correction plate 804 and enters the lens body 700.

If the operator is nearsighted, control with the correction plate 804 is performed so as to set a predetermined increased emergence angle $\alpha 1$, as shown in part (a) of FIG. 42. If the sight of the operator is normal, control with the correction plate 804 is performed so as to set to an emergence angle $\alpha 2$ smaller than the emergence angle $\alpha 1$, as shown in part (b) of FIG. 42. If the operator is farsighted, control with the correction plate 804 is performed so as to set an emergence angle $\alpha 3$ smaller than the emergence angle $\alpha 2$, as shown in part (c) of FIG. 42. Thus, the optical finder 800 in this embodiment uses the refractive-index-variable correction plate 804 as a diopter correction lens and can therefore be made simpler in construction, smaller in size and improved in impact resistance in comparison with the conventional optical finders in which a mechanism for extending an ocular lens is provided for diopter correction or an auxiliary lens is added to an ocular section.

Figure 43:
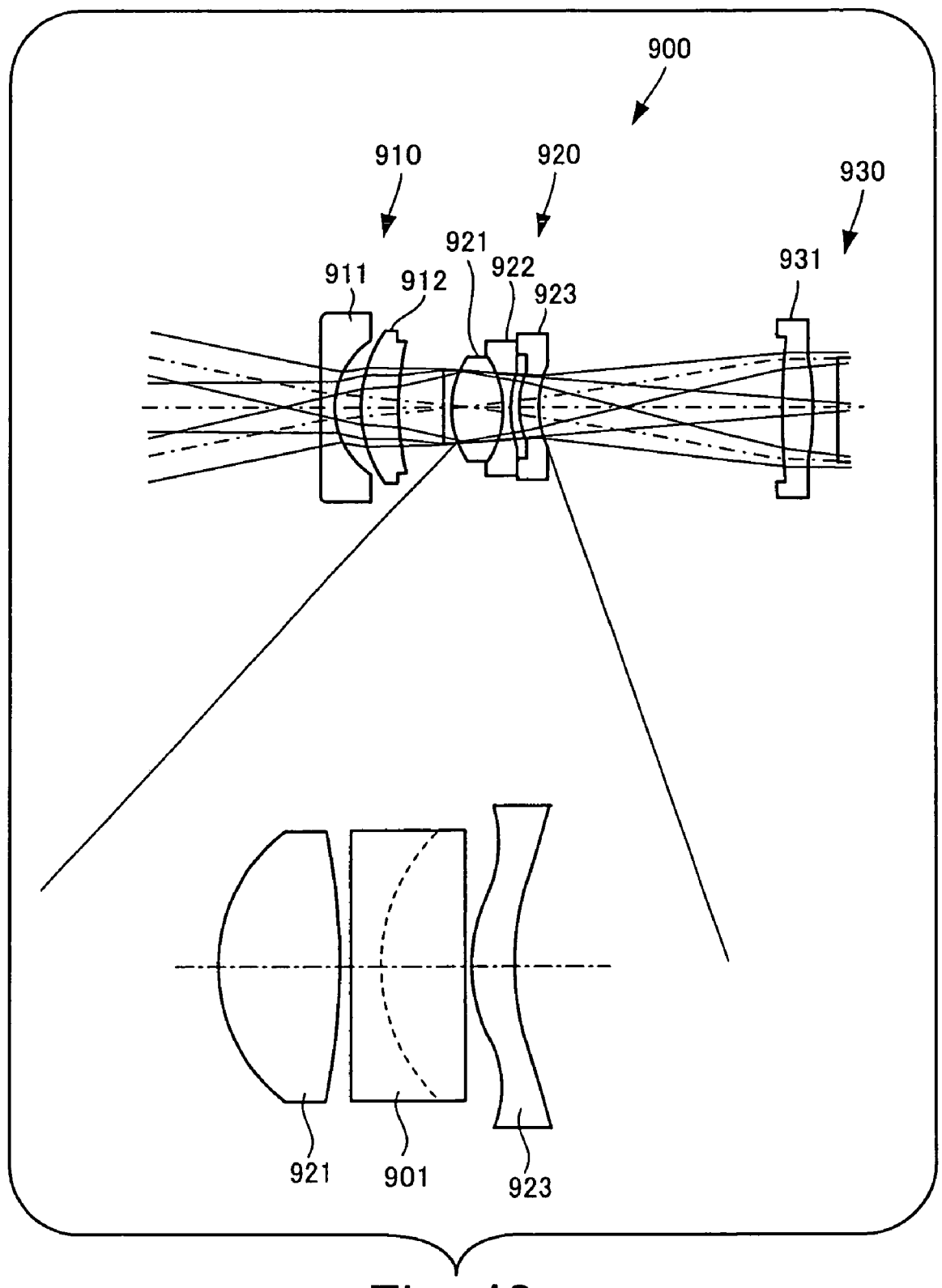
FIG. 43 is a diagram showing an enlarged view of a variable-focus lens for correcting an aberration of a lens constituting an image taking zoom lens of a digital camera which is an embodiment of a third image taking apparatus of the present invention.

FIG. 43 is a diagram showing in an enlarged view of a variable-focus lens for correcting an aberration of a lens constituting an image taking zoom lens of a digital camera which is an embodiment of the third image taking apparatus of the present invention.

The digital camera which is an embodiment of the third image taking apparatus of the present invention is identical in external appearance to the digital camera 600. Therefore, the illustration of the digital camera described below is omitted.

The zoom lens 900 shown in FIG. 43 includes a first lens group 910 constituted by lenses 911 and 912, a second lens group 920 constituted by lenses 921, 922, and 923, and a third lens group 930 constituted by a lens 931, the lenses being disposed in this order from the front end in the optical axis direction.

The arrangement may be such that a lens body 901 is disposed in place of the lens 922 constituting the second lens group 920; an aberration correction table formed of data for correcting an aberration of the lenses in the first, second and third lens groups 910, 920, and 930 is prepared; and the aberration of the lenses is corrected through control of the distribution of nanoparticles performed by applying voltages to the electrodes of the variable-focus lens according to the data in the aberration correction table. In this embodiment, an image taking lens using a variable-focus lens using such a lens body 901 is provided and, therefore, aberration correction can be performed as desired to suitably correct an aberration peculiar to the image taking lens.

For example a variable-focus lens capable of changing the focal length in eight steps may be provided in a digital camera to suitably perform automatic focusing.

Figure 44:
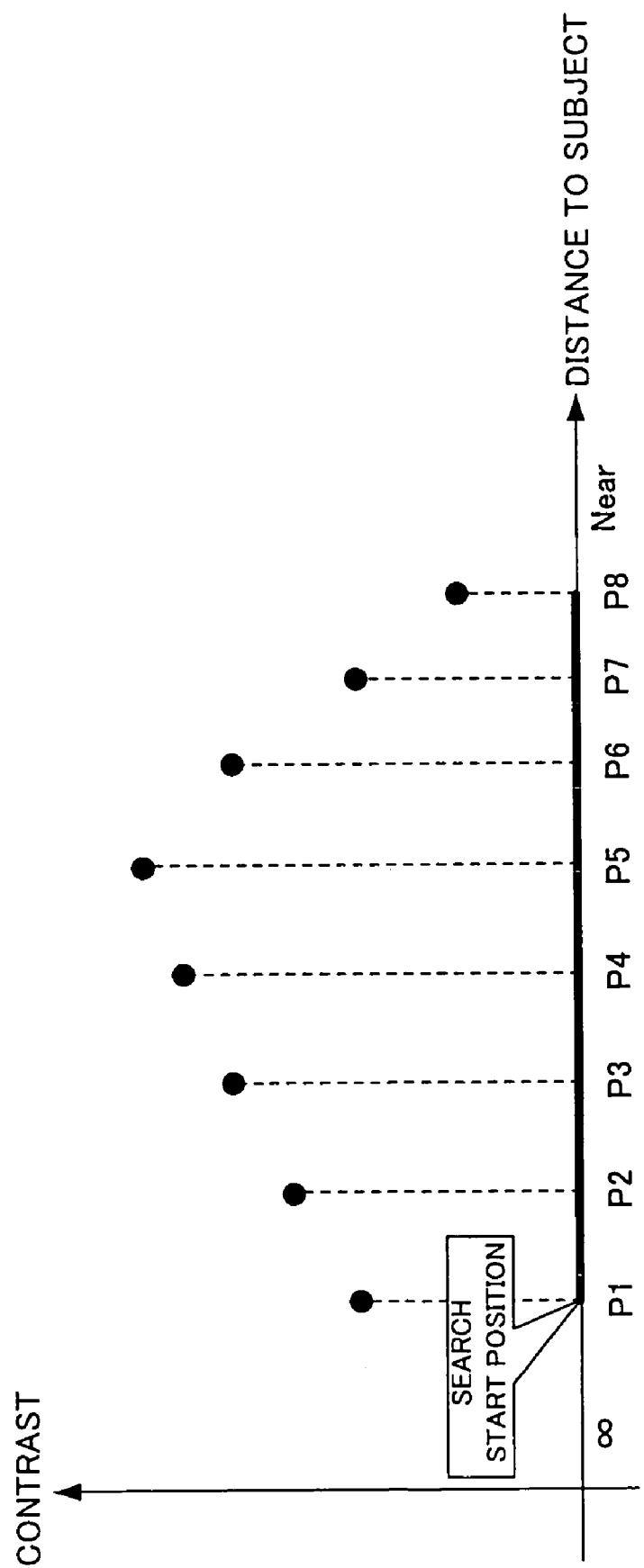
FIG. 44 is a diagram showing a state in which automatic focusing is performed by using a variable-focus lens capable of changing the focal length in eight steps.

FIG. 44 is a diagram showing a state in which automatic focusing is performed by using a variable-focus lens capable of changing the focal length in eight steps.

Automatic focusing based on a "mountain-climbing method" can be performed by using as a focusing lens a focal-length-variable lens having a lens body whose focal length is changed in eight steps according to a positive refractive index determined by a dispersion medium and the amount of movement of nanoparticles in a light passage region caused by electrophoresis, as described below.

The abscissa of FIG. 44 represents the subject distance and the ordinate represents contrast. Refractive indices $P1$, $P2$, $P3$, $P4$, $P5$, $P6$, $P7$, and $P8$ of a lens body constituting a variable-focus lens are shown on the abscissa of FIG. 44 in correspondence with subject distances from a long distance to a short distance. The refractive indices $P1$, $P2$, $P3$, $P4$, $P5$, $P6$, $P7$, and $P8$ are in increasing order from $P1$ to $P8$.

A maximum-contrast point is obtained by changing the refractive index of the lens body and checking the direction of change in contrast, and an in-focus point is obtained by assuming that a subject to be focused at the maximum point exists. Thus, focusing is performed by obtaining an in-focus point by performing an automatic focusing search using a variable-focus lens whose focal length is changed in eight steps. In this case, there is no need for a drive mechanism such as a motor in contrast with the conventional technique of performing focusing by moving the focusing lens in the optical axis direction. Consequently, an image taking lens having a simplified construction, a reduced size and improved impact resistance can be implemented.

While applications of the embodiments of the image taking apparatus in accordance with the present invention to digital cameras have been described by way of example, the image taking apparatus of the present invention may also be applied to a silver-salt camera, a portable telephone, and other devices.

Also, examples of optical units using an optical element having the shape of a lens and an optical element having the shape of a flat plate have been described. The optical element in accordance with the present invention, however, may have, for example, the shape of a prism.

Also, applications of electrophoretic optical units having the shape of a lens in the image taking apparatus and the optical finder in accordance with the present invention to the image taking apparatus and the optical finder in accordance with the present invention have been described by way of example. However, an electrophoretic type of optical finder having the shape of a flat plate, a magnetophoretic type of optical finder or the like may be applied thereto.

What is claimed is:

1. An optical unit comprising:
    an optical element having a container which is light-transmissive at least in a light passage region, a light-transmissive dispersion medium enclosed in the container, a light-transmissive dispersoid dispersed in the dispersion medium and having a refractive index different from the refractive index of the dispersion medium, and an electromagnetic field generator which changes the focal length of the light passage region by moving the dispersoid dispersed in the dispersion medium by an electromagnetic force; and
    a focal length changing section which changes the focal length of the light passage region at least in three steps by controlling an electromagnetic field generated by the electromagnetic field generator.

2. The optical unit according to claim 1, wherein the electromagnetic field generator is an electrode which receives application of a voltage to cause electrophoresis of the dispersoid, and
    the focal length changing section controls the voltage applied to the electrode.

3. The optical unit according to claim 2, wherein the dispersoid comprises titanium oxide.

4. The optical unit according to claim 2, wherein the dispersoid comprises alumina.

5. The optical unit according to claim 2, wherein the dispersion medium is an organic dispersion medium.

6. The optical unit according to claim 5, wherein the dispersion medium is a hydrocarbon-based organic dispersion medium.

7. The optical unit according to claim 2, wherein an inner surface of the electrode is coated with an insulating film which is placed adjacent to the dispersion medium.

8. The optical unit according to claim 7, wherein the insulating film is a polyimide insulating film.

9. The optical unit according to claim 1, wherein the dispersoid is magnetic,
    the electromagnetic field generator is a magnetic field generator which causes magnetophoresis of the dispersoid, and
    the focal length changing section controls a magnetic field generated by the magnetic field generator.

10. The optical unit according to claim 9, wherein the dispersoid comprises titanium-cobalt oxide.

11. The optical unit according to claim 1, wherein the dispersoid is nanoparticles.

12. The optical unit according to claim 11, wherein the dispersoid is nanoparticles having a particle size of 5 to 100 nm.

13. The optical unit according to claim 1, wherein the dispersion medium is water.

14. The optical unit according to claim 1, wherein the container has the shape of a lens.

15. The optical unit according to claim 14, wherein at least the light passage region of the container has the shape of a lens with a positive refractive power.

16. The optical unit according to claim 14, wherein at least the light passage region of the container has the shape of a lens with a negative refractive power.

17. The optical unit according to claim 14, wherein at least the light passage region of the container has the shape of an aspheric lens.

18. The optical unit according to claim 1, wherein the container has the shape of a flat plate.

19. An image taking apparatus comprising:
    an image taking lens in which the optical unit according to claim 1 is used as a focusing lens,
    wherein an image signal is generated by performing an image taking operation including capturing subject light which enters the image taking apparatus through the image taking lens.

20. The image taking apparatus according to claim 19, further comprising a focus detection section which detects an in-focus position of the image taking lens by changing the focal length by means of the focusing lens and detecting a change in contrast of a subject image.

21. An image taking apparatus comprising:
    an image taking lens whose focal length is changed by the optical unit according to claim 1,
    wherein an image signal is generated by performing an image taking operation including capturing subject light which enters the image taking apparatus through the image taking lens.

22. An image taking apparatus comprising:
    an image taking lens in which the optical unit according to claim 1 is used as an aberration correction lens,
    wherein an image signal is generated by performing an image taking operation including capturing subject light which enters the image taking apparatus through the image taking lens.

23. An optical finder using the optical unit according to claim 1 as a diopter correction lens.

* * * * *